US007039575B2

(12) United States Patent
Juneau

(10) Patent No.: US 7,039,575 B2
(45) Date of Patent: May 2, 2006

(54) METHODS AND SYSTEMS FOR THE EVALUATION OF POWER GENERATING FACILITIES

(75) Inventor: Mark Anthony Juneau, Ridgefield, CT (US)

(73) Assignee: GE Capital Services Structured Finance Group, Inc., Stamford, CT (US)

( * ) Notice: Subject to any disclaimer, the term of this patent is extended or adjusted under 35 U.S.C. 154(b) by 647 days.

(21) Appl. No.: 09/833,823

(22) Filed: Apr. 12, 2001

(65) Prior Publication Data

US 2004/0015271 A1 Jan. 22, 2004

(51) Int. Cl.
*G06G 7/62* (2006.01)

(52) U.S. Cl. .......................................... 703/18; 705/412

(58) Field of Classification Search .................. 307/11, 307/125, 126; 700/286, 295; 705/8, 10, 705/412, 7, FOR 103; 709/203, 224; 703/18; 702/182; 713/320
See application file for complete search history.

(56) References Cited

U.S. PATENT DOCUMENTS

| 4,247,786 | A | 1/1981 | Hedges |
| 4,551,812 | A | 11/1985 | Gurr et al. |
| 5,732,193 | A | 3/1998 | Aberson |
| 5,924,486 | A | 7/1999 | Ehlers et al. |
| 5,974,403 | A * | 10/1999 | Takriti et al. ................ 705/412 |
| 6,021,402 | A | 2/2000 | Takriti |
| 6,047,274 | A | 4/2000 | Johnson et al. |
| 6,157,292 | A | 12/2000 | Piercy et al. |
| 6,178,362 | B1 * | 1/2001 | Woolard et al. ............ 700/295 |
| 6,226,365 | B1 | 5/2001 | Mashinsky |
| 6,263,315 | B1 | 7/2001 | Talluri |
| 6,366,889 | B1 * | 4/2002 | Zaloom .......................... 705/7 |
| 6,591,225 | B1 * | 7/2003 | Adelman et al. ........... 702/182 |
| 6,697,951 | B1 * | 2/2004 | Sinha et al. ................. 713/300 |
| 6,829,713 | B1 * | 12/2004 | Cooper et al. .............. 713/320 |
| 6,904,385 | B1 * | 6/2005 | Budike, Jr. ................. 702/182 |

OTHER PUBLICATIONS

International Search Report, dated Jul. 12, 2002, Application No. PCT/US02/01915, 3 pages.

* cited by examiner

*Primary Examiner*—Albert W. Paladini
(74) *Attorney, Agent, or Firm*—Armstrong Teasdale LLP

(57) ABSTRACT

A network-based method for facilitating a selection of at least one power generating facility, using a network-based system including a server and at least one device connected to the server via a network is disclosed. The method includes identifying assumptions to evaluate a power generating facility, receiving power plant facility information, and computing performance metrics of the facility based on received information and the identified assumptions. Other embodiments of the invention utilize a System, a Computer Program, an Apparatus, or a Computer for determining a value for one or more power generating facilities based on pre-determined assumptions that are developed from historical experience.

64 Claims, 64 Drawing Sheets

Unit 2

Percentage of Available Hours Dispatched

| | 2001 | 2002 | 2003 | 2004 | 2005 | 2006 | 2007 | 2008 | 2009 | 2010 |
|---|---|---|---|---|---|---|---|---|---|---|
| January | 93.00% | 93.00% | 93.00% | 93.00% | 93.00% | 93.00% | 93.00% | 93.00% | 93.00% | 93.00% |
| February | 93.00% | 93.00% | 93.00% | 93.00% | 93.00% | 93.00% | 93.00% | 93.00% | 93.00% | 93.00% |
| March | 94.00% | 94.00% | 94.00% | 94.00% | 94.00% | 94.00% | 94.00% | 94.00% | 94.00% | 94.00% |
| April | 94.00% | 94.00% | 94.00% | 94.00% | 94.00% | 94.00% | 94.00% | 94.00% | 94.00% | 94.00% |
| May | 95.00% | 95.00% | 95.00% | 95.00% | 95.00% | 95.00% | 95.00% | 95.00% | 95.00% | 95.00% |
| June | 95.00% | 95.00% | 95.00% | 95.00% | 95.00% | 95.00% | 95.00% | 95.00% | 95.00% | 95.00% |
| July | 96.00% | 96.00% | 96.00% | 96.00% | 96.00% | 96.00% | 96.00% | 96.00% | 96.00% | 96.00% |
| August | 96.00% | 96.00% | 96.00% | 96.00% | 96.00% | 96.00% | 96.00% | 96.00% | 96.00% | 96.00% |
| September | 95.00% | 95.00% | 95.00% | 95.00% | 95.00% | 95.00% | 95.00% | 95.00% | 95.00% | 95.00% |
| October | 95.00% | 95.00% | 95.00% | 95.00% | 95.00% | 95.00% | 95.00% | 95.00% | 95.00% | 95.00% |
| November | 94.00% | 94.00% | 94.00% | 94.00% | 94.00% | 94.00% | 94.00% | 94.00% | 94.00% | 94.00% |
| December | 94.00% | 94.00% | 94.00% | 94.00% | 94.00% | 94.00% | 94.00% | 94.00% | 94.00% | 94.00% |

Dispatched Load

| | 2001 | 2002 | 2003 | 2004 | 2005 | 2006 | 2007 | 2008 | 2009 | 2010 |
|---|---|---|---|---|---|---|---|---|---|---|
| January | 98.00% | 98.00% | 98.00% | 98.00% | 98.00% | 98.00% | 98.00% | 98.00% | 98.00% | 98.00% |
| February | 98.00% | 98.00% | 98.00% | 98.00% | 98.00% | 98.00% | 98.00% | 98.00% | 98.00% | 98.00% |
| March | 97.00% | 97.00% | 97.00% | 97.00% | 97.00% | 97.00% | 97.00% | 97.00% | 97.00% | 97.00% |
| April | 98.00% | 98.00% | 98.00% | 98.00% | 98.00% | 98.00% | 98.00% | 98.00% | 98.00% | 98.00% |
| May | 98.00% | 98.00% | 98.00% | 98.00% | 98.00% | 98.00% | 98.00% | 98.00% | 98.00% | 98.00% |
| June | 99.00% | 99.00% | 99.00% | 99.00% | 99.00% | 99.00% | 99.00% | 99.00% | 99.00% | 99.00% |
| July | 100.00% | 100.00% | 100.00% | 100.00% | 100.00% | 100.00% | 100.00% | 100.00% | 100.00% | 100.00% |
| August | 100.00% | 100.00% | 100.00% | 100.00% | 100.00% | 100.00% | 100.00% | 100.00% | 100.00% | 100.00% |
| September | 99.00% | 99.00% | 99.00% | 99.00% | 99.00% | 99.00% | 99.00% | 99.00% | 99.00% | 99.00% |
| October | 98.00% | 98.00% | 98.00% | 98.00% | 98.00% | 98.00% | 98.00% | 98.00% | 98.00% | 98.00% |
| November | 98.00% | 98.00% | 98.00% | 98.00% | 98.00% | 98.00% | 98.00% | 98.00% | 98.00% | 98.00% |
| December | 98.00% | 98.00% | 98.00% | 98.00% | 98.00% | 98.00% | 98.00% | 98.00% | 98.00% | 98.00% |

FIG. 6

Unit 3

Percentage of Available Hours Dispatched

| | 2001 | 2002 | 2003 | 2004 | 2005 | 2006 | 2007 | 2008 | 2009 | 2010 |
|---|---|---|---|---|---|---|---|---|---|---|
| January | 93.00% | 93.00% | 93.00% | 93.00% | 93.00% | 93.00% | 93.00% | 93.00% | 93.00% | 93.00% |
| February | 93.00% | 93.00% | 93.00% | 93.00% | 93.00% | 93.00% | 93.00% | 93.00% | 93.00% | 93.00% |
| March | 94.00% | 94.00% | 94.00% | 94.00% | 94.00% | 94.00% | 94.00% | 94.00% | 94.00% | 94.00% |
| April | 94.00% | 94.00% | 94.00% | 94.00% | 94.00% | 94.00% | 94.00% | 94.00% | 94.00% | 94.00% |
| May | 95.00% | 95.00% | 95.00% | 95.00% | 95.00% | 95.00% | 95.00% | 95.00% | 95.00% | 95.00% |
| June | 95.00% | 95.00% | 95.00% | 95.00% | 95.00% | 95.00% | 95.00% | 95.00% | 95.00% | 95.00% |
| July | 96.00% | 96.00% | 96.00% | 96.00% | 96.00% | 96.00% | 96.00% | 96.00% | 96.00% | 96.00% |
| August | 96.00% | 96.00% | 96.00% | 96.00% | 96.00% | 96.00% | 96.00% | 96.00% | 96.00% | 96.00% |
| September | 95.00% | 95.00% | 95.00% | 95.00% | 95.00% | 95.00% | 95.00% | 95.00% | 95.00% | 95.00% |
| October | 95.00% | 95.00% | 95.00% | 95.00% | 95.00% | 95.00% | 95.00% | 95.00% | 95.00% | 95.00% |
| November | 94.00% | 94.00% | 94.00% | 94.00% | 94.00% | 94.00% | 94.00% | 94.00% | 94.00% | 94.00% |
| December | 94.00% | 94.00% | 94.00% | 94.00% | 94.00% | 94.00% | 94.00% | 94.00% | 94.00% | 94.00% |

Dispatched Load

| | 2001 | 2002 | 2003 | 2004 | 2005 | 2006 | 2007 | 2008 | 2009 | 2010 |
|---|---|---|---|---|---|---|---|---|---|---|
| January | 98.00% | 98.00% | 98.00% | 98.00% | 98.00% | 98.00% | 98.00% | 98.00% | 98.00% | 98.00% |
| February | 98.00% | 98.00% | 98.00% | 98.00% | 98.00% | 98.00% | 98.00% | 98.00% | 98.00% | 98.00% |
| March | 97.00% | 97.00% | 97.00% | 97.00% | 97.00% | 97.00% | 97.00% | 97.00% | 97.00% | 97.00% |
| April | 98.00% | 98.00% | 98.00% | 98.00% | 98.00% | 98.00% | 98.00% | 98.00% | 98.00% | 98.00% |
| May | 98.00% | 98.00% | 98.00% | 98.00% | 98.00% | 98.00% | 98.00% | 98.00% | 98.00% | 98.00% |
| June | 99.00% | 99.00% | 99.00% | 99.00% | 99.00% | 99.00% | 99.00% | 99.00% | 99.00% | 99.00% |
| July | 100.00% | 100.00% | 100.00% | 100.00% | 100.00% | 100.00% | 100.00% | 100.00% | 100.00% | 100.00% |
| August | 100.00% | 100.00% | 100.00% | 100.00% | 100.00% | 100.00% | 100.00% | 100.00% | 100.00% | 100.00% |
| September | 99.00% | 99.00% | 99.00% | 99.00% | 99.00% | 99.00% | 99.00% | 99.00% | 99.00% | 99.00% |
| October | 98.00% | 98.00% | 98.00% | 98.00% | 98.00% | 98.00% | 98.00% | 98.00% | 98.00% | 98.00% |
| November | 98.00% | 98.00% | 98.00% | 98.00% | 98.00% | 98.00% | 98.00% | 98.00% | 98.00% | 98.00% |
| December | 98.00% | 98.00% | 98.00% | 98.00% | 98.00% | 98.00% | 98.00% | 98.00% | 98.00% | 98.00% |

FIG. 7

Unit 4

Percentage of Available Hours Dispatched

| | 2001 | 2002 | 2003 | 2004 | 2005 | 2006 | 2007 | 2008 | 2009 | 2010 |
|---|---|---|---|---|---|---|---|---|---|---|
| January | 93.00% | 93.00% | 93.00% | 93.00% | 93.00% | 93.00% | 93.00% | 93.00% | 93.00% | 93.00% |
| February | 93.00% | 93.00% | 93.00% | 93.00% | 93.00% | 93.00% | 93.00% | 93.00% | 93.00% | 93.00% |
| March | 94.00% | 94.00% | 94.00% | 94.00% | 94.00% | 94.00% | 94.00% | 94.00% | 94.00% | 94.00% |
| April | 94.00% | 94.00% | 94.00% | 94.00% | 94.00% | 94.00% | 94.00% | 94.00% | 94.00% | 94.00% |
| May | 95.00% | 95.00% | 95.00% | 95.00% | 95.00% | 95.00% | 95.00% | 95.00% | 95.00% | 95.00% |
| June | 95.00% | 95.00% | 95.00% | 95.00% | 95.00% | 95.00% | 95.00% | 95.00% | 95.00% | 95.00% |
| July | 96.00% | 96.00% | 96.00% | 96.00% | 96.00% | 96.00% | 96.00% | 96.00% | 96.00% | 96.00% |
| August | 96.00% | 96.00% | 96.00% | 96.00% | 96.00% | 96.00% | 96.00% | 96.00% | 96.00% | 96.00% |
| September | 95.00% | 95.00% | 95.00% | 95.00% | 95.00% | 95.00% | 95.00% | 95.00% | 95.00% | 95.00% |
| October | 95.00% | 95.00% | 95.00% | 95.00% | 95.00% | 95.00% | 95.00% | 95.00% | 95.00% | 95.00% |
| November | 94.00% | 94.00% | 94.00% | 94.00% | 94.00% | 94.00% | 94.00% | 94.00% | 94.00% | 94.00% |
| December | 94.00% | 94.00% | 94.00% | 94.00% | 94.00% | 94.00% | 94.00% | 94.00% | 94.00% | 94.00% |

Dispatched Load

| | 2001 | 2002 | 2003 | 2004 | 2005 | 2006 | 2007 | 2008 | 2009 | 2010 |
|---|---|---|---|---|---|---|---|---|---|---|
| January | 98.00% | 98.00% | 98.00% | 98.00% | 98.00% | 98.00% | 98.00% | 98.00% | 98.00% | 98.00% |
| February | 98.00% | 98.00% | 98.00% | 98.00% | 98.00% | 98.00% | 98.00% | 98.00% | 98.00% | 98.00% |
| March | 97.00% | 97.00% | 97.00% | 97.00% | 97.00% | 97.00% | 97.00% | 97.00% | 97.00% | 97.00% |
| April | 98.00% | 98.00% | 98.00% | 98.00% | 98.00% | 98.00% | 98.00% | 98.00% | 98.00% | 98.00% |
| May | 98.00% | 98.00% | 98.00% | 98.00% | 98.00% | 98.00% | 98.00% | 98.00% | 98.00% | 98.00% |
| June | 99.00% | 99.00% | 99.00% | 99.00% | 99.00% | 99.00% | 99.00% | 99.00% | 99.00% | 99.00% |
| July | 100.00% | 100.00% | 100.00% | 100.00% | 100.00% | 100.00% | 100.00% | 100.00% | 100.00% | 100.00% |
| August | 100.00% | 100.00% | 100.00% | 100.00% | 100.00% | 100.00% | 100.00% | 100.00% | 100.00% | 100.00% |
| September | 99.00% | 99.00% | 99.00% | 99.00% | 99.00% | 99.00% | 99.00% | 99.00% | 99.00% | 99.00% |
| October | 98.00% | 98.00% | 98.00% | 98.00% | 98.00% | 98.00% | 98.00% | 98.00% | 98.00% | 98.00% |
| November | 98.00% | 98.00% | 98.00% | 98.00% | 98.00% | 98.00% | 98.00% | 98.00% | 98.00% | 98.00% |
| December | 98.00% | 98.00% | 98.00% | 98.00% | 98.00% | 98.00% | 98.00% | 98.00% | 98.00% | 98.00% |

FIG. 8

Unit 5
Percentage of Available Hours Dispatched

| | 2001 | 2002 | 2003 | 2004 | 2005 | 2006 | 2007 | 2008 | 2009 | 2010 |
|---|---|---|---|---|---|---|---|---|---|---|
| January | 93.00% | 93.00% | 93.00% | 93.00% | 93.00% | 93.00% | 93.00% | 93.00% | 93.00% | 93.00% |
| February | 93.00% | 93.00% | 93.00% | 93.00% | 93.00% | 93.00% | 93.00% | 93.00% | 93.00% | 93.00% |
| March | 94.00% | 94.00% | 94.00% | 94.00% | 94.00% | 94.00% | 94.00% | 94.00% | 94.00% | 94.00% |
| April | 94.00% | 94.00% | 94.00% | 94.00% | 94.00% | 94.00% | 94.00% | 94.00% | 94.00% | 94.00% |
| May | 95.00% | 95.00% | 95.00% | 95.00% | 95.00% | 95.00% | 95.00% | 95.00% | 95.00% | 95.00% |
| June | 95.00% | 95.00% | 95.00% | 95.00% | 95.00% | 95.00% | 95.00% | 95.00% | 95.00% | 95.00% |
| July | 96.00% | 96.00% | 96.00% | 96.00% | 96.00% | 96.00% | 96.00% | 96.00% | 96.00% | 96.00% |
| August | 96.00% | 96.00% | 96.00% | 96.00% | 96.00% | 96.00% | 96.00% | 96.00% | 96.00% | 96.00% |
| September | 95.00% | 95.00% | 95.00% | 95.00% | 95.00% | 95.00% | 95.00% | 95.00% | 95.00% | 95.00% |
| October | 95.00% | 95.00% | 95.00% | 95.00% | 95.00% | 95.00% | 95.00% | 95.00% | 95.00% | 95.00% |
| November | 94.00% | 94.00% | 94.00% | 94.00% | 94.00% | 94.00% | 94.00% | 94.00% | 94.00% | 94.00% |
| December | 94.00% | 94.00% | 94.00% | 94.00% | 94.00% | 94.00% | 94.00% | 94.00% | 94.00% | 94.00% |

Dispatched Load

| | 2001 | 2002 | 2003 | 2004 | 2005 | 2006 | 2007 | 2008 | 2009 | 2010 |
|---|---|---|---|---|---|---|---|---|---|---|
| January | 98.00% | 98.00% | 98.00% | 98.00% | 98.00% | 98.00% | 98.00% | 98.00% | 98.00% | 98.00% |
| February | 98.00% | 98.00% | 98.00% | 98.00% | 98.00% | 98.00% | 98.00% | 98.00% | 98.00% | 98.00% |
| March | 97.00% | 97.00% | 97.00% | 97.00% | 97.00% | 97.00% | 97.00% | 97.00% | 97.00% | 97.00% |
| April | 98.00% | 98.00% | 98.00% | 98.00% | 98.00% | 98.00% | 98.00% | 98.00% | 98.00% | 98.00% |
| May | 98.00% | 98.00% | 98.00% | 98.00% | 98.00% | 98.00% | 98.00% | 98.00% | 98.00% | 98.00% |
| June | 99.00% | 99.00% | 99.00% | 99.00% | 99.00% | 99.00% | 99.00% | 99.00% | 99.00% | 99.00% |
| July | 100.00% | 100.00% | 100.00% | 100.00% | 100.00% | 100.00% | 100.00% | 100.00% | 100.00% | 100.00% |
| August | 100.00% | 100.00% | 100.00% | 100.00% | 100.00% | 100.00% | 100.00% | 100.00% | 100.00% | 100.00% |
| September | 99.00% | 99.00% | 99.00% | 99.00% | 99.00% | 99.00% | 99.00% | 99.00% | 99.00% | 99.00% |
| October | 98.00% | 98.00% | 98.00% | 98.00% | 98.00% | 98.00% | 98.00% | 98.00% | 98.00% | 98.00% |
| November | 98.00% | 98.00% | 98.00% | 98.00% | 98.00% | 98.00% | 98.00% | 98.00% | 98.00% | 98.00% |
| December | 98.00% | 98.00% | 98.00% | 98.00% | 98.00% | 98.00% | 98.00% | 98.00% | 98.00% | 98.00% |

FIG. 9

Unit 6

| Percentage of Available Hours Dispatched | 2001 | 2002 | 2003 | 2004 | 2005 | 2006 | 2007 | 2008 | 2009 | 2010 |
|---|---|---|---|---|---|---|---|---|---|---|
| January | 93.00% | 93.00% | 93.00% | 93.00% | 93.00% | 93.00% | 93.00% | 93.00% | 93.00% | 93.00% |
| February | 93.00% | 93.00% | 93.00% | 93.00% | 93.00% | 93.00% | 93.00% | 93.00% | 93.00% | 93.00% |
| March | 94.00% | 94.00% | 94.00% | 94.00% | 94.00% | 94.00% | 94.00% | 94.00% | 94.00% | 94.00% |
| April | 94.00% | 94.00% | 94.00% | 94.00% | 94.00% | 94.00% | 94.00% | 94.00% | 94.00% | 94.00% |
| May | 95.00% | 95.00% | 95.00% | 95.00% | 95.00% | 95.00% | 95.00% | 95.00% | 95.00% | 95.00% |
| June | 95.00% | 95.00% | 95.00% | 95.00% | 95.00% | 95.00% | 95.00% | 95.00% | 95.00% | 95.00% |
| July | 96.00% | 96.00% | 96.00% | 96.00% | 96.00% | 96.00% | 96.00% | 96.00% | 96.00% | 96.00% |
| August | 96.00% | 96.00% | 96.00% | 96.00% | 96.00% | 96.00% | 96.00% | 96.00% | 96.00% | 96.00% |
| September | 95.00% | 95.00% | 95.00% | 95.00% | 95.00% | 95.00% | 95.00% | 95.00% | 95.00% | 95.00% |
| October | 95.00% | 95.00% | 95.00% | 95.00% | 95.00% | 95.00% | 95.00% | 95.00% | 95.00% | 95.00% |
| November | 94.00% | 94.00% | 94.00% | 94.00% | 94.00% | 94.00% | 94.00% | 94.00% | 94.00% | 94.00% |
| December | 94.00% | 94.00% | 94.00% | 94.00% | 94.00% | 94.00% | 94.00% | 94.00% | 94.00% | 94.00% |

| Dispatched Load | 2001 | 2002 | 2003 | 2004 | 2005 | 2006 | 2007 | 2008 | 2009 | 2010 |
|---|---|---|---|---|---|---|---|---|---|---|
| January | 98.00% | 98.00% | 98.00% | 98.00% | 98.00% | 98.00% | 98.00% | 98.00% | 98.00% | 98.00% |
| February | 98.00% | 98.00% | 98.00% | 98.00% | 98.00% | 98.00% | 98.00% | 98.00% | 98.00% | 98.00% |
| March | 97.00% | 97.00% | 97.00% | 97.00% | 97.00% | 97.00% | 97.00% | 97.00% | 97.00% | 97.00% |
| April | 98.00% | 98.00% | 98.00% | 98.00% | 98.00% | 98.00% | 98.00% | 98.00% | 98.00% | 98.00% |
| May | 98.00% | 98.00% | 98.00% | 98.00% | 98.00% | 98.00% | 98.00% | 98.00% | 98.00% | 98.00% |
| June | 99.00% | 99.00% | 99.00% | 99.00% | 99.00% | 99.00% | 99.00% | 99.00% | 99.00% | 99.00% |
| July | 100.00% | 100.00% | 100.00% | 100.00% | 100.00% | 100.00% | 100.00% | 100.00% | 100.00% | 100.00% |
| August | 100.00% | 100.00% | 100.00% | 100.00% | 100.00% | 100.00% | 100.00% | 100.00% | 100.00% | 100.00% |
| September | 99.00% | 99.00% | 99.00% | 99.00% | 99.00% | 99.00% | 99.00% | 99.00% | 99.00% | 99.00% |
| October | 98.00% | 98.00% | 98.00% | 98.00% | 98.00% | 98.00% | 98.00% | 98.00% | 98.00% | 98.00% |
| November | 98.00% | 98.00% | 98.00% | 98.00% | 98.00% | 98.00% | 98.00% | 98.00% | 98.00% | 98.00% |
| December | 98.00% | 98.00% | 98.00% | 98.00% | 98.00% | 98.00% | 98.00% | 98.00% | 98.00% | 98.00% |

FIG. 10

Unit 7

Percentage of Available Hours Dispatched

| | 2001 | 2002 | 2003 | 2004 | 2005 | 2006 | 2007 | 2008 | 2009 | 2010 |
|---|---|---|---|---|---|---|---|---|---|---|
| January | 93.00% | 93.00% | 93.00% | 93.00% | 93.00% | 93.00% | 93.00% | 93.00% | 93.00% | 93.00% |
| February | 93.00% | 93.00% | 93.00% | 93.00% | 93.00% | 93.00% | 93.00% | 93.00% | 93.00% | 93.00% |
| March | 94.00% | 94.00% | 94.00% | 94.00% | 94.00% | 94.00% | 94.00% | 94.00% | 94.00% | 94.00% |
| April | 94.00% | 94.00% | 94.00% | 94.00% | 94.00% | 94.00% | 94.00% | 94.00% | 94.00% | 94.00% |
| May | 95.00% | 95.00% | 95.00% | 95.00% | 95.00% | 95.00% | 95.00% | 95.00% | 95.00% | 95.00% |
| June | 95.00% | 95.00% | 95.00% | 95.00% | 95.00% | 95.00% | 95.00% | 95.00% | 95.00% | 95.00% |
| July | 96.00% | 96.00% | 96.00% | 96.00% | 96.00% | 96.00% | 96.00% | 96.00% | 96.00% | 96.00% |
| August | 96.00% | 96.00% | 96.00% | 96.00% | 96.00% | 96.00% | 96.00% | 96.00% | 96.00% | 96.00% |
| September | 95.00% | 95.00% | 95.00% | 95.00% | 95.00% | 95.00% | 95.00% | 95.00% | 95.00% | 95.00% |
| October | 95.00% | 95.00% | 95.00% | 95.00% | 95.00% | 95.00% | 95.00% | 95.00% | 95.00% | 95.00% |
| November | 94.00% | 94.00% | 94.00% | 94.00% | 94.00% | 94.00% | 94.00% | 94.00% | 94.00% | 94.00% |
| December | 94.00% | 94.00% | 94.00% | 94.00% | 94.00% | 94.00% | 94.00% | 94.00% | 94.00% | 94.00% |

Dispatched Load

| | 2001 | 2002 | 2003 | 2004 | 2005 | 2006 | 2007 | 2008 | 2009 | 2010 |
|---|---|---|---|---|---|---|---|---|---|---|
| January | 98.00% | 98.00% | 98.00% | 98.00% | 98.00% | 98.00% | 98.00% | 98.00% | 98.00% | 98.00% |
| February | 98.00% | 98.00% | 98.00% | 98.00% | 98.00% | 98.00% | 98.00% | 98.00% | 98.00% | 98.00% |
| March | 97.00% | 97.00% | 97.00% | 97.00% | 97.00% | 97.00% | 97.00% | 97.00% | 97.00% | 97.00% |
| April | 98.00% | 98.00% | 98.00% | 98.00% | 98.00% | 98.00% | 98.00% | 98.00% | 98.00% | 98.00% |
| May | 98.00% | 98.00% | 98.00% | 98.00% | 98.00% | 98.00% | 98.00% | 98.00% | 98.00% | 98.00% |
| June | 99.00% | 99.00% | 99.00% | 99.00% | 99.00% | 99.00% | 99.00% | 99.00% | 99.00% | 99.00% |
| July | 100.00% | 100.00% | 100.00% | 100.00% | 100.00% | 100.00% | 100.00% | 100.00% | 100.00% | 100.00% |
| August | 100.00% | 100.00% | 100.00% | 100.00% | 100.00% | 100.00% | 100.00% | 100.00% | 100.00% | 100.00% |
| September | 99.00% | 99.00% | 99.00% | 99.00% | 99.00% | 99.00% | 99.00% | 99.00% | 99.00% | 99.00% |
| October | 98.00% | 98.00% | 98.00% | 98.00% | 98.00% | 98.00% | 98.00% | 98.00% | 98.00% | 98.00% |
| November | 98.00% | 98.00% | 98.00% | 98.00% | 98.00% | 98.00% | 98.00% | 98.00% | 98.00% | 98.00% |
| December | 98.00% | 98.00% | 98.00% | 98.00% | 98.00% | 98.00% | 98.00% | 98.00% | 98.00% | 98.00% |

FIG. 11

Unit 8

Percentage of Available Hours Dispatched

| | 2001 | 2002 | 2003 | 2004 | 2005 | 2006 | 2007 | 2008 | 2009 | 2010 |
|---|---|---|---|---|---|---|---|---|---|---|
| January | 93.00% | 93.00% | 93.00% | 93.00% | 93.00% | 93.00% | 93.00% | 93.00% | 93.00% | 93.00% |
| February | 93.00% | 93.00% | 93.00% | 93.00% | 93.00% | 93.00% | 93.00% | 93.00% | 93.00% | 93.00% |
| March | 94.00% | 94.00% | 94.00% | 94.00% | 94.00% | 94.00% | 94.00% | 94.00% | 94.00% | 94.00% |
| April | 94.00% | 94.00% | 94.00% | 94.00% | 94.00% | 94.00% | 94.00% | 94.00% | 94.00% | 94.00% |
| May | 95.00% | 95.00% | 95.00% | 95.00% | 95.00% | 95.00% | 95.00% | 95.00% | 95.00% | 95.00% |
| June | 95.00% | 95.00% | 95.00% | 95.00% | 95.00% | 95.00% | 95.00% | 95.00% | 95.00% | 95.00% |
| July | 96.00% | 96.00% | 96.00% | 96.00% | 96.00% | 96.00% | 96.00% | 96.00% | 96.00% | 96.00% |
| August | 96.00% | 96.00% | 96.00% | 96.00% | 96.00% | 96.00% | 96.00% | 96.00% | 96.00% | 96.00% |
| September | 95.00% | 95.00% | 95.00% | 95.00% | 95.00% | 95.00% | 95.00% | 95.00% | 95.00% | 95.00% |
| October | 95.00% | 95.00% | 95.00% | 95.00% | 95.00% | 95.00% | 95.00% | 95.00% | 95.00% | 95.00% |
| November | 94.00% | 94.00% | 94.00% | 94.00% | 94.00% | 94.00% | 94.00% | 94.00% | 94.00% | 94.00% |
| December | 94.00% | 94.00% | 94.00% | 94.00% | 94.00% | 94.00% | 94.00% | 94.00% | 94.00% | 94.00% |

Dispatched Load

| | 2001 | 2002 | 2003 | 2004 | 2005 | 2006 | 2007 | 2008 | 2009 | 2010 |
|---|---|---|---|---|---|---|---|---|---|---|
| January | 98.00% | 98.00% | 98.00% | 98.00% | 98.00% | 98.00% | 98.00% | 98.00% | 98.00% | 98.00% |
| February | 98.00% | 98.00% | 98.00% | 98.00% | 98.00% | 98.00% | 98.00% | 98.00% | 98.00% | 98.00% |
| March | 97.00% | 97.00% | 97.00% | 97.00% | 97.00% | 97.00% | 97.00% | 97.00% | 97.00% | 97.00% |
| April | 98.00% | 98.00% | 98.00% | 98.00% | 98.00% | 98.00% | 98.00% | 98.00% | 98.00% | 98.00% |
| May | 98.00% | 98.00% | 98.00% | 98.00% | 98.00% | 98.00% | 98.00% | 98.00% | 98.00% | 98.00% |
| June | 99.00% | 99.00% | 99.00% | 99.00% | 99.00% | 99.00% | 99.00% | 99.00% | 99.00% | 99.00% |
| July | 100.00% | 100.00% | 100.00% | 100.00% | 100.00% | 100.00% | 100.00% | 100.00% | 100.00% | 100.00% |
| August | 100.00% | 100.00% | 100.00% | 100.00% | 100.00% | 100.00% | 100.00% | 100.00% | 100.00% | 100.00% |
| September | 99.00% | 99.00% | 99.00% | 99.00% | 99.00% | 99.00% | 99.00% | 99.00% | 99.00% | 99.00% |
| October | 98.00% | 98.00% | 98.00% | 98.00% | 98.00% | 98.00% | 98.00% | 98.00% | 98.00% | 98.00% |
| November | 98.00% | 98.00% | 98.00% | 98.00% | 98.00% | 98.00% | 98.00% | 98.00% | 98.00% | 98.00% |
| December | 98.00% | 98.00% | 98.00% | 98.00% | 98.00% | 98.00% | 98.00% | 98.00% | 98.00% | 98.00% |

FIG. 12

Fuels Information: — 142

| ACTUAL ANALYSIS ▼ | | |
|---|---|---|

Moisture & Ash Free
- Carbon 74.66%
- Hydrogen 5.26%
- Nitrogen 1.08%
- Chlorine 0.02%
- Sulfur 1.31%
- Oxygen 18.24%

Proximate (Sulfur Free)
- Fixed Carbon 34.00%
- Volatile Matter 30.70%
- Moisture 29.80%
- Ash 5.60%

- Excess Air 20.00%
- HHV 9.500

Ash Mineral Analysis
- Silica - SIO2 31.00%
- Alumina - Al2O3 14.00%
- Titania - TI2O3 1.10%
- Ferric Oxide - Fe2O3 6.60%
- Lime - CaO 24.60%
- Magnesia - MgO 6.00%
- Potassium Oxide - K2O 0.26%
- Sodium Oxide - Na2O 1.30%
- Sulfur Trioxide - SO3 12.20%
- Phosphorous Pentoxide - P2O5 0.70%
- Undetermined 2.30%

Operational Information:

Cycle | ACTUAL CYCLE VALUES ▼ | — 144

| | Superheater Flow (#/hr) | Outlet Pressure (psig) | Outlet Temperature |
|---|---|---|---|
| Unit 1 | 2,568,331 | 2,400 | 1,000 |
| Unit 2 | | | |
| Unit 3 | | | |
| Unit 4 | | | |
| Unit 5 | | | |
| Unit 6 | | | |
| Unit 7 | | | |
| Unit 8 | | | |

Facility Equipment Information:

Flyash Control Equipment ——— 162

| | | |
|---|---|---|
| Unit 1 | BAGHOUSE | ▼ |
| Unit 2 | ESP | ▼ |
| Unit 3 | BAGHOUSE PLUS GORETEX BAGS | ▼ |
| Unit 4 | ESP | ▼ |
| Unit 5 | ESP | ▼ |
| Unit 6 | ESP | ▼ |
| Unit 7 | ESP | ▼ |
| Unit 8 | ESP | ▼ |

SO2 Control Equipment

164

| | | | | |
|---|---|---|---|---|
| Unit 1 | SCRUBBER | ▼ | LIME | ▼ |
| Unit 2 | NO SO2 EQUIPMENT | ▼ | LIME | ▼ |
| Unit 3 | DRY INJECTION | ▼ | LIME | ▼ |
| Unit 4 | NO SO2 EQUIPMENT | ▼ | LIME | ▼ |
| Unit 5 | NO SO2 EQUIPMENT | ▼ | LIME | ▼ |
| Unit 6 | NO SO2 EQUIPMENT | ▼ | LIME | ▼ |
| Unit 7 | NO SO2 EQUIPMENT | ▼ | LIME | ▼ |
| Unit 8 | NO SO2 EQUIPMENT | ▼ | LIME | ▼ |

166 — Mercury Control Equipment

| Unit | Control |
|---|---|
| Unit 1 | ACTIVATED CARBON ▼ |
| Unit 2 | NO HG CONTROL ▼ |
| Unit 3 | NO HG CONTROL ▼ |
| Unit 4 | NO HG CONTROL ▼ |
| Unit 5 | NO HG CONTROL ▼ |
| Unit 6 | NO HG CONTROL ▼ |
| Unit 7 | NO HG CONTROL ▼ |
| Unit 8 | NO HG CONTROL ▼ |

168 — NOx Control Equipment

| Unit | Control |
|---|---|
| Unit 1 | SCR ▼ |
| Unit 2 | LOW NOX BURNERS ▼ |
| Unit 3 | SNCR ▼ |
| Unit 4 | LOW NOX BURNERS ▼ |
| Unit 5 | LOW NOX BURNERS ▼ |
| Unit 6 | LOW NOX BURNERS ▼ |
| Unit 7 | LOW NOX BURNERS ▼ |
| Unit 8 | LOW NOX BURNERS ▼ |

170 — Pricing Information:

Coal Pricing
FOB Mine        $15.00
Transportation  $15.00
                $30.00

STEAM CONDITIONS:

| | Without QF Steam | | With Equiv. QF Steam | |
|---|---|---|---|---|
| Superheater Flow: | 2,568,331 | | 2,568,331 | lb/hr |
| Reheater Flow: | 2,254,665 | | 2,254,665 | lb/hr |

202 ⏞

| | Superheat | Reheat |
|---|---|---|
| Inlet Conditions: | | |
| Steam Pressure - psia | 2,470 | 639 |
| Steam Quality | 0 | |
| Water/Steam Temp. - F | 490 | 660 |
| Enthalpy | 476 | 1,325 |
| Outlet Conditions: | | |
| Steam Pressure - psia | 2,415 | 589 |
| Steam Temp. - Deg. F | 1,000 | 1,000 |
| Enthalpy | 1,460 | 1,518 |
| Heat Input | 984 | 192 |

204 ⏞

| QF HEAT LOSS | No Loss | |
|---|---|---|
| Pounds Per Hour | 0 | |
| Pressure - psia | 464,696 | |
| Temperature | 460 | |
| Degrees of SH | 50 | |
| QF Steam Enthalpy | 1243.18 | |
| FW Enthalpy | 476.14 | |
| Heat Loss - Btu's | 0 | Btu's |
| Increase in Steam - #/hr | 0 | #/hr |
| | 0.00% | |
| Equiv. Output - MW | 373 | MW |

206 ⏞ 208 ⏞

| | No Loss | Included |
|---|---|---|
| Pounds Per Year | | 0.0000E+00 |

210 ⏞

Reheat-To Superheat Ratio  0.877871661

| | MCR | Partial Load |
|---|---|---|
| .2-.55 | 0.0000 | 0.0000 |
| >.55 | 0.9589 | 0.9589 |

| PREDICTED PERFORMANCE: AVERAGE LOAD | | 100% | (MCR) | 95.00% | |
|---|---|---|---|---|---|
| FUEL | Pulverized Coal | | | | |
| TURBINE STEAM FLOW CORRECTION FACTOR | | 0.9589 | | 0.9589 | |
| EVAPORATION Superheater: | lb/hr | 2,568,331 | | 2,439,914 | |
| Reheater: | lb/hr | 2,254,665 | | 2,141,932 | |
| TEMP. AT SUPERHEATER/REHEATER OUTLET | F | 1,000 | 1,000 | 1,000 | 1,000 |
| PRES. AT SUPERHEATER/REHEATER OUTLET | psig | 2,400 | 574 | 2,400 | 574 |
| FEEDWATER TEMP. | F | 490 | | 490 | |
| GAS TEMP. LEAVING AIR HEATER | F | 275 | | 268 | |
| (uncorr.) | | | | | |
| AMBIENT AIR TEMP. | F | 80 | | 80 | |
| AIR TEMP. LEAVING THE AIR HEATER (APPROX) | F | 552 | | | |
| EXCESS AIR | pct | 20 | | 20 | |
| HEAT LOSS | | | | | LHV |
| DRY GAS | pct | 4.36% | | 4.20% | 4.20% |
| H2O & H2 IN FUEL | pct | 8.04% | | 8.02% | |
| H2O IN AIR | pct | 0.10% | | 0.10% | |
| CARBON | pct | 0.25% | | 0.24% | 0.20% |
| RADIATION | pct | 0.35% | | 0.33% | 0.33% |
| MFG. MARGIN | pct | 1.50% | | 1.43% | 1.43% |
| HEAT CREDITS | pct | -0.41% | | -0.39% | |
| BLOWDOWN | pct | 0.00% | | 0.00% | |
| TOTAL | pct | 14.19% | | 13.92% | 6.15% |
| EFFICIENCY | pct | 85.81% | | 86.08% | 93.85% |
| GROSS HEAT FIRED | MM/btu/hr | 3,554.99 | | 3,366.55 | |

FIG. 18

| | | | | tonnes/hr | |
|---|---|---|---|---|---|
| FUEL FIRED PER HOUR | lb/hr | 418,234 | | 190 | 32 |
| | TPH | 209.12 | | | 33 |
| AVERAGE LOAD CONDITION DURING AVAILABLE HOURS | % | 100.00% | | | 34 |
| AVAILABLE HOURS | | 8,256 | | | 35 |
| FUEL FIRED PER YEAR | t/yr | 1,726,472 | | | 36 |
| | | | | | 37 |
| TOTAL COMBUSTION PRODUCTS | lb/hr | 3,601,358 | | | 38 |
| | ACFM | 1,109,079 | | | 39 |
| TOTAL COMBUSTION AIR | lb/hr | 3,183,124 | | | 40 |
| | ACFM | 997,176 | | | 41 |
| | | | | | 42 |
| TOTAL ASH (100% UP) | t/hr | 11.50 | | | 43 |
| TOTAL LIMESTONE (100% UP) | t/hr | 3.10 | | | 44 |
| | t/hr | 25,586 | | | 45 |
| TOTAL FLYASH/LIMESTONE REMOVAL SYSTEM LOADING | t/hr | 14.60 | | | 46 |
| | | | | | 47 |
| FLUE GAS TO STACK | lb/hr | 3,601,358 | | | 48 |
| LUNGSTROM AIR HEATER LEAKAGE | lb/hr | 0 | | | 49 |
| | | | | | 50 |
| SOOTBLOWING STEAM | lb/hr | 0 | | | 51 |
| NET EVAPORATION | lb/hr | 2,568,331 | | | 52 |
| POUNDS STM/KW | | 6.89 | | | 53 |
| NO. OF UNITS | | 1 | | | 54 |
| | | | | | 55 |
| HEAT RATE CALCULATION (APPROX.) | | | | | 56 |
| | | | | | 57 |
| | | BTU/KW HR | | kJ/kWh | 58 |
| Gross Heat Rate (Total Plant): | BTU/KW HR | 9,543 | HHV | 10,068 | 59 |
| Net Heat Rate (Turbine Only): — 192 | BTU/KW HR | 8,824 | LHV | 9,310 | 60 |
| | | 10,098 | HHV | 10,654 | 61 |
| | | 9,338 | LHV | 9,852 | 62 |
| | | | | | 63 |
| Plant Gross Heat Rate: | | BTU/KW HR | | kJ/kWh | |
| | | 9,513 | | 10,036 | |
| | | 8,796 | | 9,280 | |
| Plant Net Heat Rate: — 194 | | 10,066 | | 10,621 | |
| | | 9,308 | | 9,820 | 64 |

| 2001 | Total Plant Costs | Unit 1 | Unit 2 | Unit 3 | Unit 4 | Unit 5 | Unit 6 | Unit 7 | Unit 8 | Total |
|---|---|---|---|---|---|---|---|---|---|---|
| Direct Labor: | | | | | | | | | | |
| Adjusted for local labor requirements yes=1, no=0 | 0 | | | | | | | | | |
| | $8,459,453 | | | | | | | | $8,459,453 | F |
| Operator's Fees & Services: | $327,939 | | | | | | | | $327,939 | F |
| Bonus Payments: | $0 | | | | | | | | $0 | F |
| Home Office Technical Support: | | | | | | | | | | |
| Percent of Annual Labor: | $0 | | | | | | | | $0 | F |
| Warranty Support: | | | | | | | | | | |
| Percent of Annual Labor: | $0 | | | | | | | | $0 | F |
| Planned Maintenance: | $4,100,334 | | | | | | | | $4,100,334 | M |
| Boiler: | | | | | | | | | | |
| Turbine: (Major Turbine Outage assumed in 1998) | | | | | | | | | | |
| APC Equipment: | | | | | | | | | | |
| Feedwater System: | | | | | | | | | | |
| BOP: | | | | | | | | | | |
| Unplanned Maintenance: | $410,033 | | | | | | | | $410,033 | M |
| 10% of Planned Maintenance: | | | | | | ←220 | | | | |
| Planned Spare Parts: | | | | | | | | | | V |
| Boiler: | $1,731,661 | | | | | | | | $1,731,661 | V |
| Turbine: | $766,330 | | | | | | | | $766,330 | V |
| APC Equipment: | $149,151 | | | | | | | | $149,151 | V |
| Feedwater System: | $62,661 | | | | | | | | $62,661 | V |
| BOP: | $176,591 | | | | | | | | $176,591 | V |
| | $2,866,394 | | | | | | | | | |

FIG. 20

| | | | | | | | |
|---|---|---|---|---|---|---|---|
| Unplanned Spare Parts: | | | | | | | |
| 10% of Planned Spares: | $288,639 | | | | | | $288,639 V |
| Employee Travel & Relocation: | $86,300 | | | | | | $86,300 F |
| Other Employee Expenses, Fees and Services: | $286,422 | | | | | | $286,422 F |
| Office/Administration expenses: | $381,973 | | | | | | $381,973 F |
| Contract Services: | | | | | | | |
| Percent of Annual Labor: | Included | | | | | | |
| Ash Disposal: | | $1,126,990 | $0 | $0 | $0 | $0 | $1,126,990 V |
| Start-up Fuel: | | $64,716 | $0 | $0 | $0 | $0 | $84,715 V |
| Consumables: | $379,977 | | | | | | $379,977 V |
| Chemicals: | $458,866 | | | | | | $458,866 V |
| Coal: | | $48,510,069 | $0 | $0 | $0 | $0 | $48,610,069 V |
| Limestone: | | $359,458 | $0 | $0 | $0 | $0 | $359,458 V |
| Purchased Power: | | $212,706 | $0 | $0 | $0 | $0 | $212,706 V |
| Equipment Rental: | $1,416,663 | | | | | | $1,416,663 V |
| Total Operating Budget   Case 4 | | | | | | | |
| Taxes   Not Included! Building Data Base | $0 | | | | | | |
| Insurance | $0 | | | | | | |
| Total Operation Costs Including Taxes and Insurance: | $0 | | | | | | $0 |
| | | | | | | | $69,780,837 |
| Gross kW generated Annually | | 2,921,795,923 | 0 | 0 | 0 | 0 | 2,921,795,923 F |
| Cost of Generation: | | | | | | | $0.0239 |

O & M Cost Summary For:
2000

|  | Fixed Costs | Variable Costs | Major Maintenance | Fuel |
|---|---|---|---|---|
| Direct Labor: | $6,459,453 | | | |
| Operator's Fees & Services: | $327,939 | | | |
| Bonus Payments: | $0 | | | |
| Home Office Technical Support: | $0 | | | |
| Warranty Support: | $0 | | | |
| Planned Maintenance: | | | $4,100,334 | |
| Power Marketing & Resource Management: | $0 | | | |
| Unplanned Maintenance: | | | $410,033 | |

Planned Spare Parts:

Boiler: $1,731,661
Turbine: $756,330
APC Equipment: $149,151
Feedwater System: $82,661
BOP: $176,591
$2,866,394

| | | | | | |
|---|---|---|---|---|---|
| Unplanned Spare Parts: | | $2,886,394 | | | |
| Employee Travel & Relocation: | $86,300 | | | | |
| Other Employee Expenses, Fees and Services: | $286,422 | | | | |
| Office/Administration expenses: | $361,973 | | | | |
| Contract Services: | Included | | | | |
| Ash Disposal: | | $1,126,990 | | | |
| Start-up Fuel: | | $84,716 | | | |
| Consumables: | | $379,977 | | | |
| Chemicals: | | $458,886 | | | |
| Coal: | | | | $46,510,069 | |
| Limestone: | | $359,458 | | | |
| Purchased Power: | | $212,706 | | | |
| Equipment Rental: | | $1,418,553 | | | |
| | 1 | | | | Total Generation Costs |
| Total Operating Budget | $9,622,066 | $7,216,116 | $4,610,068 | $4,610,068 | $69,780,637 |
| | 13.65% | 10.35% | 8.47% | 8.47% | |
| | Fixed Costs | Variable Costs | Maintenance | Maintenance | |
| | $0.0033 | $0.0026 | $0.0166 | $0.0166 | $0.0239 |

File Name: CoalPerf031601
Project Name: Sample Project

Location: USA
Operator: To Be Determined

— 240

| Facility Generation Information (per unit information) | | Unit 1 | Unit 2 | Unit 3 | Unit 4 | Unit 5 | Unit 6 | Unit 7 | Unit 8 | Total | |
|---|---|---|---|---|---|---|---|---|---|---|---|
| | | 1 | 0 | 0 | 0 | 0 | 0 | 0 | 0 | | |
| Facility Net Output: | Use typical value=1, Actual=2  1 | 352.0 | 0.0 | 0.0 | 0.0 | 0.0 | 0.0 | 0.0 | 0.0 | 352.0 | MW |
| House Load (~5.5%): | | 5.50% | 0.00% | 0.00% | 0.00% | 0.00% | 0.00% | 0.00% | 0.00% | 0.00% | |
| | House Load in MW | 20.49 | 0.00 | 0.00 | 0.00 | 0.00 | 0.00 | 0.00 | 0.00 | | MW |
| Line Losses: | | 0 | 0 | 0 | 0 | 0 | 0 | 0 | 0 | Total | MW |
| Unit Gross Output: | Total Installed Capacity in MW  373 | 373 | 0 | 0 | 0 | 0 | 0 | 0 | 0 | 373 | MW |
| Equivalent Gross | | 373 | 0 | 0 | 0 | 0 | 0 | 0 | 0 | 373 | MW |
| O&M Costs Calculated: | Based on Actual Gross Output = 1 | 1 | 1 | 1 | 1 | 1 | 1 | 1 | 1 | | |
| | Based on Equiv. Gross Output = 2 | | | | | | | | | | |
| Equiv. Increased MW Output: (Approximate) | 0 #/hr | 0 | 0 | 0 | 0 | 0 | 0 | 0 | 0 | | MW |
| | | 373 | 0 | 0 | 0 | 0 | 0 | 0 | 0 | | |
| Gross Output Used in O&M Calculations: | | 373 | 0 | 0 | 0 | 0 | 0 | 0 | 0 | | MW |
| Unit Net Heat Rate (HHV) | (Full Load Calculated Value) BTU/KW HR | 10,098 | 0 | 0 | 0 | 0 | 0 | 0 | 0 | | Btu/kWh |
| | kJ/kWh | 10,654 | 0 | 0 | 0 | 0 | 0 | 0 | 0 | | kJ/kWh |

FIG. 24

| Operational Information For: | 2001 | | Unit 1 | Unit 2 | Unit 3 | Unit 4 | Unit 5 | Unit 6 | Unit 7 | Unit 8 | Total |
|---|---|---|---|---|---|---|---|---|---|---|---|
| Base O&M Labor Costs On | Unit In Operation Yes=1, No=0 | | 1 | 0 | 0 | 0 | 0 | 0 | 0 | 0 | 1 |
| Gross Maximum Capacity | | | 373 | 0 | 0 | 0 | 0 | 0 | 0 | 0 | 373 |
| Net Maximum Capacity | | 9,867 | 352 | 0 | 0 | 0 | 0 | 0 | 0 | 0 | 352 |
| | Net Capacity Factor | | 89.53% | 0.00% | 0.00% | 0.00% | 0.00% | 0.00% | 0.00% | 0.00% | |
| | Availability Factor | | 94.25% | 0.00% | 0.00% | 0.00% | 0.00% | 0.00% | 0.00% | 0.00% | |
| Gross Generation (Actual) | Gross Generation (Actual) | | 2,921,796 | 0 | 0 | 0 | 0 | 0 | 0 | 0 | 2,921,796 |
| | Net Generation (Actual) | | 2,761,097 | 0 | 0 | 0 | 0 | 0 | 0 | 0 | 2,761,097 |
| Period Hours | | | | | | | | | | | |
| Available Hours | Per Year = 1, Per Month = 2 | 1 | 8,760 | 0 | 0 | 0 | 0 | 0 | 0 | 0 | 0 |
| Forced Outage Hours | | | 8,256 | 0 | 0 | 0 | 0 | 0 | 0 | 0 | |
| Planned Outage Hours | | | 0 | 0 | 0 | 0 | 0 | 0 | 0 | 0 | |
| Maintenance Outage Hours | | | 0 | 0 | 0 | 0 | 0 | 0 | 0 | 0 | |
| Average Load Condition (Gross) MW | | | 354 | 0 | 0 | 0 | 0 | 0 | 0 | 0 | MW |
| | % | | 89.53% | 0.00% | 0.00% | 0.00% | 0.00% | 0.00% | 0.00% | 0.00% | |
| Average Load Condition (Net) MW | | | 334 | 0 | 0 | 0 | 0 | 0 | 0 | 0 | MW |
| | | Check | 95.00% | 0.00% | 0.00% | 0.00% | 0.00% | 0.00% | 0.00% | 0.00% | |
| | | 0.9589 | | | | | | | | | |

| QF Steam For: | Unit 1 | Unit 2 | Unit 3 | Unit 4 | Unit 5 | Unit 6 | Unit 7 | Unit 8 |
|---|---|---|---|---|---|---|---|---|
| QF Steam Flow (% of MCR) | 0% | 0% | 0% | 0% | 0% | 0% | 0% | 0% |
| Pounds Per Hour (Average) | 0 | 0 | 0 | 0 | 0 | 0 | 0 | 0 |
| Pounds Per Year | 0 | 0 | 0 | 0 | 0 | 0 | 0 | 0 |
| Pressure (psig) | 450 | 450 | 450 | 450 | 450 | 450 | 450 | 450 |
| Degrees of SH (F) | 50 | 50 | 50 | 50 | 50 | 50 | 50 | 50 |
| (Input 0 for saturated steam or input actual degrees of SH) | | | | | | | | |

Cost Related Information:
Escalation Date    17-Mar-01

FIG. 25

| | | | |
|---|---|---|---|
| Escalation Rate | | 4.00% | |
| Last Major Turbine Overhaul | Input for day of the year of work | 01-May-94 | |
| Cost of Purchased Electricity | | $0.060 | |
| Location Adjustment Index | Base | | |
| | Index | | |
| CPI Composite | 99.7 | | |
| Material | 147.00 | | |
| Labor | 98.7 | 154.00 | |
| Exchange Rate (X/US$) | US$ | | |
| Cost per Ton of Fuel (Including trans.) | Coal FOB mine: | $15.00 | $/ton - FOB Mine |
| | Transportation: | $15.00 | per ton |
| | | $30.00 | per tonne |
| | | $33.07 | |
| | | 17.00 | MM Btu's/ton |
| | | $0.88 | $/MM Btu's - FOB mine |
| | | $1.76 | $/MM Btu's - Delivered |
| Disposal Cost per Ton of ASH/Scrubber Sludge | | $10.00 | |
| Disposal Cost per Ton of ASH/Scrubber Sludge | LIMESTONE 1 | | |
| | LIME 2 | 2 | |
| Lime/Limestone | | | |
| Cost per Ton Of: | Lime FOB Mine: | $0.00 | |
| | Transportation: | $0.00 | |
| | Total: | $15.00 | |
| Start-up Fuel | Oil = 1; NG = 2 | 2 | |
| | Oil Cost Per Gallon (Delivered) | $0.80 | |
| | NG Cost Per Therm | $0.50 | |
| | Transportation: | | |

Coal Pricing - Tonne Basis

| | | | | |
|---|---|---|---|---|
| 69.55 | 84.76 | 121.87% | 97.06 | 114.51% |
| 6.66 | 7.55 | 113.36% | 8.61 | 114.04% |

Ash - Tonne Basis

| | | | |
|---|---|---|---|
| 21.35 | 22.68 | 106.23% | 26.22 | 115.61% |

FIG. 26

Operator Related Information:
| | |
|---|---|
| Operator Fee | $0 |
| Operator Bonus | $0 |
| Home Office Tech Support | $0 |
| Warranty Support | $0 |
| Number of Shifts | 4 |
| Union/non-union Facility | 0 |
| Overtime | 10% |
| Wage Benefits | 40% |

— 248

Facility Equipment Information:

— 250

| | | UNIT 1 | UNIT 2 | UNIT 3 | UNIT 4 | UNIT 5 | UNIT 6 | UNIT 7 | UNIT 8 |
|---|---|---|---|---|---|---|---|---|---|
| Type of Boiler Equipment (1 or 2) | 1 PULVERIZED COAL<br>2 FLUIDIZED BED | 1 | 1 | 1 | 1 | 1 | 1 | 1 | 1 |
| Unit Design / Commercial Operation Date | | PC | PC | PC | PC | PC | PC | PC | PC |
| Number of Boilers | | 1 | 1 | 1 | 1 | 1 | 1 | 1 | 1 |
| Flyash Control System | 1 ESP<br>2 BAGHOUSE<br>3 BAGHOUSE PLUS GORETEX BAGS | 2 | 1 | 3 | 1 | 1 | 1 | 1 | 1 |
| SO2 Control System: | 1 NO SO2 EQUIPMENT<br>2 DRY INJECTION<br>3 SCRUBBER | 3 | 1 | 2 | 1 | 1 | 1 | 1 | 1 |
| Mercury Control System | | | | | | | | | |
| NOx Control System | 1 NO HG CONTROL<br>2 ACTIVATED CARBON | 2 | 1 | 1 | 1 | 1 | 1 | 1 | 1 |

FIG. 27

| | | | | | | | | | |
|---|---|---|---|---|---|---|---|---|---|
| 1 LOW NOX BURNERS | 3 | 1 | 2 | 1 | 1 | 1 | 1 | | |
| 2 SNCR | | | | | | | | | |
| 3 SCR | | | | | | | | | |
| Cooling Tower: (Yes=1; No=0) | 1 | 1 | 1 | 1 | 1 | 1 | 1 | | |
| Cycle: 1 ACTUAL CYCLE VALUES | 1 | 1 | 1 | 1 | 1 | 1 | 1 | | |
| 2 STANDARD 1800 PSIG (NON-REHEAT) | | | | | | | | | |
| 3 STANDARD 2400 PSIG (5% OP) | | | | | | | | | |
| Superheater: (~4,080,000 @ 600 MW) (Input Actual Flow Value if Available) | | | | | | | | | |
| Flow without QF heat loss | 2,568,331 | 0 | 0 | 0 | 0 | 0 | 0 | | |
| Equiv. QF Steam Increase | 0 | 0 | 0 | 0 | 0 | 0 | 0 | | |
| Total Steam Flow | 2,568,331 | 0 | 0 | 0 | 0 | 0 | 0 | | |
| Outlet Pressure | 2,400 | 0 | 0 | 0 | 0 | 0 | 0 | | psig |
| Outlet Temperature | 1,000 | 0 | 0 | 0 | 0 | 0 | 0 | | deg F |
| Reheater: ~3,770,000 @ 600 MW | | | | | | | | | |
| Flow without QF heat loss | 2,254,665 | 0 | 0 | 0 | 0 | 0 | 0 | | |
| Equiv. QF Steam Increase | 0 | 0 | 0 | 0 | 0 | 0 | 0 | | |
| Total Steam Flow | 2,254,665 | 0 | 0 | 0 | 0 | 0 | 0 | | |
| Inlet Pressure (psig) | 639 | 0 | 0 | 0 | 0 | 0 | 0 | | |
| Inlet Temperature (F) | 660 | 0 | 0 | 0 | 0 | 0 | 0 | | |
| Outlet Pressure (psig) | 574 | 0 | 0 | 0 | 0 | 0 | 0 | | psig |
| Outlet Temperature (F) | 1,000 | 0 | 0 | 0 | 0 | 0 | 0 | | psig |
| Feedwater Temperature | 490 | 0 | 0 | 0 | 0 | 0 | 0 | | |
| Stack Temperature 1 ACTUAL | 1 | | | | | | | | |
| Ambient Temperature 2 STANDARD | 275 | 0 | 0 | 0 | 0 | 0 | 0 | | |
| Spares Cost | 80 | 0 | 0 | 0 | 0 | 0 | 0 | | |
| SO2 Removal | 90% | 0% | 0% | 0% | 0% | 0% | 0% | | |
| Fuel Loss during Handling: | 3% | 0% | 0% | 0% | 0% | 0% | 0% | | |

FIG. 28

Fuels Information:

| | |
|---|---|
| ACTUAL ANALYSIS | 1 |
| STANDARD BITUMINOUS | 2 |
| STANDARD SUBBITUMINOUS | 3 |
| STANDARD LIGNITE (TEXAS) | 4 |
| STANDARD NATURAL GAS | 5 |

Selected Fuels Input: 1

Fuel Analysis:

| Ultimate Analysis | Sub-Bituminous | | Natural Gas | (Gas analysis is entered on fuels page) | |
|---|---|---|---|---|---|
| Moisture | 29.80% | | Oxygen | $O_2$ | 0.00% |
| Ash | 5.50% | | Argon | A | 0.00% |
| Carbon | 48.30% | | Carbon Dioxide | $CO_2$ | 0.00% |
| Hydrogen | 3.40% | | Nitrogen | $N_2$ | 0.00% |
| Nitrogen | 0.70% | | Hydrogen | $H_2$ | 0.00% |
| Chlorine | 0.01% | | Hydrogen Sulfide | $H_2S$ | 0.00% |
| Sulfur | 0.85% | | Methane | $CH_4$ | 0.00% |
| Oxygen | 11.80% | | Ethane | $C_2H_6$ | 0.00% |
| | 100.36% | | Propane | $C_3H_8$ | 0.00% |
| | | | n-Butane | $C_4H_{10}$ | 0.00% |
| | | | n-Propane | $C_5H_{12}$ | 0.00% |
| | | | n-Hexane | $C_6H_{14}$ | 0.00% |
| | | | Total: | | |

| | | | | | |
|---|---|---|---|---|---|
| Excess Air: | 20.00% | | Excess Air: | 10.00% | |
| HHV: | 8,500 | Btu/lb | HHV: | 0 | Btu/CF(1) |
| LHV: | 18.28 | GJ/tonne | LHV: | 0 | Btu/CF(1) |
| | | | Note 1: | (68F, 30"WG) | |

Proximate:

| | |
|---|---|
| Fixed Carbon (differential) | 33.71% |
| Volatile Matter | 30.44% |
| Sulfur | 0.85% |
| Moisture | 29.55% |
| Ash | 5.45% |
| | 100.00% |

Furnace Volume Design Parameters

| | |
|---|---:|
| Volume - Cu. Ft.: | 20,000 |
| Surface - Sq. Ft. (EPRS - Up Nose): | 200,000 |
| NHI/PA: | 1,850,000 |

Carbon Loss   0.25%

File Name: CoalPerf031601
Project Name: Sample Project

Location: USA

Operator: To Be Determined

Escalation 4.00%
Escalation Factor 1.070

| | Unit 1 | Unit 2 | Unit 3 | Unit 4 | Unit 5 | Unit 6 | Unit 7 | Unit 8 | Total Facility |
|---|---|---|---|---|---|---|---|---|---|
| Number of Equipment Sets Per Unit | 1 | 0 | 0 | 0 | 0 | 0 | 0 | 0 | 1 |
| Unit Gross Output | 373 | 0 | 0 | 0 | 0 | 0 | 0 | 0 | 373 |
| | 19-Mar-01 | | | | | | | | |
| Development Costs | | | | | | | | | |
| Internal Costs | $11,833 | $0.00 | $0.00 | $0.00 | $0.00 | $0.00 | $0.00 | $0.00 | $11,832.68 |
| Third Party Costs | $12,326 | $0.00 | $0.00 | $0.00 | $0.00 | $0.00 | $0.00 | $0.00 | $12,325.70 |
| Project Counsel | $1,578 | $0.00 | $0.00 | $0.00 | $0.00 | $0.00 | $0.00 | $0.00 | $1,577.69 |
| Development Contingency | $0 | $0.00 | $0.00 | $0.00 | $0.00 | $0.00 | $0.00 | $0.00 | $0.00 |
| Land Options | $986 | $0.00 | $0.00 | $0.00 | $0.00 | $0.00 | $0.00 | $0.00 | $986.06 |
| Pre NTP EPC Cost | $1,972 | $0.00 | $0.00 | $0.00 | $0.00 | $0.00 | $0.00 | $0.00 | $1,972.11 |
| Total Development Costs | $28,694 | $0.00 | $0.00 | $0.00 | $0.00 | $0.00 | $0.00 | $0.00 | $28,694.24 |
| Development Fee | $9,057 | $0.00 | $0.00 | $0.00 | $0.00 | $0.00 | $0.00 | $0.00 | $9,057.13 |
| Mine Acquisition Costs | $0 | $0.00 | $0.00 | $0.00 | $0.00 | $0.00 | $0.00 | $0.00 | $0.00 |
| Site Purchase | $12,076 | $0.00 | $0.00 | $0.00 | $0.00 | $0.00 | $0.00 | $0.00 | $12,076.17 |
| Development Fee/Mine Acquisitions/Site | $21,133 | $0.00 | $0.00 | $0.00 | $0.00 | $0.00 | $0.00 | $0.00 | $21,133.30 |
| Plant | | | | | | | | | |
| Boilers | | | | | | | | | |
| Headers | $4,307 | $0 | $0 | $0 | $0 | $0 | $0 | $0 | |
| Heating Surface | $21,936 | $0 | $0 | $0 | $0 | $0 | $0 | $0 | |
| Waterfall | $12,904 | $0 | $0 | $0 | $0 | $0 | $0 | $0 | |
| Steel | $16,533 | $0 | $0 | $0 | $0 | $0 | $0 | $0 | |
| Firing Equipment | $10,275 | $0 | $0 | $0 | $0 | $0 | $0 | $0 | |
| Misc. Equipment | $20,646 | $0 | $0 | $0 | $0 | $0 | $0 | $0 | |
| | $86,601 | $0.00 | $0.00 | $0.00 | $0.00 | $0.00 | $0.00 | $0.00 | $86,600.65 |

| | | | | | | | |
|---|---|---|---|---|---|---|---|
| Turbine Generators | $38,324 | $0 | $0 | $0 | $0 | $0 | $38,324.29 |
| BAGHOUSE | $7,459 | $0 | $0 | $0 | $0 | $0 | $7,459.07 |
| SCRUBBER | $37,253 | $0 | $0 | $0 | $0 | $0 | $37,252.60 |
| ACTIVATED CARBON | $419.07 | $0.00 | $0.00 | $0.00 | $0.00 | $0.00 | $419.07 |
| SCR | $37,253 | $0 | $0 | $0 | $0 | $0 | $37,252.60 |
| Circulating Water System | $1,275.65 | $0.00 | $0.00 | $0.00 | $0.00 | $0.00 | $1,275.65 |
| Electrical System & Equipment | $23,330.45 | $0.00 | $0.00 | $0.00 | $0.00 | $0.00 | $23,330.45 |
| Fuel Storage & Handling | $17,662.70 | $0.00 | $0.00 | $0.00 | $0.00 | $0.00 | $17,662.70 |
| Infrastructure | $0.00 | $0.00 | $0.00 | $0.00 | $0.00 | $0.00 | $0.00 |
| Water Treatment | $3,132.42 | $0.00 | $0.00 | $0.00 | $0.00 | $0.00 | $3,132.42 |
| Other | $39,755.15 | $0.00 | $0.00 | $0.00 | $0.00 | $0.00 | $39,755.15 |
| Misc. Insurance | $515.62 | $0.00 | $0.00 | $0.00 | $0.00 | $0.00 | $515.62 |
| Fixtures | | | | | | | |
| Boilers - not plant related | $446.53 | $0.00 | $0.00 | $0.00 | $0.00 | $0.00 | $446.53 |
| Chimneys | $3,500.06 | $0.00 | $0.00 | $0.00 | $0.00 | $0.00 | $3,500.06 |
| Cooling Towers | $20,257.85 | $0.00 | $0.00 | $0.00 | $0.00 | $0.00 | $20,257.85 |
| Coal Bunkers | $1,002.37 | $0.00 | $0.00 | $0.00 | $0.00 | $0.00 | $1,002.37 |
| Land & Buildings | | | | | | | |
| Buildings | $34,773.70 | $0.00 | $0.00 | $0.00 | $0.00 | $0.00 | $34,773.70 |
| Other | | | | | | | |
| EPC Target | $49,085.86 | $0.00 | $0.00 | $0.00 | $0.00 | $0.00 | $49,085.86 |
| Total EPC Costs | $402,046.65 | $0.00 | $0.00 | $0.00 | $0.00 | $0.00 | $402,046.65 |
| Transmission Fees During Construction | $4,021.87 | $0.00 | $0.00 | $0.00 | $0.00 | $0.00 | $4,021.87 |
| Waste Water Pipeline | $11,189.05 | $0.00 | $0.00 | $0.00 | $0.00 | $0.00 | $11,189.05 |
| Management Sevices During Construction | | | | | | | |
| General & Administrative | $15,382.48 | $0.00 | $0.00 | $0.00 | $0.00 | $0.00 | $15,382.48 |
| Professional Services | $2,760.96 | $0.00 | $0.00 | $0.00 | $0.00 | $0.00 | $2,760.96 |
| Engineering Consultants | $1,972.11 | $0.00 | $0.00 | $0.00 | $0.00 | $0.00 | $1,972.11 |
| Utilities | $0.00 | $0.00 | $0.00 | $0.00 | $0.00 | $0.00 | $0.00 |
| Owner's Mobilization G&A | $0.00 | $0.00 | $0.00 | $0.00 | $0.00 | $0.00 | $0.00 |
| Other Owner's Costs | $2,218.63 | $0.00 | $0.00 | $0.00 | $0.00 | $0.00 | $2,218.63 |
| Management Sevices Fee | $1,725.60 | $0.00 | $0.00 | $0.00 | $0.00 | $0.00 | $1,725.60 |
| Total Owner's Costs | $24,059.78 | $0.00 | $0.00 | $0.00 | $0.00 | $0.00 | $24,059.78 |

FIG. 32

|  | Unit 1 | Unit 2 | Unit 3 | Unit 4 | Unit 5 | Unit 6 | Unit 7 | Unit 8 | Total Facility |
|---|---|---|---|---|---|---|---|---|---|
| O&M Mobilization | | | | | | | | | |
| Labor | $6,606.58 | $0.00 | $0.00 | $0.00 | $0.00 | $0.00 | $0.00 | $0.00 | $8,606.58 |
| Fee | $1,015.64 | $0.00 | $0.00 | $0.00 | $0.00 | $0.00 | $0.00 | $0.00 | $1,015.64 |
| G&A | $374.70 | $0.00 | $0.00 | $0.00 | $0.00 | $0.00 | $0.00 | $0.00 | $374.70 |
| Plant Consumables | $1,356.81 | $0.00 | $0.00 | $0.00 | $0.00 | $0.00 | $0.00 | $0.00 | $1,356.81 |
| Equipment | $5,423.31 | $0.00 | $0.00 | $0.00 | $0.00 | $0.00 | $0.00 | $0.00 | $5,423.31 |
| Owners G&A | $9,663.35 | $0.00 | $0.00 | $0.00 | $0.00 | $0.00 | $0.00 | $0.00 | $9,663.35 |
|  | $24,440.39 | $0.00 | $0.00 | $0.00 | $0.00 | $0.00 | $0.00 | $0.00 | $24,440.39 |
| Infrastructure Costs | | | | | | | | | |
| Roads | $8,263.15 | $0.00 | $0.00 | $0.00 | $0.00 | $0.00 | $0.00 | $0.00 | $8,263.15 |
| Community Infrastructure | $1,054.09 | $0.00 | $0.00 | $0.00 | $0.00 | $0.00 | $0.00 | $0.00 | $1,054.09 |
| Mine Industrial Area | $5,180.74 | $0.00 | $0.00 | $0.00 | $0.00 | $0.00 | $0.00 | $0.00 | $5,180.74 |
| Construction Camp | $0.00 | $0.00 | $0.00 | $0.00 | $0.00 | $0.00 | $0.00 | $0.00 | $0.00 |
| Water Management | $1,176.37 | $0.00 | $0.00 | $0.00 | $0.00 | $0.00 | $0.00 | $0.00 | $1,176.37 |
| Total Infrastructure Costs | $15,674.85 | $0.00 | $0.00 | $0.00 | $0.00 | $0.00 | $0.00 | $0.00 | $15,674.35 |
| Owner's Contingency | | | | | | | | | |
| Power Plant EPC Costs | $40,204.67 | $0.00 | $0.00 | $0.00 | $0.00 | $0.00 | $0.00 | $0.00 | $40,204.67 |
| Transmission Costs | $0.00 | $0.00 | $0.00 | $0.00 | $0.00 | $0.00 | $0.00 | $0.00 | $0.00 |
| Electrical Interconnection | $0.00 | $0.00 | $0.00 | $0.00 | $0.00 | $0.00 | $0.00 | $0.00 | $0.00 |
| Infrastructure Costs | $1,567.44 | $0.00 | $0.00 | $0.00 | $0.00 | $0.00 | $0.00 | $0.00 | $1,567.44 |
| Total Owner's Contingency | $41,772.10 | $0.00 | $0.00 | $0.00 | $0.00 | $0.00 | $0.00 | $0.00 | $41,772.10 |
| Financing Fees/Costs | | | | | | | | | |
| Financial Advisor | $6,409.37 | $0.00 | $0.00 | $0.00 | $0.00 | $0.00 | $0.00 | $0.00 | $6,409.37 |
| Upfront Fees | $8,381.48 | $0.00 | $0.00 | $0.00 | $0.00 | $0.00 | $0.00 | $0.00 | $8,381.48 |
|  | $14,790.85 | $0.00 | $0.00 | $0.00 | $0.00 | $0.00 | $0.00 | $0.00 | $14,790.85 |

|  | Unit 1 | Unit 2 | Unit 3 | Unit 4 | Unit 5 | Unit 6 | Unit 7 | Unit 8 | Total Facility |
|---|---|---|---|---|---|---|---|---|---|
| Unit Gross Output | 373 | 0 | 0 | 0 | 0 | 0 | 0 | 0 | 373 |
| Total Cost | $587,823 | $0 | $0 | $0 | $0 | $0 | $0 | $0 | $587,823 |
| $/kW Installed | $1,578 | $0 | $0 | $0 | $0 | $0 | $0 | $0 | $197 |

FIG. 33

File Name: CoalPerf031601
Project Name: Sample Project

Location: USA

Operator: To Be Determined

| Date | Mar-01 | Mar-02 | Mar-03 | Mar-04 | Mar-05 | Mar-06 | Mar-07 | Mar-08 | Mar-09 | Mar-10 | 10 Year Average |
|---|---|---|---|---|---|---|---|---|---|---|---|
| Hours Of Operation (@end of operational year) | | | | | | | | | | | |
| Operational Year | 1 | 2 | 3 | 4 | 5 | 6 | 7 | 8 | 9 | 10 | |
| Waterwall | $258 | $1,290 | $258 | $258 | $258 | $258 | $258 | $1,290 | $258 | $258 | $464 |
| Heating Surface | $439 | $2,193 | $439 | $439 | $439 | $439 | $439 | $2,193 | $439 | $439 | $790 |
| Grates | $0 | $0 | $0 | $0 | $0 | $0 | $0 | $0 | $0 | $0 | $0 |
| Pulverizers | $0 | $1,032 | $0 | $0 | $0 | $516 | $0 | $1,032 | $0 | $258 | $310 |
| Air Pre-Heaters | $0 | $1,032 | $0 | $0 | $0 | $516 | $0 | $1,032 | $0 | $258 | $310 |
| Fuel Handling | $0 | $88 | $0 | $0 | $0 | $88 | $0 | $177 | $0 | $88 | $62 |
| Headers | $0 | $215 | $0 | $0 | $0 | $17 | $0 | $215 | $0 | $0 | $43 |
| Steel | $0 | $0 | $0 | $0 | $0 | $132 | $0 | $0 | $0 | $0 | $2 |
| Belts/Crushers | $0 | $0 | $0 | $0 | $0 | $177 | $0 | $0 | $0 | $0 | $13 |
| Casing/Refractory/Ductwork | $0 | $0 | $0 | $0 | $0 | $0 | $0 | $0 | $0 | $0 | $18 |
| Chemical Cleaning | $0 | $0 | $0 | $0 | $0 | $0 | $0 | $550 | $0 | $0 | $55 |
| | $697 | $5,851 | $697 | $697 | $697 | $2,143 | $697 | $6,489 | $697 | $1,301 | $2,066 |

| | | | | | | | | | | | |
|---|---|---|---|---|---|---|---|---|---|---|---|
| Turbine (insp/overhaul) | $0 | $1,916 | $0 | $0 | $0 | $0 | $0 | $1,916 | $0 | $0 | $383 |
| Turbine Values | $0 | $575 | $0 | $0 | $0 | $0 | $0 | $575 | $0 | $0 | $144 |
| Generator (inspections) | $0 | $766 | $0 | $0 | $0 | $0 | $0 | $766 | $0 | $0 | $153 |
| Sub-Total | $0 | $3,257 | $0 | $0 | $0 | $0 | $0 | $3,267 | $0 | $0 | $680 |
| Anion Resin | $344 | $0 | $0 | $0 | $376 | $0 | $0 | $0 | $0 | $188 | $132 |
| Cation Resin | $0 | $141 | $0 | $0 | $0 | $287 | $0 | $0 | $0 | $0 | $27 |
| MB Resin | $141 | $0 | $0 | $0 | $110 | $0 | $125 | $0 | $0 | $141 | $52 |
| Carbon Filters | $78 | $0 | $78 | $0 | $0 | $78 | $78 | $0 | $78 | $0 | $39 |
| Gravity Filters | $0 | $0 | $13 | $0 | $0 | $0 | $0 | $0 | $38 | $0 | $5 |
| Sub-Total | $564 | $141 | $91 | $485 | $0 | $78 | $125 | $611 | $116 | $329 | $264 |
| BAGHOUSE | $0 | $0 | $164 | $0 | $0 | $164 | $0 | $0 | $184 | $0 | $49 |
| SCRUBBER | $0 | $0 | $310 | $0 | $0 | $310 | $0 | $0 | $310 | $0 | $93 |
| Sub-Total | $0 | $0 | $474 | $0 | $0 | $474 | $0 | $0 | $474 | $0 | $142 |
| Electrical | $0 | $233 | $0 | $233 | $0 | $233 | $0 | $233 | $0 | $233 | $117 |
| I&C | $0 | $117 | $0 | $117 | $0 | $117 | $0 | $117 | $0 | $117 | $58 |
| Power Block | $0 | $1,916 | $0 | $0 | $0 | $0 | $0 | $1,916 | $0 | $0 | $479 |
| Ash Handling | $413 | $0 | $206 | $0 | $206 | $0 | $413 | $0 | $413 | $0 | $165 |
| General | $122 | $0 | $139 | $0 | $146 | $0 | $156 | $0 | $122 | $0 | $68 |
| Facilities/Infrastructure | $0 | $122 | $0 | $0 | $0 | $156 | $0 | $170 | $0 | $122 | $71 |
| Sub-Total | $535 | $2,387 | $346 | $489 | $1,310 | $606 | $669 | $2,436 | $535 | $472 | $968 |
| Total | $1,795 | $11,636 | $1,607 | $2,364 | $2,373 | $3,248 | $1,877 | $12,182 | $1,821 | $2,101 | $4,100 |

General Project Information:
          File Name: CoalPerf031601
          Project Name: Sample Project Location: USA Operator: To Be Determined

Operator's Fees & Service:

| | |
|---|---:|
| Operator Fee | $0 |
| Legal Services | $139,805 |
| Construction Services | $146,709 |
| Testing Services | $41,424 |
| total Fees & Services | $327,939 |

Travel:                                                                       $86,300

Misc. Employee Expenses                            $286,422

File Name: CoalPerf031601
Project Name: Sample Project

Location: USA

Operator: To Be Determined

|  | | Sample Project |
|---|---|---|
| Consumerables: | | |
| Lubricating Oils: | | $379,977 |
| Hydraulic Oil: | | |
| Solvents/Boiler Wash: | | |
| Cleaning Materials: | | |
| Welding Supplies: | | |
| Nuts/Bolts/Small Mechanical Parts: | | |
| Fuses/Light Bulb/Small Elect.Parts: | | |
| Fittings/Small I&E Parts: | | |
| Gas & Oil: | | |
| Total Oils and Lubricants | | $379,977 |
| | | |
| Chemicals: | | |
| Boiler Water: | 62.27% | $285,603 |
| Cooling Water: | 36.38% | $166,889 |
| Demin.Regen: | 1.35% | $6,194 |
| Fuel Oil: | | |
| Sanitary: | | |
| NOx: | | |
| Aqueous Ammonia: | | |
| Total Chemicals: | | $458,686 |
| Gases: | | |
| Nitrogen: | | $0 |
| Hydrogen: | | $0 |
| Oxygen/Acetylene: | | $0 |
| NOx, CO, SO2, O2 Span Gas: | | $0 |
| Total Gases: | | $0 |

FIG. 37  320

Office Supplies & Services:

| | |
|---|---:|
| Postage, Overnight Mail, etc: | $17,104 |
| Freight: | $0 |
| Telephone: | $41,038 |
| Utilities: | $9,263 |
| Dues, Subscriptions: | $70,914 |
| Advertising: | $0 |
| Camera/Film/Photo Supplies: | $0 |
| Copier/Paper/Services: | $0 |
| Offices Supplies: | $40,194 |
| General Supplies: | $0 |
| Audio Visual Equipment | $0 |
| Portable Radios/Services: | $0 |
| Drinking Water: | $0 |
| Safety Supplies: | $0 |
| Safety/Environmental Insp: | $0 |
| Instrument Service/Repair: | $0 |
| Vehicles/Service/Repair: | $165,284 |
| Insurance Autos/Trucks: | $0 |
| Lift Trucks/Service: | $0 |
| Small Tools: | $0 |
| Software for Computers: | $271 |
| Computer Hardware: | $0 |
| Building Maintenance: | $4,594 |
| Janitorial Supplies: | $0 |
| Misc. Expenses: | $13,310 |
| Uniforms: | $0 |
| Total Supplies and Services: | $361,973 |

Office Furniture/Rent:

| | |
|---|---:|
| Office Rent: | |
| Desk/Chairs/etc: | $0 |
| Lab/Shop/Cntrl. Rm. Equip: | $0 |
| Computer Lease: | $0 |
| | $0 |
| Total Office Furniture: | $0 |

File Name: CoalPerf031601
Project Name: Sample Project

Location: USA

Operator: To Be Determined

Rentals/Lease:

| | |
|---|---:|
| Tools: | $15,304 |
| Equipment: | $261,694 |
| Office: | $57,431 |
| Office Equipment: | $1,066,871 |
| Railcar: | $17,253 |
| Lease Auto/Trucks: | |
| Total Rentals: | $1,418,553 |

*Note: values align as shown in image — Office Equipment $57,431; Railcar $1,066,871; Lease Auto/Trucks $17,253.*

Planned Spare Parts:

| | |
|---|---:|
| Boiler: | $1,731,661 |
| Turbine: | $766,330 |
| APC Equipment: | $149,151 |
| Feedwater System: | $62,661 |
| BOP: | $176,591 |
| Total Spare Parts: | $2,886,394 |

File Name: CoalPerf031601
Project Name: Sample Project

Location: USA

Operator: To Be Determined

Proximate Analysis:

|  |  |
|---|---|
| FC | 33.71% |
| VM | 30.44% |
| S | 0.85% |
| M | 29.55% |
| A | 5.45% |
| Total | 100.00% |
| HHV (Btu/#) | 8,500 |

Information used in conjunction with the coal classification figure:

| BTU: | 8504.98 |
|---|---|
| Dry: | 33.70% |

Project Coal Classification:

| | 3 |
|---|---|
| Coal Type: (Calculated) | Sub-Bituminous |
| | OK |
| Hardgrove Grind. Index: | |

FIG. 40

Ash Mineral Analysis:

| | |
|---:|---:|
| Silica - SIO2 | 31.00 |
| Alumina - Al2O3 | 14.00 |
| Titania - TIO2 | 1.10 |
| Ferric Oxide - Fe2O3 | 6.50 |
| Lime - CaO | 24.60 |
| Magnesia - MgO | 6.00 |
| Potassium Oxide - K2O | 0.25 |
| Sodium Oxide - Na2O | 1.30 |
| Sulfur Trioxide - SO3 | 12.20 |
| Phosphorous Pentoxide - P2O5 | 0.70 |
| Undetermined | 2.35 |
| Total | 100.00 |

| | |
|---:|---:|
| Ash Fusion Temperature (Deg. F) | |
| Initial Deformation-Reducing (Input Data) | 2189 |
| Initial Deformation-Oxidizing (Input Data) | 2239 |

PARR Formula Relationships:

BASE/ACID RATIO:
(A range of .4-.7        0.7641
coals and results in low ash-fusibility temps)

IRON/CALCIUM RATIO:
(3-0.3 INDICATIVE        0.26
lowers the fusibility temp. of the ash)

IRON/DOLOMITE RATIO:
(Blt. type ash u:        0.21

SILICA/ALUMINA RATIO:
(above 2.8 & b           2.21

FIG. 41

Project Natural Gas Analysis:

Natural Gas Analysis:

| Natural Gas Analysis: | Percent by vol | Molecular Weight | Lb/100 Moles | Lb Constituent Per Lb Fuel | Lb Air Required for Combustion Per Lb Fuel | Lb Dry Air Per Lb Fuel | BTU's Per Constit | BTU's Per Lb Fuel | #/Cu Ft (2) | Density #/Cu Ft (2) |
|---|---|---|---|---|---|---|---|---|---|---|
| Oxygen O2 | 0.00% | 32.00 | 0.00 | #DIV/01 | 0 | #DIV/01 | 0 | #DIV/01 | 0.0846 | 0.0846 |
| Argon A | 0.00% | 0.00 | 0.00 | #DIV/01 | 0 | #DIV/01 | 0 | #DIV/01 | | |
| Carbon Dioxide CO2 | 0.00% | 44.00 | 0.00 | #DIV/01 | 0 | #DIV/01 | 0 | #DIV/01 | 0.117 | 0.117 |
| Nitrogen N2 | 0.00% | 28.08 | 0.00 | #DIV/01 | | #DIV/01 | | #DIV/01 | 0.0744 | 0.0744 |
| Hydrogen H2 | 0.00% | 2.02 | 0.00 | #DIV/01 | 34.34 | #DIV/01 | 61,095 | #DIV/01 | 0.0053 | 0.0053 |
| Hydrogen Sulfide H2S | 0.00% | 34.08 | 0.00 | #DIV/01 | 6.1 | #DIV/01 | 7,097 | #DIV/01 | 0.0911 | 0.0911 |
| Methane CH4 | 0.00% | 16.03 | 0.00 | #DIV/01 | 17.27 | #DIV/01 | 23,875 | #DIV/01 | 0.0425 | 0.0425 |
| Ethane C2H6 | 0.00% | 30.05 | 0.00 | #DIV/01 | 16.12 | #DIV/01 | 22,323 | #DIV/01 | 0.0803 | 0.0803 |
| Propane C3H8 | 0.00% | 44.06 | 0.00 | #DIV/01 | 15.7 | #DIV/01 | 21,669 | #DIV/01 | 0.1196 | 0.1196 |
| Butane C4H10 | 0.00% | 58.10 | 0.00 | #DIV/01 | 15.49 | #DIV/01 | 21,321 | #DIV/01 | 0.1582 | 0.1582 |
| Pentane C5H12 | 0.00% | 72.10 | 0.00 | #DIV/01 | 15.35 | #DIV/01 | 21,095 | #DIV/01 | 0.1904 | 0.1904 |
| Hexane C6H14 | 0.00% | 86.12 | 0.00 | #DIV/01 | | #DIV/01 | 20,966 | #DIV/01 | 0.2274 | 0.2274 |
| Total: | 0.00% | | | #DIV/01 | 0 | #DIV/01 | | #DIV/01 | | |

Molecular Weight of Fuel: 0

Flue Gas Weight:
gas/Cu. Ft. (gas) 0

GHI to GT (MMBTU) 372.8
GHI to Duct Burners 32.26
Total GHI: 405.06

HHV of Fuel (BTU/Cu. Ft.) 0
Cu. Ft. of Gas Fired / Hr #DIV/01
Lbs. of Gas Fired / Hr #DIV/01 59708
Lbs. of Air / Hr #DIV/01 7144
Total Gas Flow @ 0% EA #DIV/01 426.553952

FIG. 42

Natural Gas Heating Value Conversion Analysis:
17-Mar-01

| Natural Gas Analysis: | | Percent by vol | Btu/CF (1) | HHV Comp. Btu (68F, 14.70 psia) | HHV Comp. Btu (60F, 14.70 psia) |
|---|---|---|---|---|---|
| Oxygen | O2 | 0.00% | 0 | 0.00 | 0.00 |
| Argon | A | 0.00% | 0 | 0.00 | 0.00 |
| Carbon Dioxide | CO2 | 0.00% | 0 | 0.00 | 0.00 |
| Nitrogen | N2 | 0.00% | 0 | 0.00 | 0.00 |
| Hydrogen | H2 | 0.00% | 319.4 | 0.00 | 0.00 |
| Hydrogen Sulfide | H2S | 0.00% | 547 | 0.00 | 0.00 |
| Methane | CH4 | 0.00% | 994.7 | 0.00 | 0.00 |
| Ethane | C2H6 | 0.00% | 1742.6 | 0.00 | 0.00 |
| Propane | C3H8 | 0.00% | 2480.1 | 0.00 | 0.00 |
| Butane | C4H10 | 0.00% | 3215.6 | 0.00 | 0.00 |
| Pentane | C5H12 | 0.00% | 3950.2 | 0.00 | 0.00 |
| Hexane | C6H14 | 0.00% | 4661.236 | 0 | 0 |
| Total | | 0.00% | HHV = | 0.00 | 0.00 |

| Natural Gas Analysis: | | Percent by vol | Btu/CF (1) | LHV Comp. Btu (68F, 30"WG) | LHV Comp. Btu (60F, 30"WG) |
|---|---|---|---|---|---|
| Oxygen | O2 | 0.00% | 0 | 0.00 | 0.00 |
| Argon | A | 0.00% | 0 | 0.00 | 0.00 |
| Carbon Dioxide | CO2 | 0.00% | 0 | 0.00 | 0.00 |
| Nitrogen | N2 | 0.00% | 270 | 0.00 | 0.00 |
| Hydrogen | H2 | 0.00% | 595 | 0.00 | 0.00 |
| Hydrogen Sulfide | H2S | 0.00% | 896 | 0.00 | 0.00 |
| Methane | CH4 | 0.00% | 194.5 | 0.00 | 0.00 |
| Ethane | C2H6 | 0.00% | 2282.6 | 0.00 | 0.00 |
| Propane | C3H8 | 0.00% | 2968.7 | 0.00 | 0.00 |
| Butane | C4H10 | 0.00% | 3654 | 0.00 | 0.00 |
| Pentane | C5H12 | 0.00% | 4311.72 | 0.00 | 0.00 |
| Hexane | C6H14 | 0.00% | | 0 | 0 |
| Total | | 0.00% | LHV = | 0.00 | 0.00 |

HHV/LHV Ratio   #DIV/0!

Notes:
(1) Source Mark's Standard Handbook for Mechanical Engineers
Ninth Edition Page 4-29

FIG. 43

Southern Fuels

| | Molecular Weights | | | |
|---|---|---|---|---|
| | S | 32.064 | 1 | 32.064 |
| | O | 15.999 | 2 | 31.999 |
| | | | | 84.063 |
| | | | | 50.05% |

SO2 Offset Cost Assumption  $150.00  $/Ton

@ 1.2 lbs SO2/million BTU

| Mines | Average BTU/lb Content | Average Percent Sulfur (S%) | Average Ash Content (S%) | In Compliance (Y/N)* | 8 % allowed for Compliance | lbs SO2/MM Btu | SO2 Reduction Efficiency | lbs SO2/MM Btu | Required Offsets Tons SO2/Ton Coal Fired | Cost of Offsets $/Ton of Coal Fired |
|---|---|---|---|---|---|---|---|---|---|---|
| Bailey | 12,950 | 2.14% | 7.50% | N | 0.778% | 3.3 | 10.00% | 2.97 | 0.038462 | $5.769 |
| Colonial | 12,800 | 0.93% | 8.88% | N | 0.769% | 1.45 | 0.00% | 1.45 | 0.018560 | $2.784 |
| Whitetail | 12,800 | 1.60% | 8.25% | N | 0.769% | 2.5 | 0.00% | 2.50 | 0.032000 | $4.800 |
| Juliana | 12,900 | 1.29% | 9.75% | N | 0.775% | 2 | 0.00% | 2.00 | 0.025800 | $3.870 |
| Sawmill | 12,900 | 1.29% | 9.75% | N | 0.775% | 2 | 0.00% | 2.00 | 0.025800 | $3.870 |
| Sentenial | 12,900 | 1.29% | 9.75% | N | 0.775% | 2 | 0.00% | 2.00 | 0.025800 | $3.870 |
| Winifrede | 12,800 | 0.93% | 9.25% | N | 0.769% | 1.45 | 0.00% | 1.45 | 0.018560 | $2.784 |
| | 8,500 | 0.92% | 5.50% | N | 0.511% | 2.17 | 0.00% | 2.17 | 0.018545 | $2.767 |
| | | | | | | | | | 41907.04 | |

FIG. 44

Provided Information

Project Info. Check

| | HHV | %S | Tons Fired | BBtu | SO2 (tons) | S (tons) | %S |
|---|---|---|---|---|---|---|---|
| Unit 1 | 8,551 | 0.85% | 756,000 | 12,929 | 11,500 | 5,756 | 0.76% |
| Unit 2 | 8,551 | 0.85% | 756,000 | 12,929 | 13,510 | 6,762 | 0.89% |
| Unit 3 | 8,551 | 0.85% | 752,000 | 12,861 | 12,220 | 6,116 | 0.81% |
| | | | 2,264,000 | 38,719 | 37,230 | 18,534 | |

Project Info. Check

| | HHV | | Tons Fired | BBtu | SO2 (tons) | S (tons) | %S |
|---|---|---|---|---|---|---|---|
| Unit 1 | 8,551 | | 2,272,000 | 38,856 | 11,500 | 5,756 | 0.25% |
| Unit 2 | 8,551 | | 2,338,000 | 39,984 | 13,510 | 6,762 | 0.29% |
| | | | 4,610,000 | 78,840 | 25,010 | 12,518 | |

Calculated Information: Sub- Bituminous

| Project: | HHV | %S | Tons Fired | MMBtu | Sulfur (tons) | SO2 (tons) | #SO2/MMBtu | SO2 (1.2#/MMBtu) Allowable Tons | tons of Offset Required |
|---|---|---|---|---|---|---|---|---|---|
| Unit 1 | 8,500 | 0.85% | 1,617,002 | 27,489,039 | 13,745 | 27,481 | 2.00 | 16,493 | 10,968 |
| Unit 2 | 8,500 | 0.85% | #NUM! | #NUM! | #NUM! | #NUM! | #NUM! | #NUM! | #NUM! |
| Unit 3 | 8,500 | 0.85% | #NUM! | #NUM! | #NUM! | #NUM! | #NUM! | #NUM! | #NUM! |

FIG. 45

O & M Labor, Purchased Power And Fuel Calculations

GENERAL PROJECT INFORMATION:

File Name: CoalPerf031601
Project Name: Sample Project

Location: USA

Operator: To Be Determined

ANNUAL INFLATION RATE (to present day) 4.0%
BASE DATE 22-Aug-93
ESCALATION DATE 17-Mar-01
7.57
Part Year Esc. Factor 1.00

BASE INDEX

Being Updated  Zip Code to be used to identify location

| | MODEL | PROJECT | PROJECT ADJUSTMENT |
|---|---|---|---|
| COMPOST ADJUSTMENT | | 0 | #DIV/01 |
| MATERIAL | 99.7 | 147 | 147.44% |
| LABOR | 99.7 | 154 | 156.03% |

Number of Units 1
Total Installed MW 373
Average Unit Size 373
Multiple Unit Labor Multiplier 1.00

CAPACITY (MW):

SYSTEM: POWER BLOCK

NUMBER OF SHIFTS
4 Operations and Maintenance
1 Administration

Exchange Rate 1

LABOR SUMMARY (ADJUSTED FOR LOCATION)

FIG. 46

| | NUMBER PER SHIFT | NUMBER OF SHIFT(S) | NUMBER OF EMPLOYEES PER POSITION | HOURLY WAGE | OVERTIME (YES=1/NO=0) | OVERTIME | ANNUAL WAGE Per Employee | ANNUAL Wage with O.T. per Employee | FRINGES | ANNUAL Wage with Fringes per Employee | ANNUAL LABOR COST | |
|---|---|---|---|---|---|---|---|---|---|---|---|---|
| ADMINISTRATIVE: | | | | | | | | | | | | |
| PLANT MANAGER | 1 | 1 | 1 | N/A | 0 | 10.0% | $100,944 | $100,944 | 40% | $141,321 | $141,321 | 141,321 |
| OPERATIONS MANAGER | 1 | 1 | 1 | N/A | 0 | 10.0% | $87,485 | $87,485 | 40% | $122,478 | $122,478 | 122,478 |
| MAINTENANCE MANAGER | 1 | 1 | 1 | N/A | 0 | 10.0% | $80,755 | $80,755 | 40% | $113,057 | $113,057 | 113,057 |
| PLANT/RESULTS MANAGER | 1 | 1 | 1 | N/A | 0 | 40.0% | $74,025 | $74,025 | 40% | $103,638 | $103,638 | 103,638 |
| OFFICE MANAGER | 1 | 1 | 1 | $20.19 | 1 | 10.0% | $41,993 | $46,192 | 40% | $84,669 | $64,669 | 64,669 |
| ACCOUNTANT | 2 | 1 | 2 | $18.34 | 1 | 10.0% | $39,193 | $43,112 | 40% | $60,357 | $120,715 | 120,715 |
| ACCOUNT CLERK | 2 | 1 | 2 | $14.81 | 1 | 10.0% | $30,795 | $33,874 | 40% | $47,424 | $94,847 | 94,847 |
| SECRETARY | 3 | 1 | 3 | $13.46 | 1 | 10.0% | $27,995 | $30,795 | 40% | $43,112 | $129,337 | 129,337 |
| PLANT/RESULTS ENGINEER | 1 | 2 | 2 | N/A | 0 | 10.0% | $53,837 | $53,837 | 40% | $75,371 | $150,743 | 150,743 |
| STOCK CLERK | 2 | 4 | 9 | $14.81 | 1 | 10.0% | $30,795 | $33,874 | 40% | $47,424 | $379,389 | 379,389 |
| SUB-TOTAL | | | 22 | | | | | | | Total Admin. Labor | $1,420,192 | 1,420,192 |

| | NUMBER PER SHIFT | NUMBER OF SHIFT(S) | NUMBER OF EMPLOYEES PER POSITION | HOURLY WAGE | OVERTIME (YES=1/NO=0) | OVERTIME | ANNUAL WAGE | ANNUAL Wage with O.T. per Employee | FRINGES | ANNUAL Wage with Fringes per Employee | ANNUAL COST | |
|---|---|---|---|---|---|---|---|---|---|---|---|---|
| OPERATIONS: | | | | | | | | | | | | |
| SHIFT SUPERVISOR | 1 | 4 | 4 | N/A | 1 | 10% | $74,025 | $81,428 | 40% | $113,999 | $455,997 | 455,997 |
| CONTROL ROOM OPERATOR | 1 | 4 | 4 | N/A | 1 | 10% | $67,296 | $74,025 | 40% | $103,636 | $414,542 | 414,542 |
| CHEMIST | 1 | 4 | 4 | N/A | 1 | 10% | $60,566 | $66,623 | 40% | $93,272 | $373,088 | 373,088 |
| APC EQUIP. OPERATOR | 2 | 4 | 8 | N/A | 1 | 10% | $67,296 | $74,025 | 40% | $103,636 | $829,085 | 829,085 |
| ROVER | 1 | 4 | 4 | $21.50 | 1 | 10% | $44,792 | $49,271 | 40% | $68,980 | $275,919 | 275,919 |
| SWEEPER/OPERATOR | 1 | 4 | 4 | $17.50 | 1 | 10% | $36,394 | $40,033 | 40% | $56,046 | $224,185 | 224,185 |
| FRONT-END LOADER | 1 | 4 | 4 | $17.50 | 1 | 10% | $36,394 | $40,033 | 40% | $56,046 | $224,185 | 224,185 |
| | | | 32 | | | | | | | | | |
| MAINTENANCE: | | | | | | | | | | | | |
| MECHANICS | 1 | 4 | 4 | $32.30 | 1 | 10% | $67,188 | $73,907 | 40% | $103,407 | $413,879 | 413,879 |
| MECHANICS HELPERS | 1 | 4 | 4 | $24.23 | 1 | 10% | $50,391 | $55,430 | 40% | $77,602 | $310,409 | 310,409 |
| TRUCK DRIVERS | 1 | 4 | 4 | $18.84 | 1 | 10% | $39,193 | $43,112 | 40% | $60,357 | $241,429 | 241,429 |
| ASH/APC SLUDGE MOVER | 2 | 4 | 8 | $18.84 | 1 | 10% | $39,193 | $43,112 | 40% | $60,357 | $482,859 | 482,859 |
| APC MECHANICS | 2 | 4 | 8 | $32.30 | 1 | 10% | $67,188 | $73,907 | 40% | $103,470 | $827,756 | 827,756 |
| | | | 28 | | | | | | | | | |
| ELECTRICIANS | 1 | 4 | 4 | $32.30 | 1 | 10% | $67,188 | $73,907 | 40% | $103,470 | $413,879 | 413,879 |
| ELECTRICIANS HELPERS | 1 | 4 | 4 | $24.23 | 1 | 10% | $50,391 | $55,430 | 40% | $77,602 | $310,409 | 310,409 |
| INSTRUMENT TECH'S | 1 | 4 | 4 | $32.30 | 1 | 10% | $67,188 | $73,907 | 40% | $103,470 | $413,879 | 413,879 |
| APC I & C | 2 | 4 | 8 | $32.30 | 1 | 10% | $67,188 | $73,907 | 40% | $103,470 | $827,758 | 827,758 |
| | | | 20 | | | | | | | | | |
| SUB-TOTAL | | | 80 | | | | | | | SUB-TOTAL., O & M PLANT LABOR: | $7,039,261 | 7,039,261 |

Adjusted for local labor requirements yes=1, no=0 [ 0 ]  $0  0

TOTAL DIRECT LABOR: $87,990.76  87,990.76

TOTAL PLANT STAFF: Uncorrected $8,459,453  $62,850.54  62,850.54

AVERAGE COST PER EMPLOYEE: 102  Corrected $8,459,453

III. REPLACEMENT RESERVE

V. MISC. EXPENSES

WATER & SEWER

Not Including Building Data Base

|  | GPY | CCF | COST |  |
|---|---|---|---|---|
| WATER : | #REF1 | #REF1 | #REF1 | (1993$) |
| SEWER : | #REF1 | #REF1 | #REF1 | (1996$) |
| TOTAL WATER & SEWER |  |  | #REF1 |  |

INSURANCE

POLICIES                             APPROXIMATION
1. ALL RISK POLICY ($90 MILLION)        $205,035
   BUSINESS INTERRUPTION ($15 MILLION)   $80,406
2. THIRD PARTY LIABILITY                $250,000
3. POLLUTION LIABILITY ($1 MILLION)      $50,000
   TOTAL INSURANCE                           $0
                                              $0

PURCHASED POWER

|  | UNIT 1 | UNIT 2 | UNIT 3 | UNIT 4 | UNIT 5 | UNIT 6 | UNIT 7 | UNIT 8 |
|---|---|---|---|---|---|---|---|---|
| HOUSE LOAD | 5.50% | 0.00% | 0.00% | 0.00% | 0.00% | 0.00% | 0.00% | 0.00% |
| HOUSE LOAD-KW | 20,489 | 0 | 0 | 0 | 0 | 0 | 0 | 0 |
| HOURS PER YEAR OFF LINE | 916.8 | 0 | 0 | 0 | 0 | 0 | 0 | 0 |
| % OF HOUSE LOAD PURCHASED | 10% | 0% | 0% | 0% | 0% | 0% | 0% | 0% |
| POWER COST | 0.06 |  |  |  |  |  |  |  |
| ELECTRIC COST | $112,706 | $0 | $0 | $0 | $0 | $0 | $0 | $0 |
| DEMAND CHARGE | $100,000 | $0 | $0 | $0 | $0 | $0 | $0 | $0 |
| TOTAL ELECTRICITY COST | $212,706 | $0 | $0 | $0 | $0 | $0 | $0 | $0 |

FIG. 48

| | UNIT 1 | UNIT 2 | UNIT 3 | UNIT 4 | UNIT 5 | UNIT 6 | UNIT 7 | UNIT 8 |
|---|---|---|---|---|---|---|---|---|
| START-UP FUEL 9.484614489 | | | | | | | | |
| APPROXIMATE DAYS OFF LINE | 21 | 0 | 0 | 0 | 0 | 0 | 0 | 0 |
| NUMBER OF STARTS PER YEAR (AVG. 3 DAY Outage) | 7 | 0 | 0 | 0 | 0 | 0 | 0 | 0 |
| GROSS HEAT INPUT OF UNIT (MILLION BTU'S PER HOUR) | 3555 | #NUMI | #NUMI | #NUMI | #NUMI | #NUMI | #NUMI | #NUMI |
| GHI OF START-UP BURNERS- 15% of GHI (MILLION BTU'S PER HOUR) | 533.25 | #NUMI | #NUMI | #NUMI | #NUMI | #NUMI | #NUMI | #NUMI |
| AVERAGE LENGTH OF START-UP (HOURS) | 4 | 4 | 4 | 4 | 4 | 4 | 4 | 4 |
| HEAT INPUT FROM STARTS | 14,931 | #NUMI | #NUMI | #NUMI | #NUMI | #NUMI | #NUMI | #NUMI |
| TOTAL MILLION BTU'S REQUIRED FOR START-UP | 14,931 | #NUMI | #NUMI | #NUMI | #NUMI | #NUMI | #NUMI | #NUMI |
| NATURAL GAS REQUIRED @ $0.20 per Therm | $29,862 | | | | | | | |
| OIL REQUIRED @ $0.80 per Gallon | $84,715 | | | | | | | |
| Gallons | 105,893 | | | | | | | |

REAL ESTATE TAXES
NOT INCLUDED IN ESTIMATE

| WHEELING COST | Facility C | Facility D |
|---|---|---|
| | $1,899,240 | $3,311,600 |
| Calculated Value: | 1.75198561 | 2.603019553 |

FIG. 49

This tab is being used to adjust variations in heat rate at partial loads in the performance section of the model

| Exhaust Pressure | % Change | | TC2F Length | | | | | | |
|---|---|---|---|---|---|---|---|---|---|
| | | | EXH Pres | VWO-OP | VWO | 100% | 75% | 50% | 25% |
| 0.5 | -3.12% | 7746 | | 26 | | | | | |
| 1 | -1.22% | 7897 | 7993 | | | | | | |
| 1.5 | 0.00% | 7995 | 7995 | | | | | | |
| 2 | 0.93% | 8069 | 8032 | | | | | | |
| 2.5 | 1.68% | 8129 | 8095 | | | | | | |
| 3 | 2.33% | 8181 | 8181 | | | | | | |
| 3.5 | 2.89% | 8226 | 8275 | | | | | | |
| 4 | 3.36% | 8264 | 8376 | | | | | | |
| 4.5 | 3.80% | 8299 | 8472 | | | | | | |
| 5 | 4.20% | 8331 | 8566 | | | | | | |
| 1.0 | | | | 7993 | 8003 | 8000 | 8016 | 8227 | 9067 |
| 1.5 | | | | 7995 | 8017 | 8009 | 8073 | 8395 | 9414 |
| 2.0 | | | | 8032 | 8061 | 8059 | 8177 | 8584 | 9715 |
| 2.5 | | | | 8095 | 8132 | 8136 | 8302 | 8757 | 9986 |
| 3.0 | | | | 8181 | 8225 | 8230 | 8427 | 8917 | 10194 |
| 3.5 | | | | 8275 | 8328 | 8330 | 8543 | 9062 | 10395 |
| 4.0 | | | | 8376 | 8433 | | 8653 | 9202 | 10575 |
| 4.5 | | | | 8472 | 8532 | | 8757 | 9334 | |
| 5.0 | | | | 8566 | 8629 | | 8857 | 9460 | |

Flow Rates
Superheater 1,025,000  Reheater 900,000  Gen-KW 156,200  460
Boiler Feedwater Temperature-F: 6
Number of Feedwater Heaters:

| 0.67% | 0.72% | 0.78% | 0.83% | 0.89% | 0.94% | 1.00% | 1.06% | 1.11% | 1.17% |
|---|---|---|---|---|---|---|---|---|---|
| 60% | 65% | 70% | 75% | 80% | 85% | 90% | 95% | 100% | 105% |
| 10,301 | 10,198 | 10,114 | 10,045 | 9,988 | 9,941 | 9,902 | 9,870 | 9,844 | 9,823 |
| 9,997 | 10,030 | 10,063 | 10,096 | 10,130 | 10,163 | 10,197 | 10,231 | 10,266 | 10,300 |
| 1.030 | 1.017 | 1.005 | 0.995 | 0.986 | 0.978 | 0.971 | 0.965 | 0.959 | 0.954 |
| 1.0473717 | 1.03715267 | 1.02693365 | 1.01671462 | 1.0064956 | 0.99627657 | 0.98605755 | 0.97583852 | 0.9656195 | 0.95540047 |
| 1.62% | 1.97% | 2.13% | 2.14% | 2.04% | 1.82% | 1.52% | 1.14% | 0.70% | 0.18% |

| 60% | 65% | 70% | 75% | 80% | 85% | 90% | 95% | 100% | 105% |
|---|---|---|---|---|---|---|---|---|---|
|  |  |  | 8,133 |  |  |  |  | 8,036 | 8,010 |
|  |  |  | 8,189 |  |  |  |  | 7,955 | 7,906 |
|  |  |  | 8,210 |  |  |  |  | 7,964 | 7,911 |
|  |  |  | 8,009 |  |  |  |  | 7,872 | 7,848 |

FIG. 52

File Name: CoalPerf031601
Project Name: Sample Project

Location: USA

Operator: To Be Determined

| IE Dispatch Information: | For Reference Only | | | | | | | | |
|---|---|---|---|---|---|---|---|---|---|
| Average Capacity: | 373 | | | | | | | | |
| | 2001 | 2002 | 2003 | 2004 | 2005 | 2006 | 2007 | 2008 | 2009 |
| Capacity Factor | 83.70% | 85.00% | 71.30% | 69.60% | 67.50% | 68.10% | 67.10% | 68.00% | 67.90% |
| Calculated Capacity Factor | 89.53% | 77.10% | 87.78% | 88.03% | 87.78% | 87.78% | 87.78% | 77.34% | 87.78% |
| Availability | 90.00% | 90.00% | 90.00% | 90.00% | 90.00% | 90.00% | 90.00% | 90.00% | 90.00% |
| Average Load | 93.00% | 94.44% | 979.22% | 77.33% | 75.00% | 75.67% | 74.56% | 75.56% | 75.44% |
| Hours in Years | 8,760 | 8,760 | 8,784 | 8,760 | 8,760 | 8,760 | 8,760 | 8,760 | 8,760 |
| Hours Dispatched | 7,884 | 7,884 | 7,906 | 7,884 | 7,884 | 7,884 | 7,884 | 7,884 | 7,884 |
| Annual Output | 2,731,405 | 2,773,829 | 2,33,127 | 2,721,276 | 2,202,746 | 2,222,326 | 2,195,692 | 2,219,063 | 2,215,800 |
| Calculated Annual Output | 2,921,796 | 2,515,870 | 2,864,503 | 2,872,651 | 2,864,503 | 2,864,503 | 2,864,503 | 2,524,019 | 2,864,503 |
| Major Outages | | | | | | | | 1 | |

| Hours Available for Dispatched | 2001 | 2002 | 2003 | 2004 | 2005 | 2006 | 2007 | 2008 | 2009 |
|---|---|---|---|---|---|---|---|---|---|
| January | 744 | 744 | 744 | 744 | 744 | 744 | 744 | 744 | 744 |
| February | 672 | 672 | 672 | 672 | 672 | 672 | 672 | 672 | 672 |
| March | 240 | 240 | 240 | 240 | 240 | 240 | 240 | 240 | 240 |
| April | 720 | 720 | 720 | 720 | 720 | 720 | 720 | 720 | 720 |
| May | 744 | 744 | 744 | 744 | 744 | 744 | 744 | 744 | 744 |
| June | 720 | 720 | 720 | 720 | 720 | 720 | 720 | 720 | 720 |
| July | 744 | 744 | 744 | 744 | 744 | 744 | 744 | 744 | 744 |
| August | 744 | 744 | 744 | 744 | 744 | 744 | 744 | 744 | 744 |
| September | 720 | 720 | 720 | 720 | 720 | 720 | 720 | 720 | 720 |
| October | 744 | 0 | 744 | 744 | 744 | 744 | 744 | 0 | 744 |
| November | 720 | 456 | 720 | 720 | 720 | 720 | 720 | 456 | 720 |
| December | 744 | 744 | 744 | 744 | 744 | 744 | 744 | 744 | 744 |
| Total | 8258 | 7248 | 8258 | 8280 | 8256 | 8256 | 8256 | 8258 | 8256 |

| Hours Dispatched | 2001 | 2002 | 2003 | 2004 | 2005 | 2006 | 2007 | 2008 | 2009 |
|---|---|---|---|---|---|---|---|---|---|
| January | 744 | 692 | 692 | 692 | 692 | 692 | 692 | 692 | 692 |
| February | 672 | 625 | 625 | 647 | 625 | 625 | 625 | 647 | 625 |
| March | 240 | 226 | 226 | 226 | 226 | 226 | 226 | 226 | 226 |
| April | 720 | 677 | 677 | 677 | 677 | 677 | 677 | 677 | 677 |
| May | 744 | 707 | 707 | 707 | 707 | 707 | 707 | 707 | 707 |
| June | 720 | 684 | 684 | 684 | 684 | 684 | 684 | 684 | 684 |
| July | 744 | 714 | 714 | 714 | 714 | 714 | 714 | 714 | 714 |
| August | 744 | 714 | 714 | 714 | 714 | 714 | 714 | 714 | 714 |
| September | 720 | 684 | 684 | 684 | 684 | 684 | 684 | 684 | 684 |
| October | 744 | 0 | 707 | 707 | 707 | 707 | 707 | 0 | 707 |
| November | 720 | 429 | 677 | 677 | 429 | 677 | 677 | 429 | 677 |
| December | 744 | 699 | 699 | 699 | 699 | 699 | 699 | 699 | 699 |
| Total Hours Dispatched | 8258 | 6851 | 6851 | 7828 | 7806 | 7806 | 7806 | 6873 | 7806 |
| Percentage of Available Hours | 100.00% | 94.52% | 94.54% | 94.54% | 94.54% | 94.54% | 94.54% | 94.51% | 94.54% |
| Percentage of Annual Hours | 94.25% | 78.20% | 89.10% | 89.1% | 89.10% | 89.10% | 89.10% | 78.24% | 89.10% |
| Average Annual Load | 95.00% | 98.58% | 98.51% | 98.51% | 98.51% | 98.51% | 98.51% | 98.58% | 98.51% |

| | 2010 | 2011 | 2012 | 2013 | 2014 | 2015 | 2016 | 2017 | 2018 | 2019 | 2020 |
|---|---|---|---|---|---|---|---|---|---|---|---|
| | 67.80% | 68.20% | 67.90% | 67.00% | 67.60% | 66.60% | 67.10% | 66.60% | 67.20% | 67.30% | 67.40% |
| | 87.78% | 87.78% | 88.03% | 87.78% | 77.10% | 87.78% | 88.03% | 87.78% | 87.78% | 87.78% | 77.34% |
| | 90.00% | 90.00% | 90.00% | 90.00% | 90.00% | 90.00% | 90.00% | 90.00% | 90.00% | 90.00% | 90.00% |
| | 75.33% | 75.78% | 75.44% | 74.44% | 75.11% | 74.00% | 74.56% | 74.00% | 74.67% | 74.78% | 74.89% |
| | 8,760 | 8,784 | 8,760 | 8,760 | 8,760 | 8,784 | 8,760 | 8,760 | 8,760 | 8,784 | 8,760 |
| | 7,884 | 7,906 | 7,884 | 7,884 | 7,884 | 7,906 | 7,884 | 7,884 | 7,884 | 7,906 | 7,884 |
| | 2,212,836 | 2,231,687 | 2,215,800 | 2,186,430 | 2,206,010 | 2,179,331 | 2,189,693 | 2,173,376 | 2,192,956 | 2,202,237 | 2,199,483 |
| | 2,864,503 | 2,864,503 | 2,872,651 | 2,864,503 | 2,515,870 | 2,864,503 | 2,872,651 | 2,864,503 | 2,864,503 | 2,864,503 | 2,524,019 |

| | 2010 | 2011 | 2012 | 2013 | 2014 | 2015 | 2016 | 2017 | 2018 | 2019 | 2020 | 2021 |
|---|---|---|---|---|---|---|---|---|---|---|---|---|
| | 744 | 744 | 744 | 744 | 744 | 744 | 744 | 744 | 744 | 744 | 744 | 744 |
| | 672 | 672 | 672 | 672 | 672 | 672 | 696 | 672 | 672 | 672 | 672 | 672 |
| | 240 | 240 | 240 | 240 | 240 | 240 | 240 | 240 | 240 | 240 | 240 | 240 |
| | 720 | 720 | 720 | 720 | 720 | 720 | 720 | 720 | 720 | 720 | 720 | 720 |
| | 744 | 744 | 744 | 744 | 744 | 744 | 744 | 744 | 744 | 744 | 744 | 744 |
| | 720 | 720 | 720 | 720 | 720 | 720 | 720 | 720 | 720 | 720 | 720 | 720 |
| | 744 | 744 | 744 | 744 | 744 | 744 | 744 | 744 | 744 | 744 | 744 | 744 |
| | 744 | 744 | 744 | 744 | 744 | 744 | 744 | 744 | 744 | 744 | 744 | 744 |
| | 720 | 720 | 720 | 720 | 720 | 720 | 720 | 720 | 720 | 720 | 720 | 720 |
| | 744 | 744 | 744 | 744 | 744 | 744 | 744 | 744 | 744 | 744 | 744 | 744 |
| | 720 | 720 | 720 | 720 | 0 | 720 | 720 | 720 | 720 | 720 | 0 | 720 |
| | 744 | 744 | 744 | 744 | 456 | 744 | 744 | 744 | 744 | 744 | 456 | 744 |
| | 8256 | 8256 | 8280 | 8256 | 7248 | 8256 | 8280 | 8256 | 8256 | 8256 | 7272 | 8256 |

| | 2010 | 2011 | 2012 | 2013 | 2014 | 2002 | 2016 | 2017 | 2018 | 2019 | 2020 | 2021 |
|---|---|---|---|---|---|---|---|---|---|---|---|---|
| | 692 | 692 | 692 | 692 | 692 | 692 | 692 | 692 | 692 | 692 | 692 | 692 |
| | 625 | 625 | 647 | 625 | 625 | 625 | 647 | 625 | 625 | 625 | 647 | 625 |
| | 226 | 226 | 226 | 226 | 226 | 226 | 226 | 226 | 226 | 226 | 226 | 226 |
| | 677 | 677 | 677 | 677 | 677 | 677 | 677 | 677 | 677 | 677 | 677 | 677 |
| | 707 | 707 | 707 | 707 | 707 | 707 | 707 | 707 | 707 | 707 | 707 | 707 |
| | 684 | 684 | 684 | 684 | 684 | 684 | 684 | 684 | 684 | 684 | 684 | 684 |
| | 714 | 714 | 714 | 714 | 714 | 714 | 714 | 714 | 714 | 714 | 714 | 714 |
| | 714 | 714 | 714 | 714 | 714 | 714 | 714 | 714 | 714 | 714 | 714 | 714 |
| | 684 | 684 | 684 | 684 | 684 | 684 | 684 | 684 | 684 | 684 | 684 | 684 |
| | 707 | 707 | 707 | 707 | 707 | 707 | 707 | 707 | 707 | 707 | 707 | 707 |
| | 677 | 677 | 677 | 677 | 0 | 677 | 677 | 677 | 677 | 677 | 429 | 677 |
| | 699 | 699 | 699 | 699 | 429 | 699 | 699 | 699 | 699 | 699 | 699 | 699 |
| | 7806 | 7806 | 7828 | 7806 | 6851 | 7806 | 7828 | 7806 | 7806 | 7806 | 6873 | 7806 |
| | 94.54% | 94.54% | 94.54% | 94.54% | 94.52% | 94.54% | 94.54% | 94.54% | 94.54% | 94.54% | 94.51% | 94.54% |
| | 89.10% | 89.10% | 89.11% | 89.10% | 78.20% | 89.10% | 89.11% | 89.10% | 89.10% | 89.10% | 78.24% | 89.10% |
| | 98.51% | 98.51% | 98.51% | 98.51% | 98.58% | 98.51% | 98.51% | 98.51% | 98.51% | 98.51% | 98.58% | 98.51% |

| Unit 1 Dispatch Information: | January-01 | February-01 | March-01 | April-01 | May-01 | June-01 | July-01 |
|---|---|---|---|---|---|---|---|
| Hours Available for Dispatch | 744 | 672 | 240 | 720 | 744 | 720 | 744 |
| Percentage of Hours Dispatched | 100.00% | 100.00% | 100.00% | 100.00% | 100.00% | 100.00% | 100.00% |
| Average Dispatched Load | 95.00% | 95.00% | 95.00% | 95.00% | 95.00% | 95.00% | 95.00% |
| Fuel Fired   tons/hr | 195.86 | 195.86 | 195.86 | 195.86 | 195.86 | 195.86 | 195.86 |
| tons | 145,718 | 131,616 | 47,006 | 141,018 | 145,718 | 141,018 | 145,718 |
| Total Ash (100% up)- tons | 8,015 | 7,239 | 2,585 | 7,756 | 8,015 | 7,756 | 8,015 |
| Total Limestone (100% up)- tons | 2,160 | 1,951 | 697 | 2,090 | 2,160 | 2,090 | 2,160 |
| Total Flyash/Limestone Load- tons | 10,174 | 9,189 | 3,282 | 9,864 | 10,174 | 9,846 | 10,174 |
| Heat Rate Information: | | | | | | | |
| Gross Generation | 263,301,377 | 237,820,598 | 84,935,928 | 254,807,784 | 263,301,377 | 254,807,784 | 263,301,377 |
| Unit 1 Gross Heat Rate- BTU/kWh: | 9,408 | 9,408 | 9,408 | 9,408 | 9,408 | 9,408 | 9,408 |
| Net Generation | 248,819,801 | 224,740,465 | 80,264,452 | 240,793,356 | 248,819,801 | 240,793,356 | 248,819,801 |
| Plant Net Heat Rate- BTU/kWh: | 9,956 | 9,956 | 9,956 | 9,956 | 9,956 | 9,956 | 9,956 |

| Unit 1 Dispatch Information: | January-02 | February-02 | March-02 | April-02 | May-02 | June-02 | July-02 |
|---|---|---|---|---|---|---|---|
| Hours Available for Dispatch | 744 | 672 | 240 | 720 | 744 | 720 | 744 |
| Percentage of Hours Dispatched | 93.00% | 93.00% | 94.00% | 94.00% | 95.00% | 95.00% | 96.00% |
| Average Dispatched Load | 98.00% | 98.00% | 97.00% | 98.00% | 98.00% | 99.00% | 100.00% |
| Fuel Fired   tons/hr | 202.48 | 202.48 | 200.27 | 202.48 | 202.48 | 204.89 | 206.90 |
| tons | 140,097 | 126,539 | 45,180 | 137,035 | 143,110 | 140,006 | 147,777 |
| Total Ash (100% up)- tons | 7,705 | 6,960 | 2,485 | 7,537 | 7,871 | 7,700 | 8,128 |
| Total Limestone (100% up)- tons | 2,232 | 2,016 | 712 | 2,160 | 2,232 | 2,184 | 2,281 |
| Total Flyash/Limestone Load- tons | 9,938 | 8,976 | 3,197 | 9,697 | 10,104 | 9,884 | 10,409 |
| Heat Rate Information: | | | | | | | |
| Gross Generation | 252,603,026 | 228,157,572 | 81,520,610 | 247,083,085 | 258,035,349 | 252,259,706 | 266,072,970 |
| Unit 1 Gross Heat Rate- BTU/kWh: | 9,428 | 9,428 | 9,422 | 9,428 | 9,428 | 9,435 | 9,442 |
| Net Generation | 238,709,860 | 215,608,906 | 77,036,976 | 233,493,515 | 243,843,405 | 238,385,422 | 251,438,957 |
| Plant Net Heat Rate- BTU/kWh: | 9,977 | 9,977 | 9,970 | 9,977 | 9,977 | 9,984 | 9,991 |

FIG. 57

Unit 1 Gross Capacity: 373

| | August-01 | September-01 | October-01 | November-01 | December-01 | 2001 |
|---|---|---|---|---|---|---|
| | 744 | 720 | 744 | 720 | 744 | |
| Gross Capacity Factor: | 100.00% | 100.00% | 100.00% | 100.00% | 100.00% | 89.53% |
| | 95.00% | 95.00% | 95.00% | 95.00% | 95.00% | |
| Fuel Fired    tons/hr | 195.86 | 195.86 | 195.86 | 195.86 | 195.86 | 2,350.29 |
|              tons | 141,018 | 141,018 | 145,718 | 141,018 | 145,718 | 1,617,002 |
| Total Ash (100% up) - tons | 7,756 | 7,756 | 8,015 | 7,756 | 8,015 | 88,935 |
| Total Limestone - tons | 2,090 | 2,090 | 2,160 | 2,090 | 2,160 | 23,964 |
| Total Flyash/Limestone Load - tons | 9,846 | 9,846 | 10,174 | 9,846 | 10,174 | 112,899 |
| Gross Generation | 254,807,784 | 254,807,784 | 263,301,377 | 254,807,784 | 263,301,377 | 2,921,795,923 |
| Unit 1 Gross Heat Rate - BTU/kWh: | 9,408 | 9,408 | 9,408 | 9,408 | 9,408 | 9,408 |
| Net Generation | 240,793,356 | 240,793,356 | 248,819,801 | 240,793,356 | 248,819,801 | 2,761,097,147 |
| Plant Net Heat Rate - BTU/kWh: | 9,956 | 9,956 | 9,956 | 9,956 | 9,956 | 9,956 |

| | August-02 | September-02 | October-02 | November-02 | December-02 | 2002 |
|---|---|---|---|---|---|---|
| | 744 | 720 | 0 | 456 | 744 | |
| Gross Capacity Factor: | 96.00% | 95.00% | 95.00% | 94.00% | 94.00% | 77.10% |
| | 100.00% | 99.00% | 98.00% | 98.00% | 98.00% | |
| Fuel Fired    tons/hr | 206.90 | 204.89 | 202.48 | 202.48 | 202.48 | 2,440.77 |
|              tons | 147,777 | 140,006 | 0 | 86,789 | 141,603 | 1,395,919 |
| Total Ash (100% up) - tons | 8,128 | 7,700 | 0 | 4,773 | 7,788 | 76,776 |
| Total Limestone - tons | 2,281 | 2,184 | 0 | 1,368 | 2,232 | 21,885 |
| Total Flyash/Limestone Load - tons | 10,409 | 9,884 | #DIV/0! | 6,142 | 10,021 | 98,661 |
| Gross Generation | 266,072,970 | 252,259,706 | 0 | 156,485,954 | 255,319,188 | 2,515,870,136 |
| Unit 1 Gross Heat Rate - BTU/kWh: | 9,442 | 9,435 | #DIV/0! | 9,428 | 9,428 | 9,432 |
| Net Generation | 251,438,957 | 238,385,422 | 0 | 147,879,226 | 241,276,632 | 2,377,497,279 |
| Plant Net Heat Rate - BTU/kWh: | 9,991 | 9,934 | #DIV/0! | 9,977 | 9,977 | 9,981 |

FIG. 58

| Unit 1 Dispatch Information: | January-03 | February-03 | March-03 | April-03 | May-03 | June-03 | July-03 |
|---|---|---|---|---|---|---|---|
| Hours Available for Dispatch | 744 | 672 | 240 | 720 | 744 | 720 | 744 |
| Percentage of Hours Dispatched | 93.00% | 93.00% | 94.00% | 94.00% | 95.00% | 95.00% | 96.00% |
| Average Dispatched Load | 98.00% | 98.00% | 97.00% | 98.00% | 98.00% | 99.00% | 100.00% |
| Fuel Fired  tons/hr | 202.48 | 202.48 | 200.27 | 202.48 | 202.48 | 204.89 | 206.90 |
| tons | 140,097 | 126,539 | 45,180 | 137,035 | 143,110 | 140,006 | 147,777 |
| Total Ash (100% up)- tons | 7,705 | 6,960 | 2,485 | 7,537 | 7,871 | 7,700 | 8,128 |
| Total Limestone (100% up)- tons | 2,232 | 2,016 | 712 | 2,160 | 2,232 | 2,184 | 2,281 |
| Total Flyash/Limestone Load- tons | 9,938 | 8,976 | 3,197 | 9,697 | 10,104 | 9,884 | 10,409 |
| Heat Rate Information: | | | | | | | |
| Gross Generation | 252,603,026 | 228,157,572 | 81,520,610 | 247,083,085 | 258,035,349 | 252,259,706 | 266,072,970 |
| Unit 1 Gross Heat Rate- BTU/kWh: | 9,428 | 9,428 | 9,422 | 9,428 | 9,428 | 9,435 | 9,442 |
| Net Generation | 238,709,860 | 215,608,906 | 77,036,976 | 233,493,515 | 243,843,405 | 238,385,422 | 251,438,957 |
| Plant Net Heat Rate- BTU/kWh: | 9,977 | 9,977 | 9,970 | 9,977 | 9,977 | 9,984 | 9,991 |

| Unit 1 Dispatch Information: | January-04 | February-04 | March-04 | April-04 | May-04 | June-04 | July-04 |
|---|---|---|---|---|---|---|---|
| Hours Available for Dispatch | 744 | 696 | 240 | 720 | 744 | 720 | 744 |
| Percentage of Hours Dispatched | 93.00% | 93.00% | 94.00% | 94.00% | 95.00% | 95.00% | 96.00% |
| Average Dispatched Load | 98.00% | 98.00% | 97.00% | 98.00% | 98.00% | 99.00% | 100.00% |
| Fuel Fired  tons/hr | 202.48 | 202.48 | 200.27 | 202.48 | 202.48 | 204.89 | 206.90 |
| tons | 140,097 | 131,058 | 45,180 | 137,035 | 143,110 | 140,006 | 147,777 |
| Total Ash (100% up)- tons | 7,705 | 7,208 | 2,485 | 7,537 | 7,871 | 7,700 | 8,128 |
| Total Limestone (100% up)- tons | 2,232 | 2,088 | 712 | 2,160 | 2,232 | 2,184 | 2,281 |
| Total Flyash/Limestone Load- tons | 9,938 | 9,297 | 3,197 | 9,697 | 10,104 | 9,884 | 10,409 |
| Heat Rate Information: | | | | | | | |
| Gross Generation | 252,603,026 | 236,306,057 | 81,520,610 | 247,083,085 | 258,035,349 | 252,259,706 | 266,072,970 |
| Unit 1 Gross Heat Rate- BTU/kWh: | 9,428 | 9,428 | 9,422 | 9,428 | 9,428 | 9,435 | 9,442 |
| Net Generation | 238,709,860 | 223,309,224 | 77,036,976 | 233,493,515 | 243,843,405 | 238,385,422 | 251,438,957 |
| Plant Net Heat Rate- BTU/kWh: | 9,977 | 9,977 | 9,970 | 9,977 | 9,977 | 9,984 | 9,991 |

FIG. 59

| | August-03 | September-03 | October-03 | November-03 | December-03 | | 2003 |
|---|---|---|---|---|---|---|---|
| Gross Capacity Factor: | 744 | 720 | 744 | 720 | 744 | | 87.78% |
| | 96.00% | 95.00% | 95.00% | 94.00% | 94.00% | | |
| | 100.00% | 99.00% | 98.00% | 98.00% | 98.00% | | |
| Fuel Fired    tons/hr | 206.90 | 204.89 | 202.48 | 202.48 | 202.48 | | 2,440.77 |
| tons | 147,777 | 140,006 | 143,110 | 137,035 | 141,603 | | 1,589,275 |
| Total Ash (100% up)- tons | 8,128 | 7,700 | 7,871 | 7,537 | 7,788 | | 87,410 |
| Total Limestone- tons | 2,281 | 2,184 | 2,232 | 2,160 | 2,232 | | 24,910 |
| Total Flyash/Limestone Load- tons | 10,409 | 9,884 | 10,104 | 9,697 | 10,021 | | 112,321 |
| Gross Generation | 266,072,970 | 252,259,706 | 258,035,349 | 247,083,085 | 255,319,188 | | 2,864,502,616 |
| Unit 1 Gross Heat Rate- BTU/kWh: | 9,442 | 9,435 | 9,428 | 9,428 | 9,428 | | 9,432 |
| Net Generation | 251,438,957 | 238,385,422 | 243,843,405 | 233,493,515 | 241,276,632 | | 2,706,954,973 |
| Plant Net Heat Rate- BTU/kWh: | 9,991 | 9,934 | 9,977 | 9,977 | 9,977 | | 9,981 |

| | August-04 | September-04 | October-04 | November-04 | December-04 | | 2004 |
|---|---|---|---|---|---|---|---|
| Gross Capacity Factor: | 744 | 720 | 744 | 720 | 744 | | 88.03% |
| | 96.00% | 95.00% | 95.00% | 94.00% | 94.00% | | |
| | 100.00% | 99.00% | 98.00% | 98.00% | 98.00% | | |
| Fuel Fired    tons/hr | 206.90 | 204.89 | 202.48 | 202.48 | 202.48 | | 2,440.77 |
| tons | 147,777 | 140,006 | 143,110 | 137,035 | 141,603 | | 1,589,275 |
| Total Ash (100% up)- tons | 8,128 | 7,700 | 7,871 | 7,537 | 7,788 | | 87,410 |
| Total Limestone- tons | 2,281 | 2,184 | 2,232 | 2,160 | 2,232 | | 24,910 |
| Total Flyash/Limestone Load- tons | 10,409 | 9,884 | 10,104 | 9,697 | 10,021 | | 112,321 |
| Gross Generation | 266,072,970 | 252,259,706 | 258,035,349 | 247,083,085 | 255,319,188 | | 2,864,502,616 |
| Unit 1 Gross Heat Rate- BTU/kWh: | 9,442 | 9,435 | 9,428 | 9,428 | 9,428 | | 9,432 |
| Net Generation | 251,438,957 | 238,385,422 | 243,843,405 | 233,493,515 | 241,276,632 | | 2,706,954,973 |
| Plant Net Heat Rate- BTU/kWh: | 9,991 | 9,934 | 9,977 | 9,977 | 9,977 | | 9,981 |

FIG. 60

| Unit 1 Dispatch Information: | January-05 | February-05 | March-05 | April-05 | May-05 | June-05 | July-05 |
|---|---|---|---|---|---|---|---|
| Hours Available for Dispatch | 744 | 672 | 240 | 720 | 744 | 720 | 744 |
| Percentage of Hours Dispatched | 93.00% | 93.00% | 94.00% | 94.00% | 95.00% | 95.00% | 96.00% |
| Average Dispatched Load | 98.00% | 98.00% | 97.00% | 98.00% | 98.00% | 99.00% | 100.00% |
| Fuel Fired    tons/hr | 202.48 | 202.48 | 200.27 | 202.48 | 202.48 | 204.89 | 206.90 |
| tons | 140,097 | 126,539 | 45,180 | 137,035 | 143,110 | 140,006 | 147,777 |
| Total Ash (100% up)- tons | 7,705 | 6,960 | 2,485 | 7,537 | 7,871 | 7,700 | 8,128 |
| Total Limestone (100% up)- tons | 2,232 | 2,016 | 712 | 2,160 | 2,232 | 2,184 | 2,281 |
| Total Flyash/Limestone Load- tons | 9,938 | 8,976 | 3,197 | 9,697 | 10,104 | 9,884 | 10,409 |
| Heat Rate Information: | | | | | | | |
| Gross Generation | 252,603,026 | 228,157,572 | 81,520,610 | 247,083,085 | 258,035,349 | 252,259,706 | 266,072,970 |
| Unit 1 Gross Heat Rate- BTU/kWh: | 9,428 | 9,428 | 9,422 | 9,428 | 9,428 | 9,435 | 9,442 |
| Net Generation | 238,709,860 | 215,608,906 | 77,036,976 | 233,493,515 | 243,843,405 | 238,385,422 | 251,438,957 |
| Plant Net Heat Rate- BTU/kWh: | 9,977 | 9,977 | 9,970 | 9,977 | 9,977 | 9,984 | 9,991 |

FIG. 61

| | August-05 | September-05 | October-05 | November-05 | December-05 | | 2005 |
|---|---|---|---|---|---|---|---|
| | 744 | 720 | 744 | 720 | 744 | Gross Capacity Factor: | 87.78% |
| | 96.00% | 95.00% | 95.00% | 94.00% | 94.00% | | |
| | 100.00% | 99.00% | 98.00% | 98.00% | 98.00% | | |
| | 206.90 | 204.89 | 202.48 | 202.48 | 202.48 | Fuel Fired tons/hr | 2,440.77 |
| | 147,777 | 140,006 | 143,110 | 137,035 | 141,603 | tons | 1,589,275 |
| | 8,128 | 7,700 | 7,871 | 7,537 | 7,788 | Total Ash (100% up)- tons | 87,410 |
| | 2,281 | 2,184 | 2,232 | 2,160 | 2,232 | Total Limestone- tons | 24,910 |
| | 10,409 | 9,884 | 10,104 | 9,697 | 10,021 | Total Flyash/Limestone Load- tons | 112,321 |
| | 266,072,970 | 252,259,706 | 258,035,349 | 247,083,085 | 255,319,188 | Gross Generation | 2,864,502,616 |
| | 9,442 | 9,435 | 9,428 | 9,428 | 9,428 | Unit 1 Gross Heat Rate- BTU/kWh: | 9,432 |
| | 251,438,957 | 238,385,422 | 243,843,405 | 233,493,515 | 241,276,632 | Net Generation | 2,706,954,973 |
| | 9,991 | 9,934 | 9,977 | 9,977 | 9,977 | Plant Net Heat Rate- BTU/kWh: | 9,981 |

FIG. 62

| Assumed Tax (per ton of Carbon): | $40 |
|---|---|

| | | Sub-Bituminous |
|---|---|---|
| Facility Net Heat Rate (HHV): | BTU/KWH | 9,956 |
| HHV of Coal: | BTU/# | 8,500 |
| Percent Carbon in Coal (WT) | | 48.30% |
| Unit Capacity: | MW | 373 |
| Carbon Loss: | | 0.25% |
| Molecular Weight of Carbon | | 12.01 |
| Molecular Weight of O2 | | 32.00 |
| Price per MMBtu from Coal | | 1.11 |
| Price per Ton of Coal (delivered) | per Ton | $30.00 |
| | | |
| Net KWH Produced: | | 2,761,097,147 |
| Coal Fired | Tons | 1,617,002 |
| | | |
| Carbon in Flue Gas | Tons | 781,012 |
| CO2 | Tons | 2,861,804 |
| Fuel Cost: | Total | $48,631,344 |
| | $/kwh | $0.0176 |
| | | |
| | Carbon Tax: | $31,240,484 |
| | per KWH | $0.0113 |
| | per MMBtu | $1.14 |

Tons CO2/kWh          0.001036473

FIG. 63

METHODS AND SYSTEMS FOR THE EVALUATION OF POWER GENERATING FACILITIES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to a decision making process and, more particularly, to network-based systems and methods for the evaluation of power generating facilities.

The financial management function of a business entity is responsible for evaluating acquisition candidates, sometimes referred to as power plants or power generating facilities and to monitor the performance of existing assets. The task of evaluation requires performing detailed technical and financial analyses and using the results as the basis of making recommendations to management to acquire power generating facilities that are profitable or to report on the financial condition of a specific asset. In today's environment, the financial management function expends substantial resources in inspecting the power plants, collecting business and operational data, collecting maintenance and fuel costs, analyzing data, and making recommendations to the business entity based on short term and long term operating objectives. The analysis, in part, is based on various operating models, which in turn are driven by assumptions. Setting assumptions, identifying methodology and formulas to compute the financial metrics, and establishing consistency and reliability in every power plant evaluation could be a significant task. These tasks are also very time-consuming and are often done manually without any fixed methodology. Such tasks, therefore, take away resources of the corporation from its operations and other profitable activities.

Therefore, it would be desirable to implement systems and processes that evaluate and make recommendations regarding existing and potential power generating assets using pre-defined criteria. It would be further desirable to utilize automated databases which are web-based enabled as input into the system so that consistent up-to-date information is used in the evaluation process.

BRIEF SUMMARY OF THE INVENTION

In an exemplary embodiment, a Power Plant Revenue Prediction System (PPRPS) allows users to evaluate the operational and financial performance of a selected power generating asset by utilizing a pre-defined strategic model. The system allows both experienced and novice users to complete a detailed analysis of various power plants and to evaluate their long term financial viability. The system assists the user to perform comparisons of various facilities and make sound management decisions. The system further helps reduce costs by streamlining the internal analysis process and providing consistency in decision making process.

More specifically, the invention is a dynamic system which utilizes web and intranet-based databases along with internal databases to analyze and evaluate power generating assets utilizing a strategic decision model. The system includes a client system, a data storage device, and a server system. The system receives facility information, allocates operating expenses based on prior experience in evaluating the facility, calculates facility cost and associated return on investment, and provides various management reports that provide operational details and recommendations to management for a selected power generating asset. The system captures all facility information and provides on-line, up-to-date information upon a user request. In one exemplary embodiment, the system utilizes a Structured Query Language (SQL) server database with a client user interface front-end for administration and a web interface for standard user inputs and reports. The system includes a centralized database for use in automating documentation, monitoring and records retention activities associated with the power generating operating expenses allocation, and making strategic decisions.

In one embodiment, a method for making management recommendations on a selection or performance of a power plant asset, uses a network-based system. The method includes identifying assumptions to evaluate the power generating asset, receiving power plant facility information, and computing performance metrics of the facility based on received information and identified assumptions.

In another embodiment of the invention, a computer program is embodied on a computer readable medium for managing evaluation and selection of a power plant. The computer program includes a code segment that receives facility information and then maintains a database by adding, deleting and updating information, generates management reports based on facility information, and provides flexibility to an administrator to modify user profile information. The program further provides online help to the user by downloading a user manual on to a client device. In a specific embodiment, the computer program is capable of generating Operations Cost Summary Report, a General Information Report, a Capital Costs Summary Report, an Annual Maintenance Costs Report, a Major Maintenance Summary Report, a Fees and Services Report, a Direct Material Report, an Equipment, Rental & Spares Report, a Fuels Report, a Coal Offset Report, an O & M Labor Report, Purchased Power & Fuel Calculations Report, a Steam Correction Factor Report, a Turbine Generator Report, a Dispatch Information Report, an Annual Summary of Key Information to Analyze Potential Investment Report, a $CO_2$ Tax Calculations Report, and an Operational Cost Summary Report.

In yet another embodiment of the invention, a database includes data corresponding to Boiler Data, Feed Water Data, Balance of Plant Data, Turbine Data, and APC Equipment Data. Various data within the database is cross referenced against unique identifiers for easy retrieval and storage. The database further includes data corresponding to key assumptions and mathematical algorithms and is secured from access by unauthorized individuals.

Other embodiments of the invention utilize an Apparatus or a Computer for determining a value for one or more power generating facilities based on pre-determined assumptions that are developed from historical experience.

BRIEF DESCRIPTION OF THE DRAWINGS

FIGS. 4 through 12 are exemplary embodiments of user interfaces through which the user inputs power plant related information and provides the Percentage of Available Hours Dispatched as well as the Dispatched Load input for each Unit.

FIGS. 13 and 14 are an exemplary embodiment of a user interface.

FIGS. 15 and 16 are an exemplary embodiment of a user interface.

FIGS. 17 through 19 are an exemplary embodiment of a user report that calculates the predicted performance of each unit based on the information from the input worksheets identified in FIGS. 4 through 16.

FIGS. 20 through 23 are an exemplary embodiment of user report summarizing the fixed and variable costs for each unit based on the assumptions included in the input interfaces in FIGS. 4 through 16.

FIGS. 24 through 30 are exemplary embodiments of user reports providing overview and verification of input and design assumptions.

FIGS. 31 through 33 are an exemplary embodiment of a user report that provides the cost estimates of a new unit(s) based on the inputted information into system.

FIGS. 34 and 35 are an exemplary embodiment of a user report displaying annual summary of maintenance expenses of all units at a given time for a selected facility.

FIG. 36 is an exemplary embodiment of a user report displaying annual Operator's Fees and Services.

FIGS. 37 and 38 are an exemplary embodiment of a Direct Material Cost Summary Report displaying direct material related information.

FIG. 39 is an exemplary embodiment of an Equipment Rentals/Lease and Spares Report displaying the cost associated with Rentals, Lease and Planned Spares information.

FIGS. 40 through 43 are an exemplary embodiment of a Fuel Report providing fuel characteristics to verify that appropriate equipment has been installed.

FIGS. 44 and 45 are an exemplary embodiment of a Coal Offsets Report.

FIGS. 46 through 49 are an exemplary embodiment of an O & M Labor, Purchased Power and Start-up Fuel Calculations Report providing a staffing summary which identifies the number of employees per position along with annual labor costs.

FIGS. 50 through 54 are an exemplary embodiment of a Turbine Generation Report.

FIGS. 55 and 56 are an exemplary embodiment of a Dispatch Information Report.

FIGS. 57 through 62 are an exemplary embodiment of an Operations Report providing an annual summary of key information used in analyzing a potential investment.

FIG. 63 is an exemplary embodiment of a Carbon Tax Costs Report.

DETAILED DESCRIPTION OF THE INVENTION

Exemplary embodiments of systems and processes that facilitate integrated network-based electronic reporting and workflow process management related to a Power Plant Revenue Prediction System (PPRPS) are described below in detail. The systems and processes facilitate, for example, electronic submission of information using a client system, automated extraction of information, and web-based assessment reporting and management.

The systems and processes are not limited to the specific embodiments described herein. In addition, components of each system and each process can be practiced independent and separate from other components and processes described herein. Each component and process also can be used in combination with other components and processes.

In an exemplary embodiment, the application is implemented as a Centralized Database utilizing a Structured Query Language (SQL) with a client user interface front-end for administration and a web interface for standard user input and reports. The application is web enabled and runs on a business entity's intranet. In a further exemplary embodiment, the application is fully accessed by individuals having authorized access outside the firewall of the business entity through the Internet. In another exemplary embodiment, the application is run in a Windows NT environment or simply on a stand alone computer system. In yet another exemplary embodiment, the application is practiced by simply utilizing spreadsheet software or even through manual process steps. The application is flexible and designed to run in various different environments without compromising any major functionality.

Figure 1:
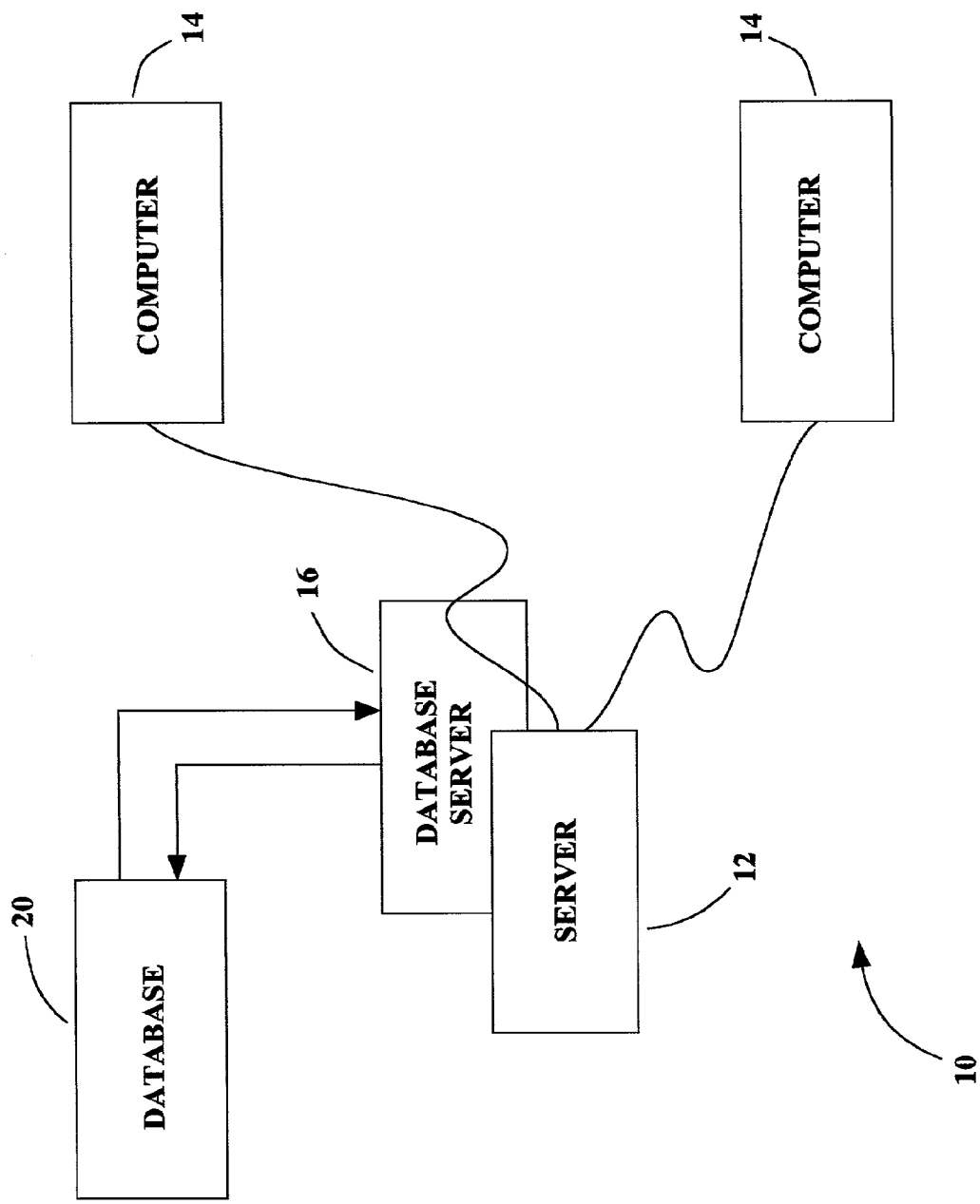
FIG. 1 is a block diagram of a Power Plant Revenue Prediction System (PPRPS).

FIG. 1 is a block diagram of PPRPS 10 that includes a server sub-system 12, sometimes referred to herein as server 12, and a plurality of customer devices 14 connected to server 12. Computerized modeling and grouping tools, as described below in more detail, are stored in server 12 and can be accessed by a requester at any one of computers 14. In one embodiment, devices 14 are computers including a web browser, and server 12 is accessible to devices 14 via a network such as an intranet or a wide area network such as the Internet. In an alternative embodiment, devices 14 are servers for a network of customer devices. Customer device 14 could also be any client system capable of interconnecting to the Internet including a web based digital assistant, a web-based phone or other web-based connectable equipment. In another embodiment, server 12 is configured to accept information over a telephone, for example, at least one of a voice responsive system where a user enters spoken data, or by a menu system where a user enters a data request using the touch keys of a telephone as prompted by server 12.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone or other web-based connectable equipment. Server 12 includes a database server 16 connected to a centralized database 20. In one embodiment, centralized database 20 is stored on database server 16 and is accessed by potential customers at one of customer devices 14 by logging onto server sub-system 12 through one of customer devices 14. In an alternative embodiment, centralized database 20 is stored remotely from server 12.

Figure 2:
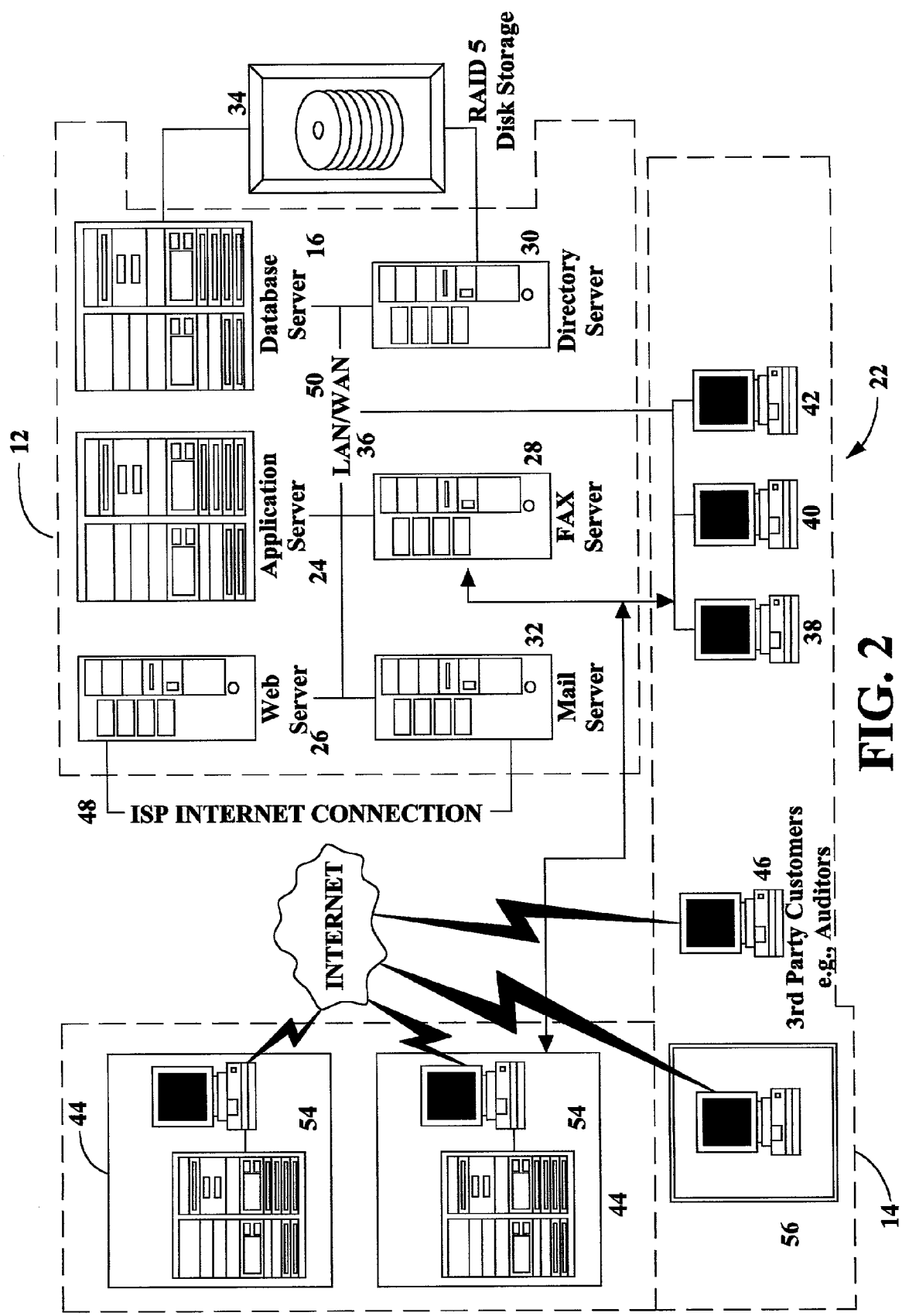
FIG. 2 is an expanded version of a block diagram of an exemplary embodiment of a server architecture of a PPRPS 22.

FIG. 2 is an expanded version block diagram of an exemplary embodiment of a server architecture of a PPRPS 22. PPRPS 22 is implemented for the complex environment. Components in PPRPS 22, identical to components of system 10 (shown in FIG. 1), are identified in FIG. 2 using the same reference numerals used in FIG. 1. PPRPS 22 includes server sub-system 12 and customer devices 14.

Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator work station 38, a work station 40, and a supervisor work station 42 are coupled to LAN 36. Alternatively, work stations 38, 40, and 42 are coupled to LAN 36 via an Internet link or are connected through an intranet.

Each work station 38, 40, and 42 is a personal computer including a web browser. Although the functions performed at the work stations typically are illustrated as being performed at respective work stations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server sub-system 12 is configured to be communicatively coupled to various individuals or employees 44 and to third parties, e.g., a customer 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any employee 44 or customer 46 having a work station 52 can access server subsystem 12. One of customer devices 14 includes a work station 54 located at a remote location. Work stations 52 and 54 are personal computers including a web browser. Also, work stations 52 and 54 are configured to communicate with server sub-system 12. Furthermore, fax server 28 communicates with employees 44 and customers 46 located outside the business entity and any of the remotely located customer systems, including a customer system 56 via a telephone link. Fax server 28 is configured to communicate with other work stations 38, 40, and 42 as well.

The systems described in FIGS. 1 and 2 are configured to implement a methodology to determine revenues likely to be generated by one or more power plants, based upon actual historical operations and cost data and predicted operations and cost data. By determining a likely revenue stream, a value can be placed on the power plants for potential purchasers, and for those who are desiring to borrow against equity in the power plants.

Figure 3:
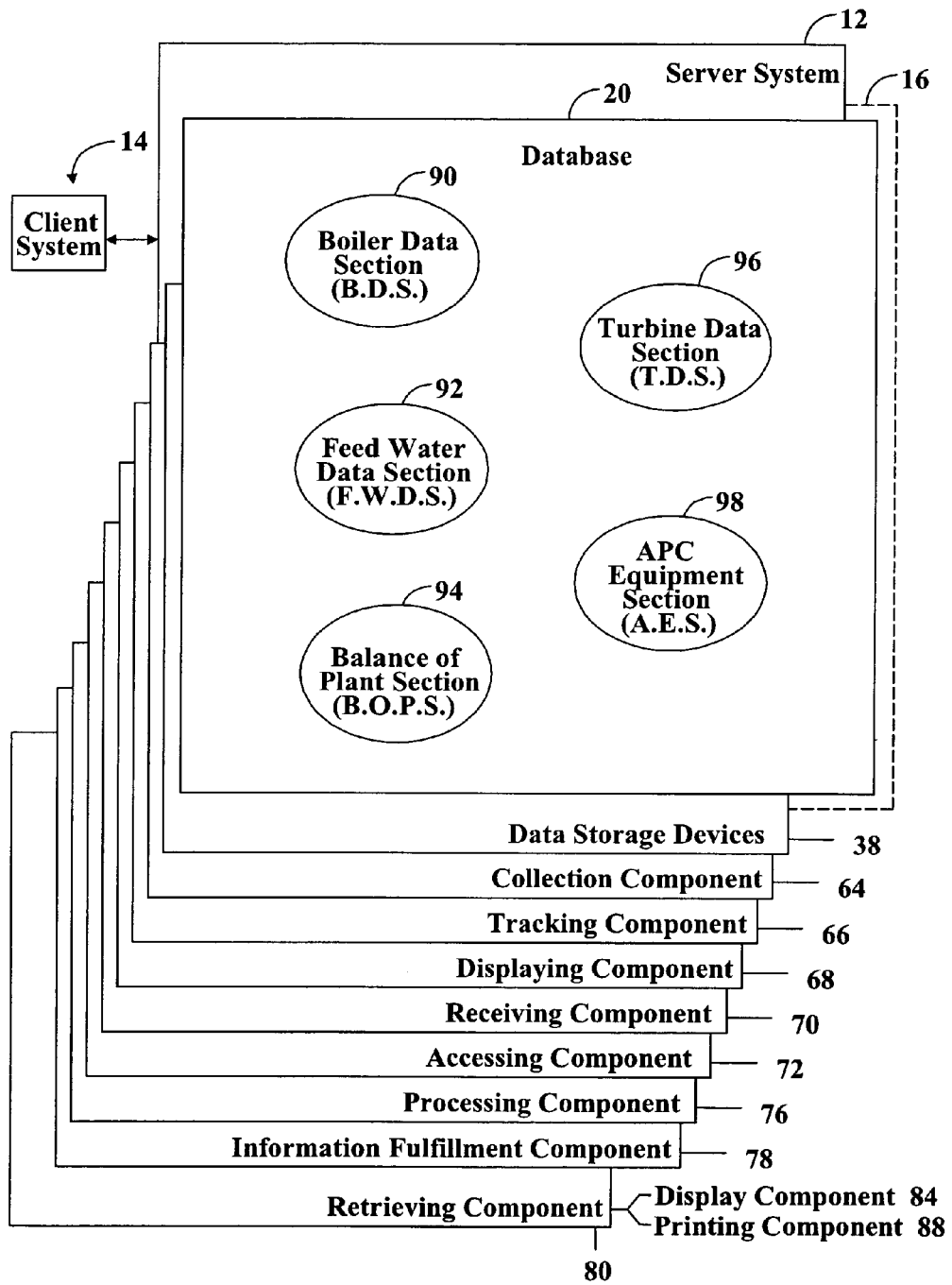
FIG. 3 shows a configuration of the database within the database server of the server system shown in FIG. 1.

FIG. 3 shows a configuration of database 20 within database server 16 of server system 12 shown in FIG. 1. Database 20 is coupled to several separate components within server system 12. These separate components perform specific tasks as required to achieve the system functionality.

Server system 12 includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Receiving component 70 is programmed for receiving a specific query from one of a plurality of users. Server system 12 further includes a processing component 76 for searching and processing received queries against data storage device 34 containing a variety of information collected by collection component 64. An information fulfillment component 78, located in server system 12, downloads the requested information to the plurality of users in the order in which the requests were received by receiving component 70. Information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 further includes a display component 84 configured to download information to be displayed on a client system's graphical user interface and a printing component 88 configured to print information. Retrieving component 80 generates various reports requested by the user through client system 14 in a predetermined format. System 10 is flexible to provide alternative reports and is not constrained to the options set forth above.

In an exemplary embodiment, database 20 is divided into a Boiler Data Section (BDS) 90, a Feed Water Data Section (FWDS) 92, a Balance of Plant Section (BOPS) 94, a Turbine Data Section (TDS) 96, and an APC Equipment Section (AES) 98. Sections 90, 92, 94, 96 and 98 within database 20 are interconnected to update and retrieve the information as required. Each Section is further divided into several individualized sub-sections to store data in various different categories. In yet another exemplary embodiment, customized sections are developed using key evaluation metrics.

The architecture of system 10 as well as various components of system 10 are exemplary only. Other architectures are possible and can be utilized in connection with practicing the processes described below.

Figure 4:
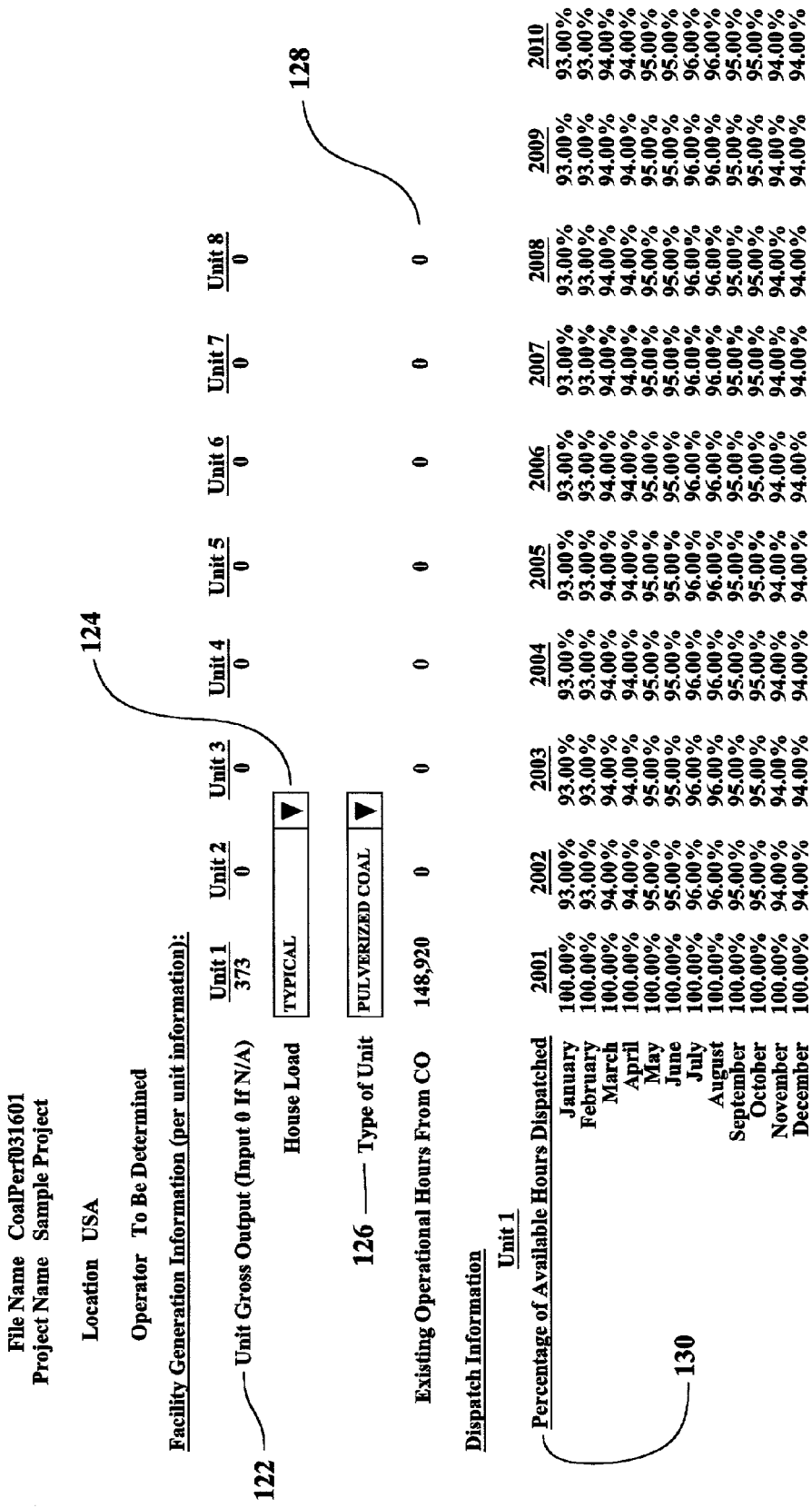
Figure 5:
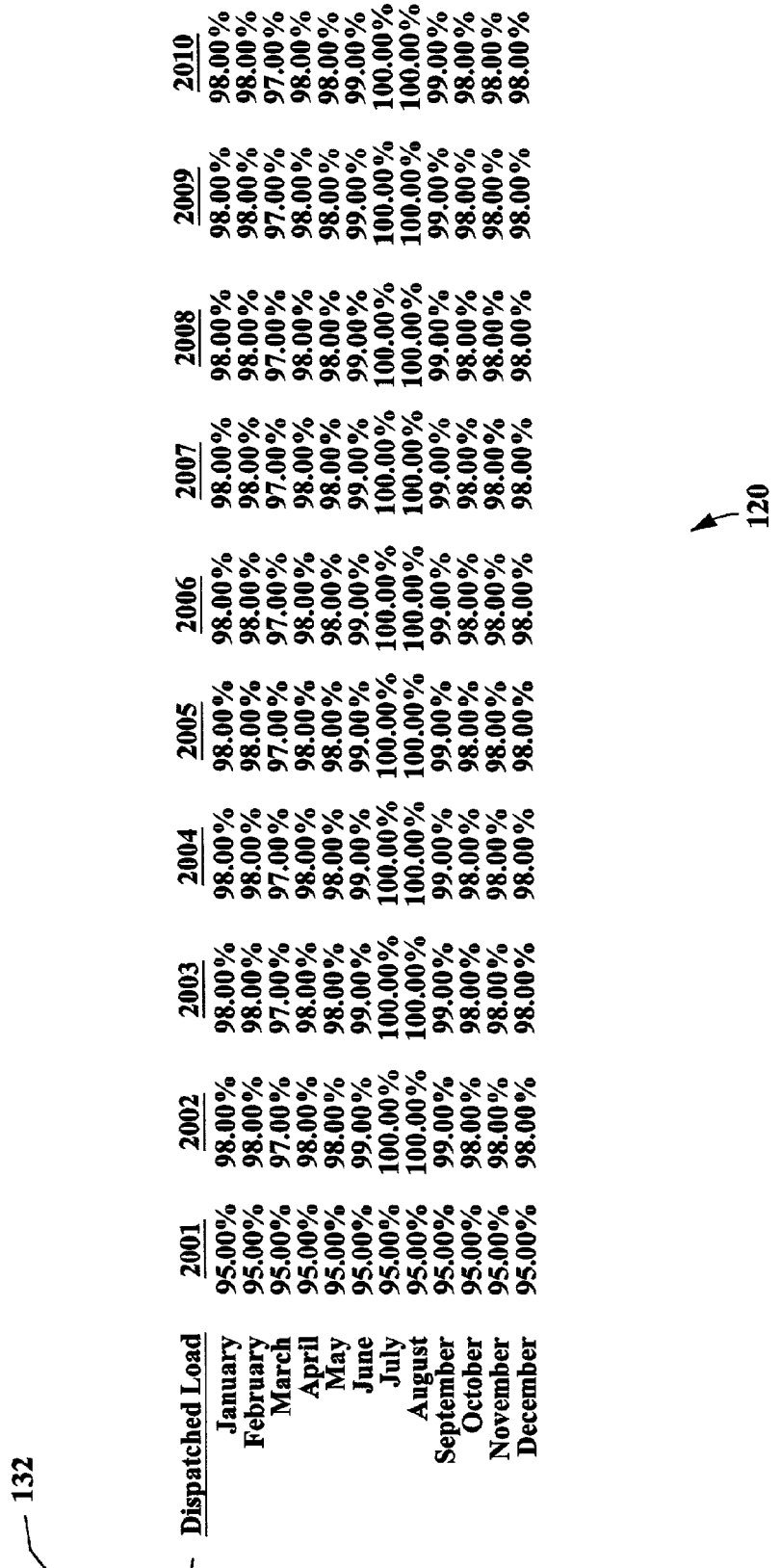

FIGS. 4 through 16 are exemplary embodiments of user interfaces utilized in inputting power plant related information for up to eight units at one site location. Specific information required includes unit gross capacity, number of hours that the unit has operated since the Commercial Operation (CO) date, the number of hours that the unit will be available for operation, and the anticipated load that the unit will be dispatched. Through a user interface 120 shown in FIGS. 4 and 5, the user inputs a Unit Gross Output 122 and a House Load 124. Unit Gross Output 122 is the full load Maximum Continuous Rating (MCR) of each Unit. House Load 124 is the percentage of the units' gross output 122 that will be internally consumed in operating internal components. An option is provided to the user to select a typical value stored in database 20, which is automatically adjusted for the type of equipment 126, a Flyash Control Equipment, a $SO_2$ Control Equipment, a Mercury Control Equipment, or a NO Control Equipment (Shown in FIGS. 15 and 16 below), that is selected, or the actual values. The user also inputs Existing Operational Hours 128, Percentage of Available Hours Dispatched 130 and Dispatched Load 132. Existing Operational Hours 128 are the actual hours of operation since the installation of the unit. Percentage of Available Hours Dispatched 130 is the percentage of hours that the units will be available for dispatch. Dispatched Load 132 is the anticipated average load at which the units will be operating when dispatched.

FIGS. 6 through 12 are exemplary embodiments of user interfaces utilized in inputting power plant related information when there is more than one unit at a given site location.

Figure 14:
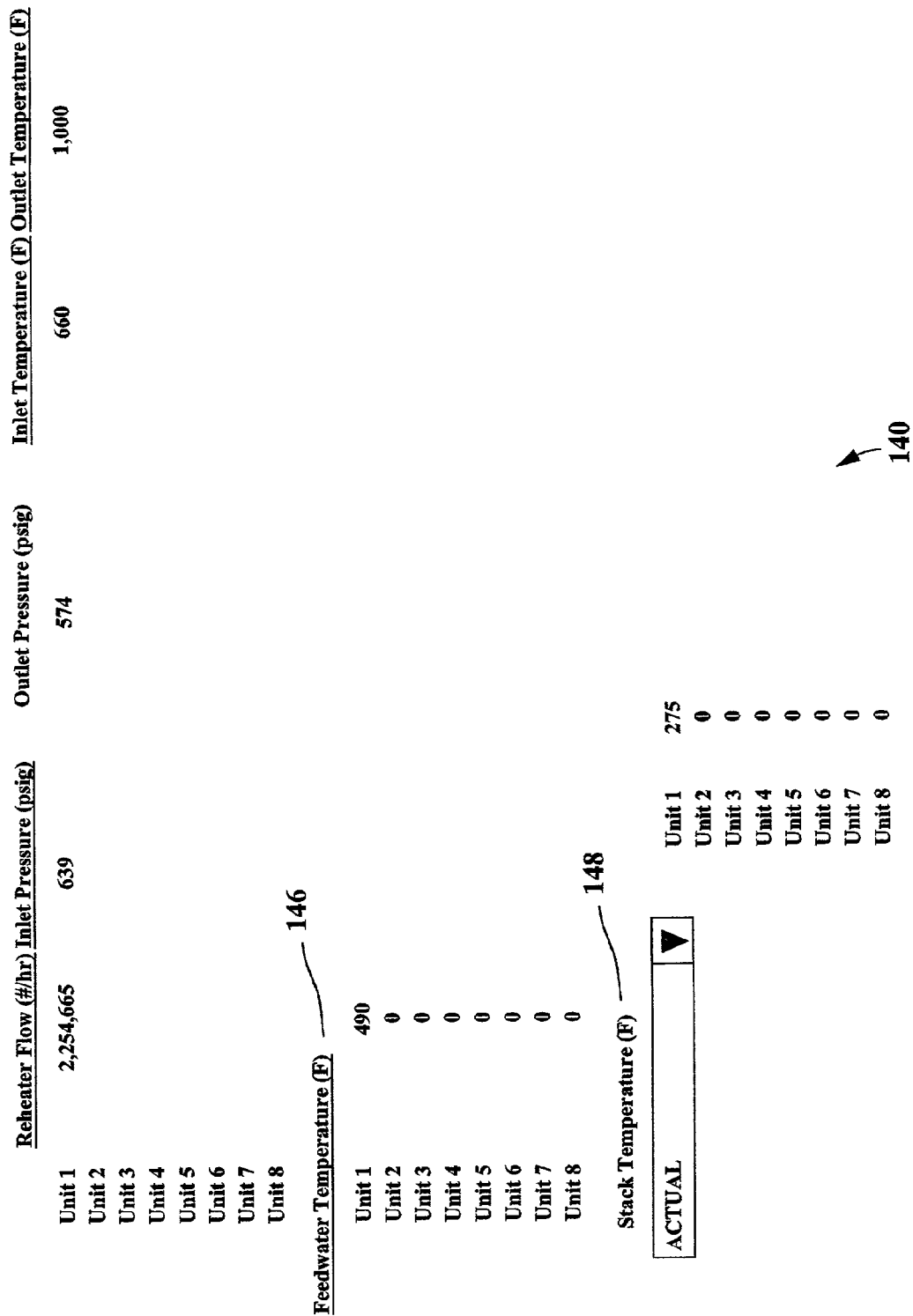
Figure 50:
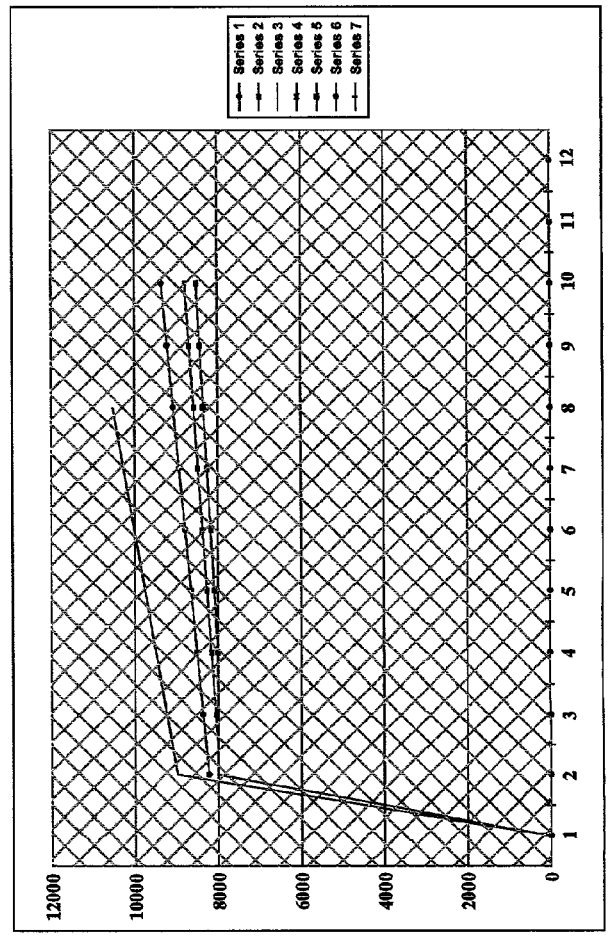
Figure 51:
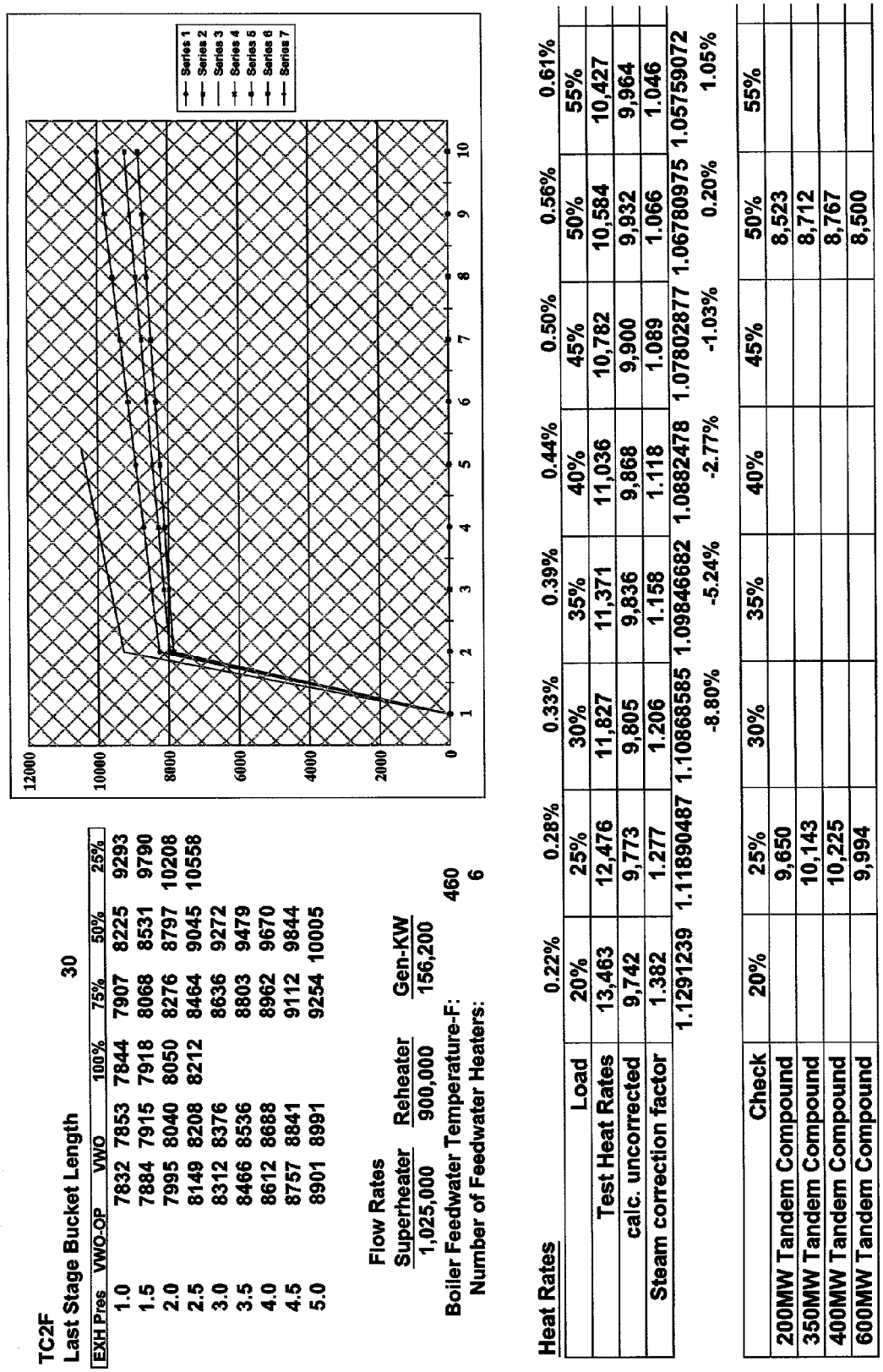
Figure 53:
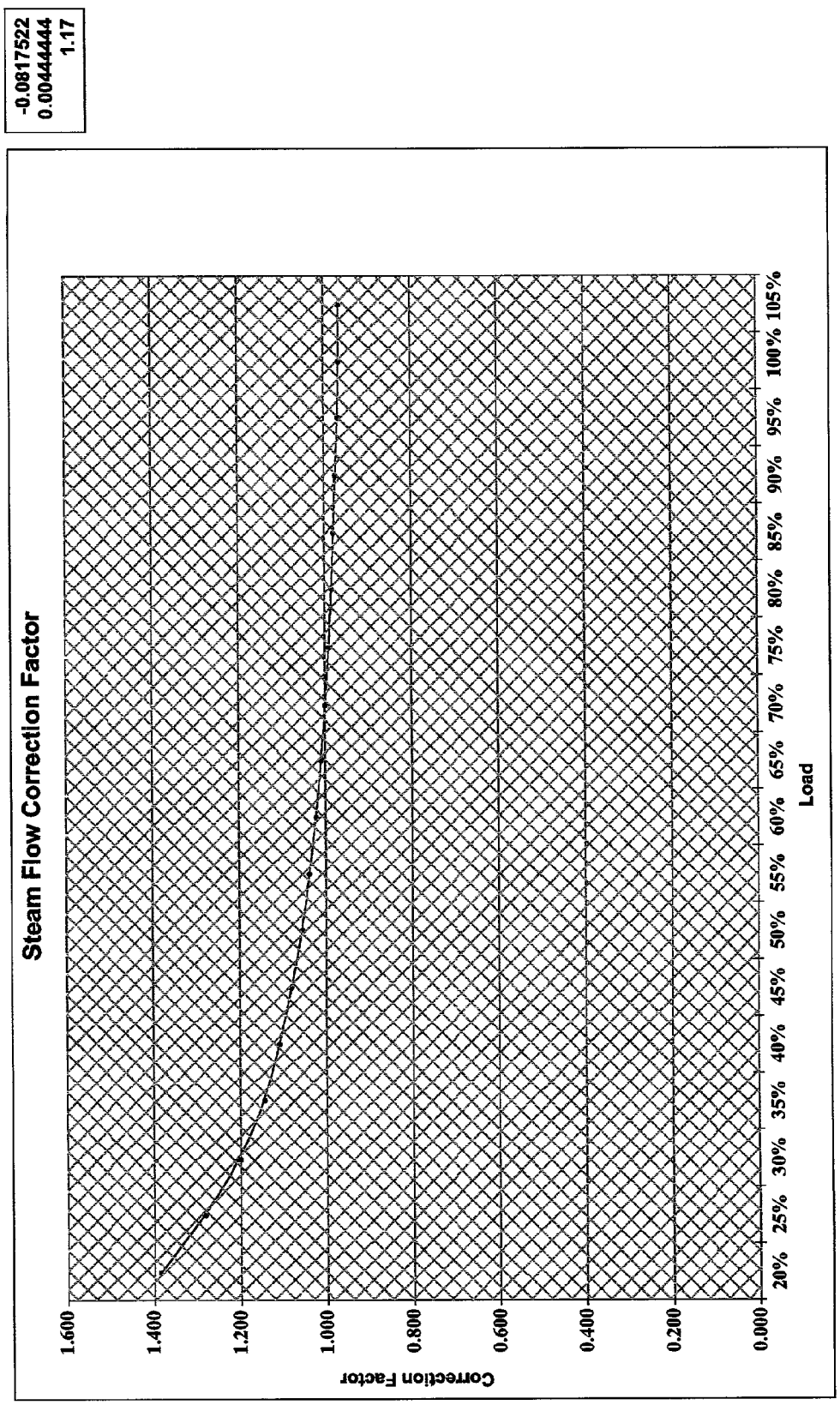
Figure 54:
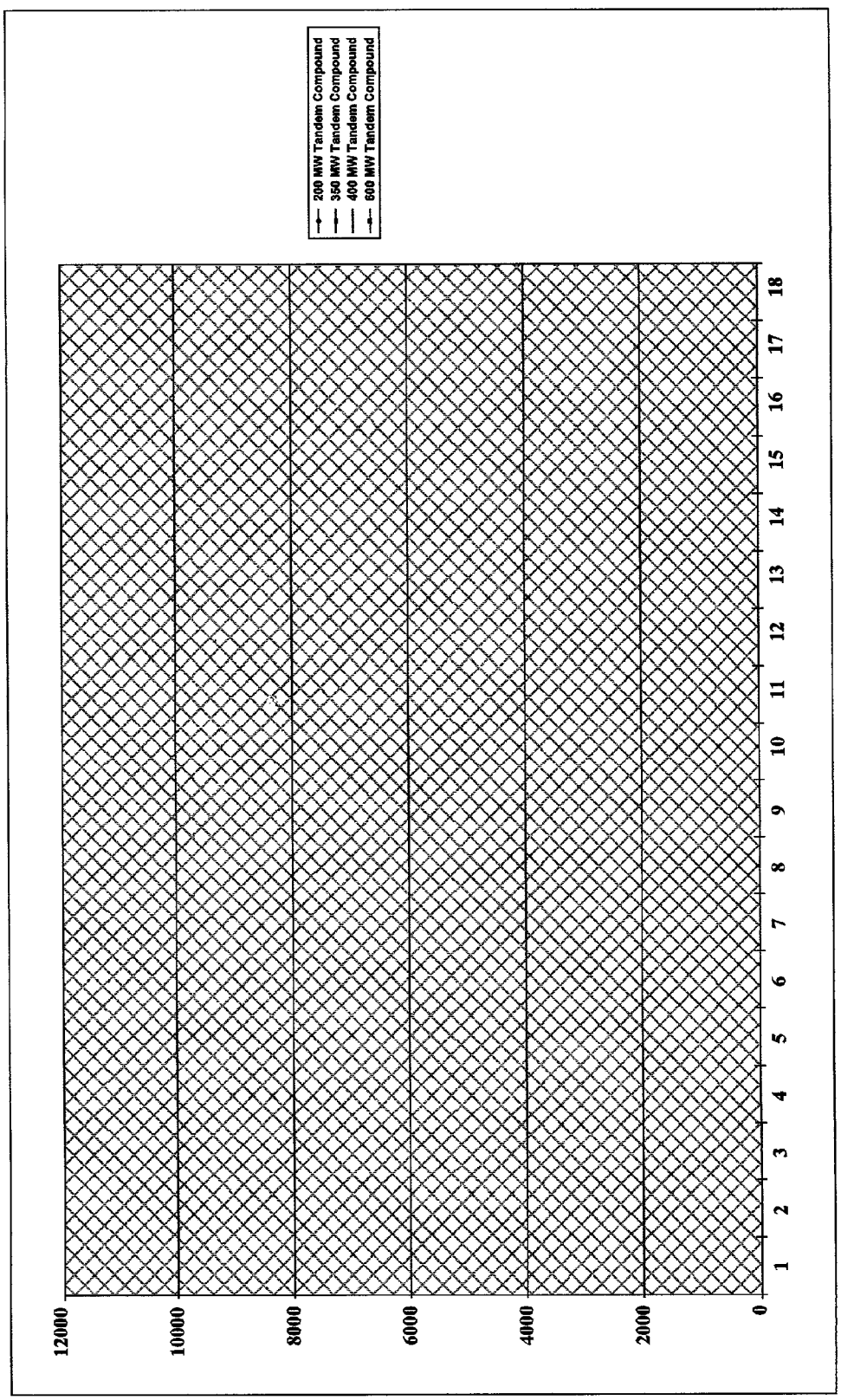

FIGS. 13 and 14 are an exemplary embodiment of a user interface 140. User interface 140 allows the user to input Fuels Information 142, Cycle 144, Feed Water Temperature 146, and Stack Temperature 148. Fuels Information 142 input allows the user to select standard fuel analyses of coal, oil or natural gas or to input actual values for a given unit. The actual input information fields disappear if the user selects standard analyses as one of the options. Cycle 144 allows the user to select standard unit cycles or to input actual values. The actual input information fields disappear if standard cycles are selected. Feed Water Temperature 146 allows the user to select a standard feed water temperatures or input actual values. The actual input information fields disappear if standard temperatures are selected. Stack Temperature 148 allows the user to select standard stack temperatures or to input actual values. The actual input information fields disappear if standard temperatures are selected.

FIGS. 15 and 16 are an exemplary embodiment of a user interface 160. User interface 160 prompts the user to input the type of Air Pollution Control Equipment installed on each Unit. If the user selects a Flyash Control Equipment 162, a $SO_2$ Control Equipment 164, a Mercury Control Equipment 166, or a NO Control Equipment 168, Standard types of equipment are provided. In each case, the initial capital cost, maintenance costs, labor costs, cost of consumables, internal power consumption, and equipment performance are factored into the economic performance of the units and stored into database 20 for future access and retrieval.

The user is further allowed to input Coal Pricing information 170 by inputting the actual cost of the coal, oil or natural gas as well as the transportation costs associated with the same. System 10 is flexible to accommodate additional inputs for other consumables such as startup fuel and limestone.

FIGS. 17 through 19 are an exemplary embodiment of a user interface 190 that calculates the predicted performance of each unit based on the information from the input worksheets identified in FIGS. 4 through 16. User interface 190 provides information on the operational and performance details and calculates fuel consumption and unit heat rates including Gross Heat Rate per Hour 192 and Net Heat Rate per Hour 194, at various load conditions. In an exemplary embodiment (not shown), various load conditions utilized in computations range from 25 to 99% with an increment of one percentage load condition. User interface 190 also computes Heat Losses 196, Efficiency of the Unit 198, Gross Heat Fired 200 in million BTU per hour, Super Heater Flow 202, Re-Heater Flow 204, Heat Input 206, Equivalent Output 208, Reheat To Superheat Ratio 210 and various other operational parameters. User interface 190 information is used as inputs for other worksheets to predict fuel and other consumable consumption. The information contained in user interface 190 is also used to verify the actual performance of the units at a specific load condition. User interface 190 further calculates the approximate dimensions of the boilers' furnace for operational considerations.

Exemplary embodiment of a user interface 220 and a user interface 230, displayed in FIGS. 20 and 21 and 22 and 23 respectively, summarize the fixed and variable costs for each unit based on the assumptions included in the input interfaces in FIGS. 4 through 16. Output from user interface 220 and user interface 230 is used as input to other financial models. In another exemplary embodiment, output from user interfaces is directly downloaded into other financial models. In an exemplary embodiment, system 10 downloads and displays Fixed Costs, Variable Costs, Maintenance Costs, Fuel Costs and other associated underlying details. System 10 provides an overview of a Total Operating Budget that is required to generate specific power.

FIGS. 24 through 30 are exemplary embodiments of user interfaces providing overview and verification of input and design assumptions. The user has an option to modify input or alter assumptions to evaluate alternative options. FIGS. 24 through 30 summarize Facility Generation Information 240, Operational Information 242, Qualified Facility (QF) Steam Information 244, Operator Related Information 248, Facility Equipment Information 250, Fuels Information 254, Furnace Volume Design Parameters 258 and other related information.

FIGS. 31 through 33 are an exemplary embodiment of a user interface 270 that provides the cost estimates of a new unit based on the entered information into system 10. The information displayed by user interface 270 is used to review the capital cost of a potential investment and for calculating the annual maintenance costs. For a specific power Gross Output, the system computes a Total Cost of The Power Facility including Development Costs, Mine Acquisition Costs, Fixtures Costs, Land & Building Costs, Management Services Cost, Infrastructure Costs, and Financing Fees & Costs.

FIGS. 34 and 35 are an exemplary embodiment of a user interface 300 displaying annual summary of maintenance expenses of all units at a given time for a selected facility. User interface 300 provides snap-shot details for each major category of expenses as well as average expenses for a given category over the last ten years.

FIG. 36 is an exemplary embodiment of a Fees and Services Report 310 displaying Operator's Fees and Services. Report 310 identifies in detail General Project Information, as well as Operator Fee, Legal Services Cost, Construction Services Fees, and Testing Services Fees. Report 310 further identifies Travel Expenses and Miscellaneous Employee Expenses.

FIGS. 37 and 38 are an exemplary embodiment of a Direct Material Cost Summary Report 320 displaying direct material related information. Report 310 identifies in detail General Project Information, as well as Consumables Cost, Chemicals Cost, Gases Cost, Office Supplies and Services Cost, and the cost associated with Office Furniture and Renting.

FIG. 39 is an exemplary embodiment of an Equipment Rentals/Lease and Spares Report 340 displaying the cost associated with Rentals, Lease and Planned Spares information. Report 340 identifies in detail the cost associated with Tools, Equipment, Office Equipment, Rail Car, Trucks and other related expenses. Planned Spare Parts portion of the report focuses on Boiler, Turbine, APC Equipment, Feed Water System as well as BOP.

FIGS. 40 through 43 are an exemplary embodiment of a Fuel Report providing fuel characteristics to verify that appropriate equipment has been installed. Fuel Report displays Proximate Analysis, Project Coal Classification, Ash Mineral Analysis, PARR Formula Relationship and Natural Gas Analysis.

FIGS. 44 and 45 are an exemplary embodiment of a Coal Offsets Report. The report calculates the cost of sulfur dioxide offsets that the unit will need for a given coal. In an exemplary embodiment, the cost from this report is linked to Operational Cost Summary Report.

FIGS. 46 through 49 are an exemplary embodiment of an O & M Labor, Purchased Power and Fuel Calculations Report. The report estimates the labor force and associated cost required to operate a facility based on the number of units inputted. In an exemplary embodiment, cots included in database 20 associated with this report are linked to published CPI data using the zip code of the facility.

FIGS. 50 through 54 are an exemplary embodiment of a Turbine Generation Report. The report calculates a steam correction factor based on load, which is used in performance worksheets (report). The report provides Exhaust Pressure, Heat Rates at varying loads, and a steam correction factor.

FIGS. 55 and 56 are an exemplary embodiment of a Dispatch Information Report. For a given average annual capacity, the report computes a capacity factor, an availability factor, an average load, hours in year, hours dispatched, and an annual output. The report further provides hours available for dispatch and total hours dispatched. The report further computes an average annual load for a given plant.

FIGS. 57 through 62 are an exemplary embodiment of an Operations Report providing an annual summary of key information used in analyzing a potential investment. Although the report provides information for year 2001 through year 2005, the analysis can be extended for 25 or 50 years, as desired. The report provides Dispatch Information and Heat Rate Information. For a given heat rate, the report further breaks down the data into Fuel Fired, Total Ash, Total Limestone, Total Flyash, Gross Generation, Gross Heat Rate, Net Generation, Plant Net Heat Rate, and Dispatch Information Report.

FIG. 63 is an exemplary embodiment of a Carbon Tax Costs Report. The report provides the potential carbon tax costs based on assumed carbon tax rate. The results of the report are linked to the Operations Cost Summary Report.

System 10 provides flexibility to estimates the annual maintenance cost of a unit based on an assumed major maintenance schedule (not shown). System 10 further provides a summary of unit costs generated in the Capital Cost worksheet, a fifty-year maintenance cost breakdown and the actual predicted maintenance expense based on the number of hours that the unit has been operated. Lookup functions are used to link various tables together (not shown).

Figure 64:
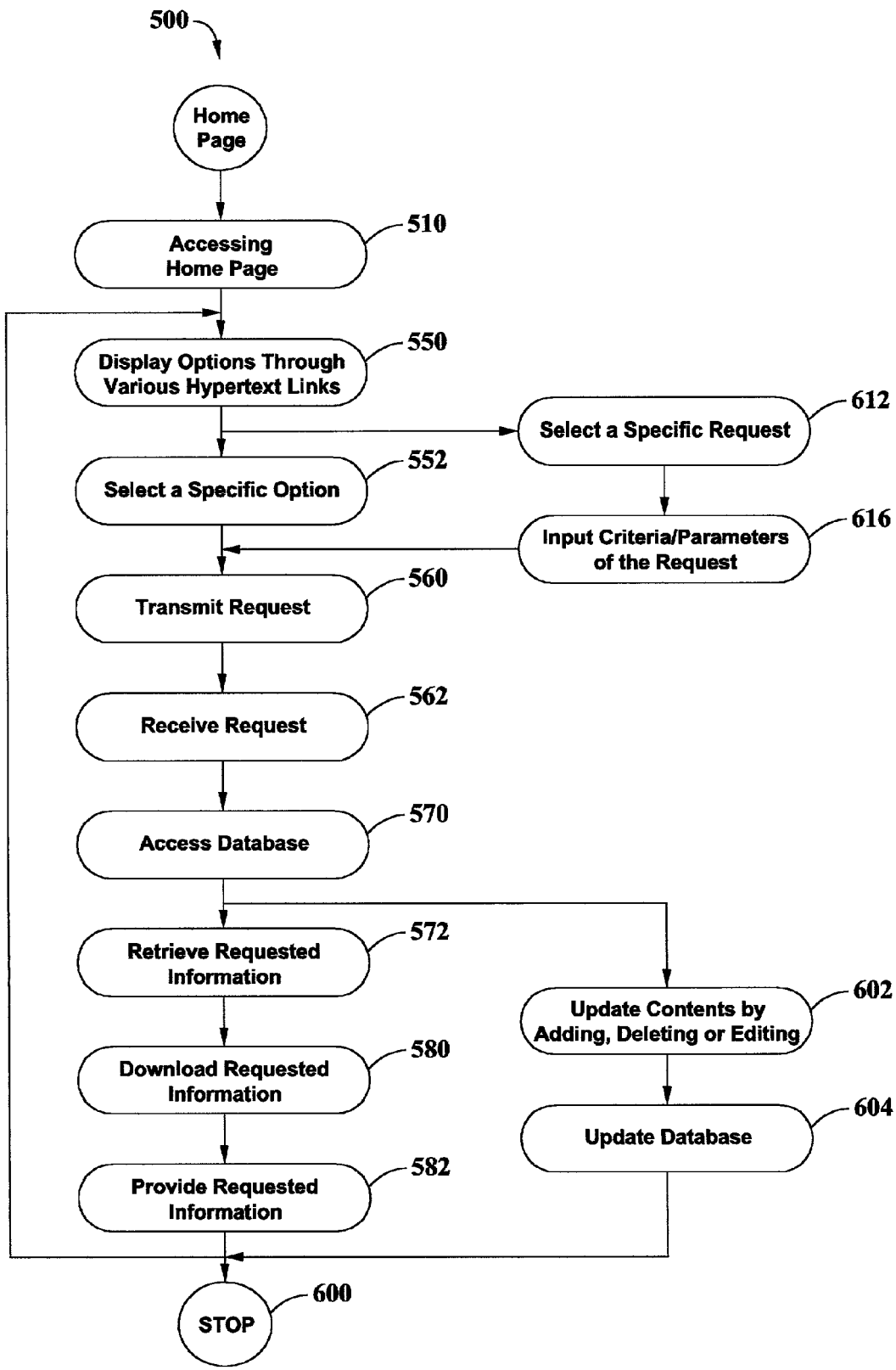
FIG. 64 is a flow chart depicting the steps utilized by the PPRPS.

FIG. 64 is a flow chart 500 for a Power Plant Revenue Prediction System (PPRPS) (shown in FIG. 1). Initially, the user accesses 510 a home page (not shown) of the web site through client system 14 (shown in FIG. 1). The home page displays several options 550 including updating the database, searching the database, or printing one of the reports identified in FIGS. 17 through 63. Once the user selects 552 a specific option from the various hypertext links, the request is transmitted 560 to server system 12. Selecting 552 the option is accomplished either by the click of a mouse or by a voice command. Once server system 12 (shown in FIG. 1) receives 562 the request, server system 12 accesses 570 database server 16 and retrieves 572 the requested information from database 20 (shown in FIG. 1). The requested information is downloaded 580 and provided 582 to client system 14 from server 12. The user continues to search database 20 for other information or exits 600 from PPRPS 10.

The user updates 602 the contents of the database by adding, deleting or editing the contents of database 20 through a displayed user interface. After updating 602 the contents, the user selects an option to update the database 604. The user may continue the process or exit from the system. In another embodiment, the home page displays several options identified above and also displays the options for retrieving various management reports. If the user wishes to obtain management reports, the user may obtain the reports by selecting 612 a specific hypertext link. Once the user selects 612 a hypertext link, the user then inputs 616 Criteria/Parameters of the report and transmits 560 a request to the server system by selecting a submit button (not shown). Transmitting 560 the request directs server system 12 to retrieve 572 the data from centralized database 20 and provides 582 the data to the user on the user's interface in a pre-determined format.

In one other embodiment, client system 14, as well as server system 12, are protected from access by unauthorized individuals. As described, PPRPS 10 includes interactive searchable database 20 for storing Boiler Data, Feed Water Data, Balance of Plant Data, Turbine Data, and APC Equipment Data. Database 20 provides flexibility to employees as well as management to maintain business information up-to-date.

While the invention has been described in terms of various specific embodiments, those skilled in the art will recognize that the invention can be practiced with modification within the spirit and scope of the claims.

What is claimed is:

1. A method for recommending a power generating facility to a business entity interested in acquiring a power generating facility, using a network-based system including a server system coupled to a centralized database and at least one client system, the business entity having operational and financial objectives, said method comprising the steps of:
identifying a plurality of power generating facilities for potential acquisition,
storing in the database information relating to the plurality of power generating facilities, the information including historical operational data and predicted future operational data;
computing performance metrics for each power generating facility based on the historical operational data and the predicted future operational data;
analyzing investment risks associated with acquiring each of the power generating facilities based on the performance metrics;
performing a financial comparison of each of the power generating facilities based on at least one of the performance metrics and the identified investment risks; and
recommending to the business entity a power generating facility that most closely satisfies the operational and financial objectives of the business entity.

2. A method according to claim 1 wherein said step of storing in the database information further comprises the step of submitting information for multiple units.

3. A method according to claim 2 wherein said step of submitting information for multiple units further comprises the step of inputting at least one of a unit gross capacity, a number of hours that the unit has operated since the Commercial Operation (CO) date, a number of hours that the unit will be available for operation, and an anticipated load that the unit will be dispatched.

4. A method according to claim 2 wherein said step of submitting information for multiple units further comprises the step of inputting at least one of a Unit Gross Output, a House Load, Existing Operational Hours, a Percentage of Available Hours Dispatched, and a Dispatched Load.

5. A method according to claim 2 wherein said step of submitting information for multiple units further comprises the step of inputting at least one of a Fuels Information, a Cycle, Feed Water Temperature, and a Stack Temperature.

6. A method according to claim 2 wherein said step of submitting information for multiple units further comprises the step of inputting Facility Equipment Information by selecting at least one of a Flyash Control Equipment, a $SO_2$ Control Equipment, a Mercury Control Equipment, and a NOx Control Equipment to reflect the actual condition of the facility that is being evaluated.

7. A method according to claim 6 wherein said step of inputting Facility Equipment Information further comprises the step of retrieving at least one of an initial capital cost, a maintenance cost, labor cost, cost of consumables and internal power consumption cost information from the centralized database.

8. A method according to claim 2 wherein said step of submitting information for multiple units further comprises the steps of:
    selecting a fuel type out of at least one of a coal and natural gas;
    inputting coal pricing information by inputting an actual cost of at least one of a fuel type selected; and
    inputting transportation costs associated with the fuel selected.

9. A method according to claim 1 wherein said step of computing performance metrics further comprises the step of computing operational parameters at various load conditions.

10. A method according to claim 9 wherein said step of computing operational parameters at various load conditions further comprises the step of computing at least one of fuel consumption, Heat Losses, Gross Heat Rate per Hour, Net Heat Rate per Hour, Heat Losses, Efficiency of the Unit, Gross Heat Fired in million BTU per hour, Super Heater Flow, Re-Heater Flow, Heat Input, Equivalent Output, Reheat To Superheat Ratio, and other performance metrics at various load conditions.

11. A method according to claim 1 wherein said step of computing performance metrics further comprises the step of predicting fuel and consumable consumption.

12. A method according to claim 1 wherein said step of computing performance metrics further comprises the step of verifying the actual performance of the units at a specific load condition.

13. A method according to claim 1 wherein said step of computing performance metrics further comprises the step of calculating the approximate dimensions of the boilers' furnace for operational considerations.

14. A computer program embodied on a computer readable medium for managing evaluation and selection of a power plant out of a plurality of power plants for a business entity interested in acquiring at least one power plant, the business entity having operational and financial objectives, said computer program comprising a code segment that:
    receives facility information including historical operational data and predicted future operational data for each of the plurality of power plants;
    maintains a database by adding, deleting and updating facility information for each power plant;
    computes performance metrics for each power plant using the historical operational data and the predicted future operational data;
    analyzes investment risks associated with acquiring each of the power plants based on the performance metrics:
    performs a financial comparison of each of the power plants based on at least one of the performance metrics and the investment risks; and
    generates management reports based on the received facility information; including recommending a power plant that most closely satisfies the operational and financial objectives of the business entity.

15. The computer program as recited in claim 14 further includes a code segment that provides online help to the user by downloading a user manual on to a client device.

16. The computer program as recited in claim 14 further includes a code segment that receives at least one of a unit gross capacity, number of hours that the unit has operated since the Commercial Operation (CO) date, the number of hours that the unit will be available for operation, and the anticipated load that the unit will be dispatched.

17. The computer program as recited in claim 16 further includes:
    a code segment that receives at least one of a Unit Gross Output, a House Load, Existing Operational Hours, Percentage of Available Hours Dispatched, a Dispatched Load, Fuels Information, a Cycle, Feed Water Temperature, and Stack Temperature; and
    a code segment that receives Facility Equipment Information by selecting at least one of a Flyash Control Equipment, a SO2 Control Equipment, a Mercury Control Equipment, and a NOx Control Equipment to reflect the actual condition of the facility that is being evaluated.

18. The computer program as recited in claim 17 further includes a code segment that receives at least one of an initial capital cost, a maintenance cost, a labor cost, a cost of consumables, and an internal power consumption cost information from the centralized database.

19. The computer program as recited in claim 14 further includes a code segment that generates at least one of an Operations Cost Summary Report, a General Information Report, a Capital Costs Summary Report, an Annual Maintenance Costs Report, a Major Maintenance Summary Report, a Fees and Services Report, a Direct Material Report, an Equipment, Rental & Spares Report, a Fuels Report, a Coal Offset Report, an O & M Labor, Purchased Power & Fuel Calculations Report, a Steam Correction Factor Report, a Turbine Generator Report, a Dispatch Information Report, an Annual Summary of Key Information to Analyze Potential Investment Report, a $CO_2$ Tax Calculations Report, and an Operational Cost Summary Report.

20. A computer program embodied on a computer readable medium for managing evaluations of power generating facilities using a server system coupled to a centralized database and at least one client system, said computer program comprising:
    a code segment that receives facility information from a user, facility information includes historical operational data and predicted future operational data for each of the power generating facilities;
    a code segment that stores the facility information into the centralized database and cross-references the facility information for each of the power generating facilities against an unique identifier;
    a code segment that analyzes each of the power generating facilities based on facility information and pre-selected criteria stored in the server system in response to an inquiry by the user; and
    a code segment that recommends a specific power generating facility for investment purposes.

21. The computer program as recited in claim 20 wherein the server system and the client system are connected via a network, the network is a wide area network operable using a protocol including at least one of TCP/IP and IPX.

22. The computer program as recited in claim 20 wherein the data is received from the user via a graphical user interface.

23. The computer program as recited in claim 20 further includes a code segment that prioritizes facilities based on pre-stored assumptions in the database.

24. The computer program as recited in claim 20 includes a code segment that displays information through an HTML document downloaded by the server system.

25. The computer program as recited in claim 20 further comprising:
a code segment that accesses the centralized database;
a code segment that searches the database regarding the specific inquiry;
a code segment that retrieves information from the database; and
a code segment that causes the retrieved information to be displayed on the client system.

26. The computer program as recited in claim 20 wherein the client system and the server system are connected via a network and wherein the network is one of a wide area network, a local area network, an intranet and the Internet.

27. The computer program as recited in claim 20, and further comprising a code segment that monitors the security of the system by restricting access to unauthorized individuals.

28. Apparatus for recommending at least one power generating facility from a plurality of power generating facilities to a business entity interested in acquiring a power generating facility, said apparatus comprising:
means for prompting a user to enter power generating facility information for the plurality of power generating facilities, the facility information including historical operational data for each of the power generating facilities;
means for predicting future operational data for each of the power generating facilities based on the historical operational data of the corresponding power generating facility;
means for calculating performance metrics for each of the power generating facilities using the historical operational data and the predicted future operational data of the corresponding power generating facility;
means for identifying investment risks associated with acquiring each of the power generating facilities based on the performance metrics of the corresponding power generating facility; and
means for analyzing each of the power generating facilities based on the performance metrics and the identified investment risks to recommend a power generating facility out of the plurality of power generating facilities.

29. Apparatus according to claim 28 wherein said means for prompting a user to enter power generating facility information further comprises means for storing information.

30. Apparatus according to claim 28 wherein said means for analyzing each of the power generating facilities further comprises means for:
tracking facility information on a real time basis;
storing facility information on a real time basis; and
updating the centralized database with revised facility information on a real time basis to provide up-to-date information instantaneously to the user upon a request.

31. Apparatus according to claim 28 wherein said means for analyzing each of the power generating facilities further comprises means for analyzing based on a pre-defined model and assumptions developed from the past experience and stored in the database.

32. Apparatus according to claim 28 further comprising means to generate a report of the facility analysis.

33. Apparatus according to claim 28 further comprising means for reviewing strategic model and financial assumptions.

34. Apparatus according to claim 28 wherein said means for analyzing each of the facilities further comprises means for determining impact on return on investment.

35. Apparatus according to claim 28 wherein said means for analyzing each of the facilities further comprises means for establishing various trigger levels that identify risk of the investment as at least one of a medium risk, a low risk and a high risk.

36. Apparatus according to claim 35 wherein said means for analyzing each of the facilities further comprises means for revalidating trigger levels.

37. A web-based system for selecting a power generating facility from a plurality of power generating facilities by a business entity interested in acquiring a power generating facility and utilizing a strategic decision model, the business entity having operational and financial objectives, said system comprising:
a client system comprising a browser;
a data storage device for storing information relating to the plurality of power generating facilities, the information includes historical operational data and predicted future operational data for each of the power generating facilities;
a server system configured to be coupled to said client system and said database, said server system further configured to:
receive facility information for each of the power generating facilities;
allocate operating expenses for each of the power generating facilities based on the historical operational data and the predicted future operational data for each of the facilities;
calculate a facility cost and an associated return on investment for each of the power generating facilities;
provide various management reports that provide operational details for each of the power generating facilities; and
recommend a power generating facility from the plurality of power generating facilities satisfying the operational and financial objectives of the business entity.

38. A system according to claim 37 wherein said server system further configured to:
receive at least one of at least one of a unit gross capacity, number of hours that the unit has operated since the Commercial Operation (CO) date, the number of hours that the unit will be available for operation, and the anticipated load that the unit will be dispatched;
receive at least one of a Unit Gross Output, a House Load, Existing Operational Hours, a Percentage of Available Hours Dispatched, a Dispatched Load, Fuels Information, a Cycle, a Feed Water Temperature, and a Stack Temperature;
receive Facility Equipment Information by selecting at least one of a Flyash Control Equipment, a $SO_2$ Control Equipment, a Mercury Control Equipment, and a NOx Control Equipment to reflect the actual condition of the facility that is being evaluated; and
receive at least one of an initial capital cost, a maintenance cost, a labor cost, cost of consumables and internal power consumption cost information from the centralized database.

39. A system according to claim 37 wherein said server system further configured to store facility information.

40. A system according to claim 37 wherein said server system further configured to:
   track facility information on a real time basis;
   store facility information on a real time basis; and
   update the centralized database with revised facility information on a real time basis to provide up-to date information instantaneously to the user upon a request.

41. A system according to claim 40 wherein said server system further configured to update the database by at least one of adding new information, deleting the current information and editing the current information stored in the database.

42. A system according to claim 40 wherein said server system further configured to update the database instantaneously by accepting the facility information entered online.

43. A system according to claim 40 wherein said server system further configured to update the database instantaneously by accepting the facility information at least through one of a voice activation command and a device connected to the client system.

44. A system according to claim 37 wherein said server system further configured to:
   download requested information from a server system; and
   display requested information on a client system in response to the inquiry.

45. A system according to claim 37 wherein said server system further configured to print requested information in a pre-determined format.

46. A system according to claim 45 wherein said server system further configured to display an HTML document downloaded by the server system.

47. A system according to claim 45 wherein said server system further configured to print at least one of an Operations Cost Summary Report, a General Information Report, a Capital Costs Summary Report, an Annual Maintenance Costs Report, a Major Maintenance Summary Report, a Fees and Services Report, a Direct Material Report, an Equipment, Rental & Spares Report, a Fuels Report, a Coal Offset Report, an O & M Labor, a Purchased Power & Fuel Calculations Report, a Steam Correction Factor Report, a Turbine Generator Report, a Dispatch Information Report, an Annual Summary of Key Information to Analyze Potential Investment Report, a $CO_2$ Tax Calculations Report, and an Operational Cost Summary Report.

48. A system according to claim 37 wherein said server system further configured to:
   determine at least one of a desired facility out of all available power generating facilities; and
   print relevant information regarding the desired facility.

49. The system according to claim 37 wherein the client system and the server system are connected via a network and wherein the network is one of a wide area network, a local area network, an intranet and the Internet.

50. A system according to claim 37 wherein said client system is further configured with:
   a displaying component; and
   a sending component to send an inquiry to the server system so that the server system can process and download the requested information to the client system.

51. A system according to claim 50 wherein the sending component functions in response to a click of a mouse button.

52. A system according to claim 50 wherein the sending component functions in response to a voice command.

53. The client system of claim 37 wherein said system is further configured to be protected from access by unauthorized individuals.

54. A system according to claim 37 wherein said server system is further configured with a displaying component for displaying various user interfaces to the user, a receiving component for receiving an inquiry to provide information from one of a plurality of users, a collection component for collecting information from users into the centralized database, a tracking component for tracking information on an on-going basis, and an accessing component for accessing the centralized database and causing the retrieved information to be displayed on the client system.

55. A system according to claim 54 wherein said server system further configured with a processing component for searching and processing received inquiries against the data storage device containing a variety of information collected by the collection component.

56. A system according to claim 55 wherein said server system further configured with a retrieving component to retrieve information from the data storage device.

57. A system according to claim 56 wherein said server system further configured with an information fulfillment component that downloads the requested information after retrieving from the data storage device to the plurality of users in the order in which the requests were received by the receiving component.

58. A system according to claim 37 wherein said server system further configured to receive input directly from a plurality of individuals and update the centralized database.

59. A computer to facilitate an online strategic decision making process to select a power generating facility from a plurality of power generating facilities by a business entity for acquisition purposes, the business entity having acquisition objectives, said computer coupled to a centralized database and programmed to:
   receive a power generating facility information into a centralized database, the power generating facility information includes historical operational data and predicted future operational data for each of the plurality of power generating facilities;
   store the power generating facility information into various sub-sections of the centralized database to create a facility profile and cross-reference the facility profile against a unique identifier for easy retrieval and update;
   identify a subset of power generating facilities from the plurality of power generating facilities;
   evaluate each facility included within the identified subset using pre-determined values stored in the centralized database and the corresponding power generating facility information; and
   generate reports identifying a power generating facility from the subset of power generating facilities satisfying the acquisition objectives of the business entity.

60. The computer according to claim 59 further programmed to provide a notification to users via electronic mail regarding final decision.

61. The computer according to claim 59 further programmed to provide a detail history of the facility, current operating expenses, and planned projections including return on investment.

62. The computer according to claim 59 further programmed to search various facilities from the centralized database based on pre-determined criteria.

63. The computer according to claim 59 further programmed to add facilities and other related information to the centralized database.

64. The computer according to claim 59 further programmed to provide flexibility to an administrator to make changes to the centralized database by at least one of adding, modifying and deleting information.

* * * * *